(12) United States Patent
Wang et al.

(10) Patent No.: US 12,520,152 B2
(45) Date of Patent: Jan. 6, 2026

(54) COMMUNICATION METHOD AND APPARATUS

(71) Applicant: Huawei Technologies Co., Ltd., Shenzhen (CN)

(72) Inventors: Yong Wang, Shenzhen (CN); Jing Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 335 days.

(21) Appl. No.: 18/157,594

(22) Filed: Jan. 20, 2023

(65) Prior Publication Data
US 2023/0171602 A1    Jun. 1, 2023

Related U.S. Application Data

(63) Continuation of application No. PCT/CN2020/106013, filed on Jul. 30, 2020.

(51) Int. Cl.
*H04W 12/106* (2021.01)
(52) U.S. Cl.
CPC ................. *H04W 12/106* (2021.01)
(58) Field of Classification Search
CPC .................................... H04W 12/106
USPC ............................................. 726/6
See application file for complete search history.

(56) References Cited

U.S. PATENT DOCUMENTS

| | | | |
|---|---|---|---|
| 2010/0262825 A1 | 10/2010 | Yoon et al. | |
| 2012/0066737 A1* | 3/2012 | Zhang .................. | H04W 12/02 726/1 |
| 2015/0172298 A1 | 6/2015 | Otsuka | |
| 2016/0026787 A1 | 1/2016 | Nairn et al. | |
| 2017/0295489 A1* | 10/2017 | Agiwal ............. | H04W 12/0433 |
| 2019/0082325 A1 | 3/2019 | Muhanna et al. | |
| 2019/0246282 A1* | 8/2019 | Li ........................ | H04W 12/033 |
| 2020/0359208 A1 | 11/2020 | Wu et al. | |

(Continued)

FOREIGN PATENT DOCUMENTS

| | | |
|---|---|---|
| CN | 101854625 A | 10/2010 |
| CN | 107566115 A | 1/2018 |
| CN | 108075897 A | 5/2018 |

(Continued)

OTHER PUBLICATIONS

3GPP TSG SA WG3 (Security) Meeting #91 S3-181560, Section 8, Size of the integrity protection tag MAC-I, Vodafone, ATandT, Mitre, NIST, InterDigital, TCG, Apr. 16-20, 2018, total 2 pages.

(Continued)

*Primary Examiner* — Michael S McNally
(74) *Attorney, Agent, or Firm* — Conley Rose, P.C.

(57) ABSTRACT

A communication method includes receiving an association request message, where the association request message includes information about a security algorithm supported by a second node, determining a target security algorithm of a signaling plane and a target MAC length of the signaling plane according to a first algorithm selection policy, where the target security algorithm of the signaling plane belongs to a set of security algorithms indicated by the information about the security algorithm supported by the second node, and generating a first MAC by using the target security algorithm of the signaling plane, where a length of the first MAC is the target MAC length of the signaling plane.

24 Claims, 22 Drawing Sheets

(56) References Cited

U.S. PATENT DOCUMENTS

2021/0092608 A1* 3/2021 Li ............................ H04W 8/08
2022/0210648 A1* 6/2022 Li .......................... H04W 12/03

FOREIGN PATENT DOCUMENTS

| CN | 108347410 A | 7/2018 |
|---|---|---|
| CN | 109618335 A | 4/2019 |
| CN | 110121168 A | 8/2019 |
| IN | 201937045850 A | 1/2020 |
| JP | 2010539839 A | 12/2010 |
| JP | 2016134834 A | 7/2016 |
| WO | 2020067961 A1 | 4/2020 |
| WO | 2020146661 A1 | 7/2020 |

OTHER PUBLICATIONS

HMAC Key Sizes for MD5, SHA1, SHA224|256|384|512, Jun. 14, 2018, 2 pages.

3GPP TR 33.899 V0.7.0, Feb. 2017, 3rd Generation Partnership Project; Technical Specification Group Services and System Aspects; Study on the security aspects of the next generation system (Release 14), 471 pages.

\* cited by examiner

| First algorithm selection policy | | | |
|---|---|---|---|
| Sequence number | Identifier | Algorithm | Priority |
| 1 | 0001 | AES-CMAC | 1 |
| 2 | 0010 | ZUC | 2 |
| 3 | 1000 | AES-GCM | 3 |
| ... | ... | ... | ... |

| First algorithm selection policy | | | | |
|---|---|---|---|---|
| Sequence number | Identifier | Algorithm | MAC length | Priority |
| 1 | 0001 | AES-CMAC | 32 | 1 |
| 2 | 0010 | ZUC | 32 | 2 |
| 3 | 1000 | AES-GCM | 32 | 3 |
| 4 | 0011 | AES-CMAC | 64 | 4 |
| 5 | 0011 | AES-CMAC | 128 | 5 |
| 6 | 1001 | AES-CCM | 32 | 6 |
| ... | ... | ... | ... | ... |

FIG. 7

COMMUNICATION METHOD AND APPARATUS

CROSS-REFERENCE TO RELATED APPLICATIONS

This is a continuation of International Patent Application No. PCT/CN2020/106013 filed on Jul. 30, 2020, the disclosure of which is hereby incorporated by reference in its entirety.

TECHNICAL FIELD

The present disclosure relates to the field of communications technologies, and in particular, to the field of short-range communications technologies, such as, cockpit domain communication. Further, the present disclosure relates to a communication method and apparatus.

BACKGROUND

With the rapid development of informatization, communications technologies have penetrated into people's lives. While enjoying communication convenience, people are also faced with threats of security vulnerability and privacy leakage. To ensure transmission and storage security of data in a communication process, integrity protection needs to be performed on the data. Further, the integrity protection on the data may be performed in a manner of calculating a message authentication code (MAC) according to an integrity protection algorithm. The, MAC is a small segment of information generated by using a specific algorithm, and is used to check message integrity.

Message authentication codes generated by using the integrity protection algorithm have a plurality of lengths. However, in the communication process, usually only a message authentication code of a fixed length can be used for communication. For example, a MAC length supported by Long-Term Evolution (LTE) and a 5th generation (5G) communications protocol is 32 bits. In a Wi-Fi Protected Access (WPA) 2/WPA3 protocol, when a Temporal Key Integrity Protocol (TKIP), Cipher-Block Chaining Message Authentication Protocol (CCMP)-128, or Galois/Counter Mode Protocol (GCMP)-128 algorithm is used, a MAC length is 64 bits; and when a CCMP-256/GCMP-256 algorithm is used, a MAC length is 128 bits. In a Bluetooth protocol, when an Advanced Encryption Standard (AES)-Cipher Block Chaining Message Authentication Code (CCM) algorithm is used, a MAC length is 32 bits.

With the development of communications technologies, more and more messages are communicated between nodes, and different nodes have different requirements for MAC lengths. For example, if a MAC of a relatively long fixed length (for example, a MAC of 256 bits or 128 bits) is used, the MAC occupies a relatively large proportion in a message, and consequently, message transmission efficiency is greatly affected. For another example, security of different MAC lengths is different, a longer MAC length indicates higher security, and if a MAC of a relatively short length is used, data security cannot be ensured. Consequently, in an existing communication process, a MAC of a fixed length cannot meet a requirement.

It can be seen that, how to determine a MAC length that meets the requirement is a technical problem being studied by a person skilled in the art.

SUMMARY

Embodiments of this application disclose a communication method and apparatus, to determine a MAC length that meets a requirement such as to improve flexibility in selecting the MAC length.

According to a first aspect, embodiments of this application provide a communication method. The method includes receiving an association request message from a second node, where the association request message includes information about a security algorithm supported by the second node; determining a target security algorithm of a signaling plane and a target MAC length of the signaling plane according to a first algorithm selection policy, where the target security algorithm of the signaling plane belongs to a set of security algorithms indicated by the information about the security algorithm supported by the second node; and generating a first MAC by using the target security algorithm of the signaling plane, where a length of the first MAC is the target MAC length of the signaling plane.

In embodiments of this application, a first node determines the target security algorithm of the signaling plane and the target MAC length of the signaling plane based on the information about the security algorithm supported by the second node and by using an algorithm policy, and then uses the target MAC length of the signaling plane as a MAC length of a signaling message between the first node and the second node. In this way, different MAC lengths can be determined based on different policies configured in the first node, to improve flexibility of the MAC length. Further, an algorithm selection policy may be preconfigured or predefined based on a communication requirement of the first node. For example, an algorithm with relatively high security and a relatively long MAC length may be preferentially selected, to improve data security.

In a possible implementation of the first aspect, determining a target security algorithm of a signaling plane and a target MAC length of the signaling plane according to a first algorithm selection policy includes determining the target security algorithm of the signaling plane and the target MAC length of the signaling plane according to a first length selection policy and the first algorithm selection policy.

In another possible implementation of the first aspect, determining the target security algorithm of the signaling plane and the target MAC length of the signaling plane according to a first length selection policy and the first algorithm selection policy includes determining the target security algorithm of the signaling plane according to the first algorithm selection policy; and determining the target MAC length of the signaling plane according to the first length selection policy and the target security algorithm of the signaling plane.

In another possible implementation of the first aspect, determining a target security algorithm of a signaling plane and a target MAC length of the signaling plane according to a first algorithm selection policy includes determining a target security algorithm of the signaling plane according to the first algorithm selection policy, where a MAC length corresponding to the target security algorithm of the signaling plane is the target MAC length of the signaling plane.

In another possible implementation of the first aspect, the method further includes: sending a security context request message to the second node, where the security context request message includes the first MAC, information indicating the target security algorithm of the signaling plane, and the target MAC length of the signaling plane, and the first MAC is used to check integrity of the security context request message.

It can be seen that the first node may add, in the security context request message, the information indicating the target security algorithm of the signaling plane and the target MAC length of the signaling plane such that the second node may obtain the target security algorithm of the signaling plane and the target MAC length of the signaling plane by using the security context request message. Further, the security context request message may carry the first MAC that is used by the second node to check the integrity of the security context request message, to prevent the security context request message from being tampered with by an attacker.

In another possible implementation of the first aspect, the method further includes sending a security context request message to the second node, where the security context request message includes the first MAC and information indicating the target security algorithm of the signaling plane, the first MAC is used to check integrity of the security context request message, and the first MAC is further used to indicate the target MAC length of the signaling plane.

In another possible implementation of the first aspect, after determining a target security algorithm of a signaling plane and a target MAC length of the signaling plane according to a first algorithm selection policy, the method further includes sending a security context request message to the second node, where the security context request message includes the first MAC, information indicating the target security algorithm of the signaling plane, the target MAC length of the signaling plane, and first identity authentication information, the first MAC is used to check integrity of the security context request message, and the first identity authentication information is generated based on a shared key between the first node and the second node; and receiving a security context response message from the second node, where the security context response message includes second identity authentication information and a second MAC, a length of the second MAC is the target MAC length of the signaling plane, the second identity authentication information is used to verify an identity of the second node, and the second MAC is used to check integrity of the security context response message.

The shared key is a secret value shared between the first node and the second node, and may be used to generate identity authentication information for verifying an identity of a node. It can be seen that the first node may generate the first identity authentication information by using the shared key, and the first identity authentication information is used by the second node to verify an identity of the first node. Correspondingly, the first node may also verify an identity of the second node by using the second identity authentication information. If an attacker wants to obtain the target security algorithm of the signaling plane or the target MAC length of the signaling plane by forging an identity of the second node, verification performed by the first node on the identity cannot succeed because the shared key cannot be forged. Therefore, it is avoided that the first node communicates with an untrusted node, and communication security of the first node is improved.

In another possible implementation of the first aspect, the method further includes checking the integrity of the security context response message based on the target security algorithm of the signaling plane and the second MAC; performing verification on the second identity authentication information based on the shared key; and sending an association establishment message to the second node if the check on the integrity of the security context response message succeeds and the verification on the second identity authentication information succeeds, where the association establishment message indicates the second node to establish an association with the first node.

In another possible implementation of the first aspect, the security context request message further includes a target security algorithm of a user plane, and the method further includes determining the target security algorithm of the user plane according to a second algorithm selection policy, where the target security algorithm of the user plane belongs to the set of security algorithms indicated by the information about the security algorithm supported by the second node.

In another possible implementation of the first aspect, the method further includes obtaining an identifier of a first service and/or a data packet size of the first service; determining a target MAC length of the user plane based on a MAC length supported by the target security algorithm of the user plane and at least one of the identifier of the first service and the data packet size of the first service, where the target MAC length of the user plane is used to indicate a length of a MAC for performing integrity protection on data of the first service; and sending a resource scheduling message to the second node, where the resource scheduling message includes the target MAC length of the user plane.

It can be seen that the target MAC length of the user plane may be determined based on the MAC length supported by a security algorithm of the user plane, the identifier of the first service, and the data packet size of the first service. Different MAC lengths may be determined for different services or services with different data packet sizes. This improves flexibility of the MAC length. For a service with relatively high confidentiality, a relatively long MAC length may be used, so that it is difficult to be cracked, and data security is improved.

According to a second aspect, embodiments of this application further provide a communication method, including sending an association request message to a first node, where the association request message includes information about a security algorithm supported by a second node; and receiving a security context request message from the first node, where the security context request message includes information used to indicate a target security algorithm of a signaling plane and information used to indicate a target MAC length of the signaling plane, the target security algorithm of the signaling plane and the target MAC length of the signaling plane correspond to a first algorithm selection policy, and the target security algorithm of the signaling plane belongs to a set of security algorithms indicated by the information about the security algorithm supported by the second node.

In embodiments of this application, the second node sends, to the first node, the information about the security algorithm supported by the second node. The first node determines the target security algorithm of the signaling plane and the target MAC length of the signaling plane based on the information about the security algorithm supported by the second node and by using a preconfigured or predefined algorithm policy, and then uses the target MAC length of the signaling plane as a MAC length of a signaling message between the first node and the second node. In this way, different MAC lengths can be determined based on different policies configured in the first node, to improve flexibility of the MAC length. For example, an algorithm with relatively high security may be selected from algorithms supported by the second node, and a relatively long MAC length may further be selected, to improve data security.

In a possible implementation of the second aspect, the security context request message includes a first MAC, and a length of the first MAC is the target MAC length of the signaling plane. The method further includes checking integrity of the security context request message based on the first MAC by using the target security algorithm of the signaling plane.

In another possible implementation of the second aspect, the first MAC is the information used to indicate the target MAC length of the signaling plane.

In another possible implementation of the second aspect, the target security algorithm of the signaling plane and the target MAC length of the signaling plane are determined according to the first algorithm selection policy, and the first MAC is generated according to the target security algorithm of the signaling plane.

In another possible implementation of the second aspect, the security context request message further includes first identity authentication information. The method further includes performing verification on the first identity authentication information based on a shared key between the second node and the first node; if the check on the integrity of the security context request message succeeds and the verification on the first identity authentication information succeeds, generating a second MAC by using the target security algorithm of the signaling plane, where a length of the second MAC is the target MAC length of the signaling plane; and sending a security context response message to the first node, where the security context response message includes the second MAC and second identity authentication information, and the second identity authentication information is generated based on the shared key between the second node and the first node.

In another possible implementation of the second aspect, the method further includes receiving an association establishment message from the first node. The association establishment message indicates the second node to establish an association with the first node.

In another possible implementation of the second aspect, the security context request message further includes information indicating a target security algorithm of a user plane, the target security algorithm of the user plane corresponds to a second algorithm selection policy, and the target security algorithm of the user plane belongs to the set of security algorithms indicated by the information about the security algorithm supported by the second node. The method further includes receiving a resource scheduling message from the first node, where the resource scheduling message includes a target MAC length of the user plane, the target MAC length of the user plane corresponds to the target security algorithm of the user plane and at least one of an identifier of a first service and a data packet size of the first service, and the target MAC length of the user plane is used to indicate a length of a MAC for performing integrity protection on data of the first service.

It can be seen that the first node may determine the target MAC length of the user plane based on a MAC length supported by a security algorithm of the user plane, the identifier of the first service, and the data packet size of the first service, and then use the target MAC length of the user plane as a MAC length of a message used to process the first service. In this way, different MAC lengths can be determined for different services or services of different data packet sizes, to improve flexibility of the MAC length. For a service with relatively high confidentiality, a relatively long MAC length may be used such that it is difficult to be cracked, and data security is improved.

Further, the first node may add, in the resource scheduling message, the information indicating the target security algorithm of the user plane and the target MAC length of the user plane, so that the second node may obtain the target security algorithm of the user plane and the target MAC length of the user plane by using the resource scheduling message.

According to a third aspect, embodiments of this application further provide a communication method, including receiving a service attribute report response message from a second node, where the service attribute report response message includes an identifier of a first service and/or a data packet size of the first service; and determining a target MAC length of a user plane based on a MAC length supported by a target security algorithm of the user plane and at least one of the identifier of the first service and the data packet size of the first service, where the target MAC length of the user plane is used to indicate a length of a MAC for performing integrity protection on data of the first service.

In embodiments of this application, the first node may determine the target MAC length of the user plane based on a MAC length supported by a security algorithm of the user plane and the identifier of the first service and/or the data packet size of the first service, and then use the target MAC length of the user plane as a MAC length of a message used to process the first service. In this way, different MAC lengths can be determined for different services or services of different data packet sizes, to improve flexibility of the MAC length. For a service with relatively high security, a relatively long MAC length may be used, so that it is difficult to be cracked, and data security is improved. In addition, for some messages that do not have a high security requirement or have a relatively small data packet, a relatively short MAC length may be used, to avoid affecting communication efficiency and reduce resource consumption during network transmission.

In a possible implementation of the third aspect, determining a target MAC length of a user plane based on a MAC length supported by a target security algorithm of the user plane and at least one of the identifier of the first service and the data packet size of the first service includes determining the target MAC length of the user plane based on the MAC length supported by the target security algorithm of the user plane and the identifier of the first service; or determining the target MAC length of the user plane based on the MAC length supported by the target security algorithm of the user plane and the data packet size of the first service.

In another possible implementation of the third aspect, determining a target MAC length of a user plane based on a MAC length supported by a target security algorithm of the user plane and at least one of the identifier of the first service and the data packet size of the first service includes determining, based on the MAC length supported by the target security algorithm of the user plane and a correspondence between the identifier of the first service and a MAC length, the MAC length corresponding to the identifier of the first service as the target MAC length of the user plane; or determining, based on the MAC length supported by the target security algorithm of the user plane and a correspondence between the data packet size of the first service and a MAC length, the MAC length corresponding to the data packet size of the first service as the target MAC length of the user plane.

In another possible implementation of the third aspect, determining a target MAC length of a user plane based on a target security algorithm of the user plane and at least one of the identifier of the first service and the data packet size of the first service includes determining a second length selection policy based on the identifier of the first service and/or the data packet size of the first service; and determining the target MAC length of the user plane based on the second length selection policy and the MAC length supported by the target security algorithm of the user plane.

In another possible implementation of the third aspect, the identifier of the first service corresponds to a first service type, and integrity protection needs to be performed on data of a service whose type is the first service type.

Services of different service types have different integrity protection requirements. The first node may determine, based on the identifier of the first service, whether to enable integrity protection, and generate a corresponding target MAC of the user plane only for a service for which integrity protection needs to be enabled, and therefore security requirements of different services can be met. For example, a video upload service is a service having a relatively high security requirement, so that integrity protection needs to be performed on data of the video upload service, and therefore, a length of a MAC used to protect the data of this service needs to be determined.

In another possible implementation of the third aspect, the method further includes sending a resource scheduling message to the second node, where the resource scheduling message includes the target MAC length of the user plane.

In another possible implementation of the third aspect, the method further includes generating a third MAC by using the target security algorithm of the user plane, where a length of the third MAC is the target MAC length of the user plane, and the third MAC is used to perform integrity protection on the data of the first service.

In another possible implementation of the third aspect, the method further includes obtaining information about a security algorithm supported by the second node; determining a target security algorithm of a signaling plane and a target MAC length of the signaling plane according to a first algorithm selection policy, where the target security algorithm of the signaling plane belongs to a set of security algorithms indicated by the information about the security algorithm supported by the second node; generating a fourth MAC by using the target security algorithm of the signaling plane, where a length of the fourth MAC is the target MAC length of the signaling plane; and sending a resource scheduling message to the second node, where the resource scheduling message includes the fourth MAC and the target MAC length of the user plane, and the fourth MAC is used to perform integrity protection on the resource scheduling message.

In another possible implementation of the third aspect, the method further includes determining the target security algorithm of the user plane according to a second algorithm selection policy, where the target security algorithm of the user plane belongs to the set of security algorithms indicated by the information about the security algorithm supported by the second node.

According to a fourth aspect, embodiments of this application further provide a communication method, including sending a service attribute report response message to a first node, where the service attribute report response message includes an identifier of a first service and/or a data packet size of the first service; and receiving a resource scheduling message from the first node, where the resource scheduling message includes a target MAC length of a user plane; the target MAC length of the user plane is a MAC length supported by a target security algorithm of the user plane, and the target MAC length of the user plane corresponds to at least one of the identifier of the first service and the data packet size of the first service; and the target MAC length of the user plane is used to indicate a length of a MAC for performing integrity protection on data of the first service.

In embodiments, services of different service types have different integrity protection requirements. The first node may determine, based on the identifier of the first service, whether to enable integrity protection. For example, an audio noise reduction service is a service having a relatively low security requirement such that integrity protection may not need to be performed on data of the audio noise reduction service, and therefore, a MAC length corresponding to the audio noise reduction service may not be determined.

Further, the first node may add indication information in a resource scheduling message such that a second node determines, based on the indication information, whether integrity protection is to be enabled for a service.

In a possible implementation of the fourth aspect, the target MAC length of the user plane is determined based on the MAC length supported by the target security algorithm of the user plane and at least one of the identifier of the first service and the data packet size of the first service.

In another possible implementation of the fourth aspect, the identifier of the first service corresponds to a first service type, and integrity protection needs to be performed on data of a service whose type is the first service type.

Services of different service types have different integrity protection requirements. The first node may determine, based on the identifier of the first service, whether to enable integrity protection, and generate a corresponding target MAC of the user plane only for a service for which integrity protection needs to be enabled, and therefore security requirements of different services can be met. For example, a video upload service is a service having a relatively high security requirement, so that integrity protection needs to be performed on data of the video upload service, and therefore, a length of a MAC used to protect the data of this service needs to be determined.

In another possible implementation of the fourth aspect, the target security algorithm of the user plane corresponds to a second algorithm selection policy, and the target security algorithm of the user plane belongs to a set of security algorithms indicated by information about a security algorithm supported by the second node.

In another possible implementation of the fourth aspect, the resource scheduling message further includes a fourth MAC, and the method further includes checking message integrity of the resource scheduling message based on the fourth MAC by using the target security algorithm of the user plane.

According to a fifth aspect, embodiments of this application further provide a communication method including sending a service attribute report response message to a first node, where the service attribute report response message includes an identifier of a first service and/or a data packet size of the first service; and determining a target MAC length of a user plane based on a MAC length supported by a target security algorithm of the user plane and at least one of the identifier of the first service and the data packet size of the first service, where the target MAC length of the user plane is used to indicate a length of a MAC for performing integrity protection on data of the first service.

It can be seen that a method for determining the target MAC length of the user plane that is the same as that in the first node is configured in a second node. Therefore, the second node may determine the target MAC length of the user plane based on a MAC length supported by a security algorithm of the user plane and the identifier of the first service and/or the data packet size of the first service, and then use the target MAC length of the user plane as a MAC length of a message used to process the first service. In this way, different MAC lengths can be determined for different services or services of different data packet sizes, to improve flexibility of the MAC length.

However, the same method for determining the target MAC length of the user plane is configured in both the second node and the first node such that the first node determines the target MAC length of the user plane in a specific manner, and therefore the second node also determines the target MAC length of the user plane in a same manner. In this way, the node does not need to send the target MAC length to the peer node, to save network resources.

In a possible implementation of the fifth aspect, determining a target MAC length of a user plane based on a MAC length supported by a target security algorithm of the user plane and at least one of the identifier of the first service and the data packet size of the first service includes determining, based on the MAC length supported by the target security algorithm of the user plane and a correspondence between the identifier (ID) of the first service and a MAC length, the MAC length corresponding to the ID of the first service as the target MAC length of the user plane; or determining, based on the MAC length supported by the target security algorithm of the user plane and a correspondence between the data packet size of the first service and a MAC length, the MAC length corresponding to the data packet size of the first service as the target MAC length of the user plane.

In another possible implementation of the fifth aspect, determining a target MAC length of a user plane based on a MAC length supported by a target security algorithm of the user plane and at least one of the identifier of the first service and the data packet size of the first service includes determining the target MAC length of the user plane based on the MAC length supported by the target security algorithm of the user plane and the identifier of the first service; or determining the target MAC length of the user plane based on the MAC length supported by the target security algorithm of the user plane and the data packet size of the first service.

In another possible implementation of the fifth aspect, the determining a target MAC length of a user plane based on a target security algorithm of the user plane and at least one of the identifier of the first service and the data packet size of the first service includes determining a second length selection policy based on the ID of the first service and/or the data packet size of the first service; and determining the target MAC length of the user plane based on the second length selection policy and the MAC length supported by the target security algorithm of the user plane.

In another possible implementation of the fifth aspect, the identifier of the first service corresponds to a first service type, and integrity protection needs to be performed on data of a service whose type is the first service type.

Services of different service types have different integrity protection requirements. The first node may determine, based on the identifier of the first service, whether to enable integrity protection, and generate a corresponding target MAC of the user plane only for a service for which integrity protection needs to be enabled, and therefore security requirements of different services can be met. For example, a video upload service is a service having a relatively high security requirement, so that integrity protection needs to be performed on data of the video upload service, and therefore, a length of a MAC used to protect the data of this service needs to be determined.

In another possible implementation of the fifth aspect, the target security algorithm of the user plane corresponds to a second algorithm selection policy, and the target security algorithm of the user plane belongs to a set of security algorithms indicated by information about a security algorithm supported by the second node.

According to a sixth aspect, embodiments of this application further provide a communication method including receiving a service attribute report response message from a second node, where the service attribute report response message includes at least one service identifier, the at least one service identifier includes an identifier of at least one second service, the identifier of the at least one second service corresponds to a second service type, and integrity protection does not need to be performed on data of a service whose type is the second service type; and sending a resource scheduling message to the second node, where the resource scheduling message is used to indicate that integrity protection is not to be enabled for the service corresponding to the identifier of the at least one second service.

It can be seen that services of different service types have different integrity protection requirements. A first node may determine, based on the identifier of the first service, whether to enable integrity protection. For example, an audio noise reduction service is a service having a relatively low security requirement such that integrity protection may not need to be performed on data of the audio noise reduction service, and therefore, a MAC length corresponding to the audio noise reduction service may not be determined.

Further, the first node may add indication information in a resource scheduling message such that the second node determines, based on the indication information, whether integrity protection is to be enabled for a service.

In a possible implementation of the sixth aspect, the at least one service identifier includes an identifier of at least one first service, the identifier of the at least one first service corresponds to a first service type, and integrity protection needs to be performed on data of a service whose type is the first service type.

In another possible implementation of the sixth aspect, the resource scheduling message is further used to indicate a target MAC length of a user plane that is used for the at least one first service.

It can be seen that, for a service on which integrity protection needs to be performed, information indicating the target MAC length of the user plane may be added in the first node and is used to indicate a length of a MAC for performing integrity protection on data of the service.

According to a seventh aspect, embodiments of this application further provide a communication method, including sending a service attribute report response message to a first node, where the service attribute report response message includes at least one service identifier, the at least one service identifier includes an identifier of at least one second service, the identifier of the at least one second service corresponds to a second service type, and integrity protection does not need to be performed on data of a service whose type is the second service type; receiving a resource scheduling message from the first node; and determining, based on the resource scheduling message, that integrity protection is not to be enabled for the service corresponding to the identifier of the at least one second service.

It can be seen that services of different service types have different integrity protection requirements. The first node may determine, based on an identifier of a first service, whether to enable integrity protection. For example, an audio noise reduction service is a service having a relatively low security requirement such that integrity protection may not need to be performed on data of the audio noise reduction service, and therefore, a MAC length corresponding to the audio noise reduction service may not be determined.

In a possible implementation of the seventh aspect, the at least one service identifier includes an identifier of at least one first service, the identifier of the at least one first service corresponds to a first service type, and integrity protection needs to be performed on data of a service whose type is the first service type. The method further includes determining, based on the resource scheduling message, that integrity protection is to be enabled for the service corresponding to the identifier of the at least one first service.

In another possible implementation of the seventh aspect, the resource scheduling message is further used to indicate a length of a MAC for performing integrity protection on data of the at least one first service.

According to an eighth aspect, an embodiment of this application provides a communication apparatus including a receiving unit configured to receive an association request message from a second node, where the association request message includes information about a security algorithm supported by the second node; and a processing unit configured to determine a target security algorithm of a signaling plane and a target MAC length of the signaling plane according to a first algorithm selection policy, where the target security algorithm of the signaling plane belongs to a set of security algorithms indicated by the information about the security algorithm supported by the second node.

The processing unit is further configured to generate a first MAC by using the target security algorithm of the signaling plane, and a length of the first MAC is the target MAC length of the signaling plane.

In this embodiment of this application, the apparatus determines the target security algorithm of the signaling plane and the target MAC length of the signaling plane based on the information about the security algorithm supported by the second node and by using a preconfigured or predefined algorithm policy, and then uses the target MAC length of the signaling plane as a MAC length of a signaling message between a first node and the second node. In this way, different MAC lengths can be determined based on different policies configured in the apparatus, to improve flexibility of the MAC length. Further, an algorithm selection policy may be preconfigured or predefined based on a communication requirement of the first node. For example, an algorithm with relatively high security and a relatively long MAC length may be preferentially selected, to improve data security.

In a possible implementation of the eighth aspect, the processing unit is further configured to determine the target security algorithm of the signaling plane and the target MAC length of the signaling plane according to a first length selection policy and the first algorithm selection policy.

In another possible implementation of the eighth aspect, the processing unit is further configured to determine the target security algorithm of the signaling plane according to the first algorithm selection policy, where a MAC length corresponding to the target security algorithm of the signaling plane is the target MAC length of the signaling plane.

In another possible implementation of the eighth aspect, the apparatus further includes a sending unit configured to send a security context request message to the second node, where the security context request message includes the first MAC, information indicating the target security algorithm of the signaling plane, and the target MAC length of the signaling plane, and the first MAC is used to check integrity of the security context request message.

In another possible implementation of the eighth aspect, the apparatus further includes a sending unit configured to send a security context request message to the second node, where the security context request message includes the first MAC and information indicating the target security algorithm of the signaling plane, the first MAC is used to check integrity of the security context request message, and the first MAC is further used to indicate the target MAC length of the signaling plane.

In another possible implementation of the eighth aspect, the apparatus further includes a sending unit configured to send a security context request message to the second node. The security context request message includes the first MAC, information indicating the target security algorithm of the signaling plane, the target MAC length of the signaling plane, and first identity authentication information; the first MAC is used to check integrity of the security context request message; and the first identity authentication information is generated based on a shared key between a first node and the second node.

The receiving unit is further configured to receive a security context response message from the second node. The security context response message includes second identity authentication information and a second MAC, a length of the second MAC is the target MAC length of the signaling plane, the second identity authentication information is used to verify an identity of the second node, and the second MAC is used to check integrity of the security context response message.

The shared key is a secret value shared between the first node and the second node, and may be used to generate identity authentication information for verifying an identity of a node. It can be seen that the apparatus may generate the first identity authentication information by using the shared key, and the first identity authentication information is used by the second node to verify an identity of the first node. Correspondingly, the first node may also verify an identity of the second node by using the second identity authentication information. If an attacker wants to obtain the target security algorithm of the signaling plane or the target MAC length of the signaling plane by forging an identity of the second node, verification performed by the apparatus on the identity cannot succeed because the shared key cannot be forged. Therefore, it is avoided that the first node communicates with an untrusted node, and communication security of the first node is improved.

In another possible implementation of the eighth aspect, the security context request message further includes a target security algorithm of a user plane, and the processing unit is further configured to determine the target security algorithm of the user plane according to a second algorithm selection policy, where the target security algorithm of the user plane belongs to the set of security algorithms indicated by the information about the security algorithm supported by the second node.

In another possible implementation of the eighth aspect, the receiving unit is further configured to obtain an identifier of a first service and/or a data packet size of the first service.

The processing unit is further configured to determine a target MAC length of the user plane based on a MAC length supported by the target security algorithm of the user plane and at least one of the identifier of the first service and the data packet size of the first service. The target MAC length of the user plane is used to indicate a length of a MAC for performing integrity protection on data of the first service.

The sending unit is further configured to send a resource scheduling message to the second node, and the resource scheduling message includes the target MAC length of the user plane.

According to a ninth aspect, an embodiment of this application provides a communication apparatus including a sending unit configured to send an association request message to a first node, where the association request message includes information about a security algorithm supported by a second node; and a receiving unit configured to receive a security context request message from the first node, where the security context request message includes information used to indicate a target security algorithm of a signaling plane and information used to indicate a target MAC length of the signaling plane, the target security algorithm of the signaling plane and the target MAC length of the signaling plane correspond to a first algorithm selection policy, and the target security algorithm of the signaling plane belongs to a set of security algorithms indicated by the information about the security algorithm supported by the second node.

In this embodiment of this application, the apparatus sends, to the first node, the information about the security algorithm supported by the second node. The first node determines the target security algorithm of the signaling plane and the target MAC length of the signaling plane based on the information about the security algorithm supported by the second node and by using a preconfigured or predefined algorithm policy, and then uses the target MAC length of the signaling plane as a MAC length of a signaling message between the first node and the second node. In this way, different MAC lengths can be determined based on different policies configured in the apparatus, to improve flexibility of the MAC length. For example, an algorithm with relatively high security may be selected from algorithms supported by the second node, and a relatively long MAC length may further be selected, to improve data security.

In a possible implementation of the ninth aspect, the security context request message includes a first MAC, and a length of the first MAC is the target MAC length of the signaling plane. The apparatus further includes a processing unit configured to check integrity of the security context request message based on the first MAC by using the target security algorithm of the signaling plane.

In another possible implementation of the ninth aspect, the first MAC is the information used to indicate the target MAC length of the signaling plane.

In another possible implementation of the ninth aspect, the security context request message further includes first identity authentication information. The processing unit is further configured to perform verification on the first identity authentication information based on a shared key between the second node and the first node.

The processing unit is further configured to: if the check on the integrity of the security context request message succeeds and the verification on the first identity authentication information succeeds, generate a second MAC by using the target security algorithm of the signaling plane. A length of the second MAC is the target MAC length of the signaling plane.

The sending unit is further configured to send a security context response message to the first node. The security context response message includes the second MAC and second identity authentication information, and the second identity authentication information is generated based on the shared key between the second node and the first node.

In another possible implementation of the ninth aspect, the security context request message further includes information indicating a target security algorithm of a user plane, the target security algorithm of the user plane corresponds to a second algorithm selection policy, and the target security algorithm of the user plane belongs to the set of security algorithms indicated by the information about the security algorithm supported by the second node.

The receiving unit is further configured to receive a resource scheduling message from the first node. The resource scheduling message includes a target MAC length of the user plane, the target MAC length of the user plane corresponds to the target security algorithm of the user plane and at least one of an identifier of a first service and a data packet size of the first service, and the target MAC length of the user plane is used to indicate a length of a MAC for performing integrity protection on data of the first service.

According to a tenth aspect, an embodiment of this application provides a communication apparatus including a receiving unit configured to receive a service attribute report response message from a second node, where the service attribute report response message includes an identifier of a first service and/or a data packet size of the first service; and a processing unit configured to determine a target MAC length of a user plane based on a MAC length supported by a target security algorithm of the user plane and at least one of the identifier of the first service and the data packet size of the first service, where the target MAC length of the user plane is used to indicate a length of a MAC for performing integrity protection on data of the first service.

In this embodiment of this application, the apparatus determines the target MAC length of the user plane based on a MAC length supported by a security algorithm of the user plane, the identifier of the first service, and the data packet size of the first service, and then uses the target MAC length of the user plane as a MAC length of a message used to process the first service. In this way, different MAC lengths can be determined for different services or services of different data packet sizes, to improve flexibility of the MAC length. For a service with relatively high security, a relatively long MAC length may be used such that it is difficult to be cracked, and data security is improved. In addition, for some messages that do not have a high privacy requirement or have a relatively small data packet, a relatively short MAC length may be used, to avoid affecting communication efficiency and reduce resource consumption during network transmission.

In a possible implementation of the tenth aspect, the processing unit is further configured to determine, based on the MAC length supported by the target security algorithm of the user plane and a correspondence between the identifier of the first service and a MAC length, the MAC length corresponding to the identifier of the first service as the target MAC length of the user plane; or determine, based on the MAC length supported by the target security algorithm of the user plane and a correspondence between the data packet size of the first service and a MAC length, the MAC length corresponding to the data packet size of the first service as the target MAC length of the user plane.

In another possible implementation of the tenth aspect, the processing unit is further configured to determine a second length selection policy based on the identifier of the first service and/or the data packet size of the first service; and determine the target MAC length of the user plane based on the second length selection policy and the MAC length supported by the target security algorithm of the user plane.

In another possible implementation of the tenth aspect, the identifier of the first service corresponds to a first service type, and integrity protection needs to be performed on data of a service whose type is the first service type.

In another possible implementation of the tenth aspect, the apparatus further includes a sending unit configured to send a resource scheduling message to the second node, and the resource scheduling message includes the target MAC length of the user plane.

In another possible implementation of the tenth aspect, the processing unit is further configured to generate a third MAC by using the target security algorithm of the user plane, where a length of the third MAC is the target MAC length of the user plane, and the third MAC is used to perform integrity protection on the data of the first service.

In another possible implementation of the tenth aspect, the receiving unit is further configured to obtain information about a security algorithm supported by the second node.

The processing unit is further configured to determine a target security algorithm of a signaling plane and a target MAC length of the signaling plane according to a first algorithm selection policy. The target security algorithm of the signaling plane belongs to a set of security algorithms indicated by the information about the security algorithm supported by the second node.

The processing unit is further configured to generate a fourth MAC by using the target security algorithm of the signaling plane, and a length of the fourth MAC is the target MAC length of the signaling plane.

The sending unit is further configured to send a resource scheduling message to the second node. The resource scheduling message includes the fourth MAC and the target MAC length of the user plane, and the fourth MAC is used to perform integrity protection on the resource scheduling message.

In another possible implementation of the tenth aspect, the processing unit is further configured to determine the target security algorithm of the user plane according to a second algorithm selection policy, where the target security algorithm of the user plane belongs to the set of security algorithms indicated by the information about the security algorithm supported by the second node.

According to an eleventh aspect, an embodiment of this application provides a communication apparatus including a sending unit configured to send a service attribute report response message to a first node, where the service attribute report response message includes an identifier of a first service and/or a data packet size of the first service; and a receiving unit configured to receive a resource scheduling message from the first node, where the resource scheduling message includes a target MAC length of a user plane; the target MAC length of the user plane is a MAC length supported by a target security algorithm of the user plane, and the target MAC length of the user plane corresponds to at least one of the identifier of the first service and the data packet size of the first service; and the target MAC length of the user plane is used to indicate a length of a MAC for performing integrity protection on data of the first service.

In the embodiment, services of different service types have different integrity protection requirements. The apparatus 170 may determine, based on the identifier of the first service, whether to enable integrity protection. For example, an audio noise reduction service is a service having a relatively low security requirement such that integrity protection may not need to be performed on data of the audio noise reduction service.

In a possible implementation of the eleventh aspect, the identifier of the first service corresponds to a first service type, and integrity protection needs to be performed on data of a service whose type is the first service type.

In another possible implementation of the eleventh aspect, the target security algorithm of the user plane corresponds to a second algorithm selection policy, and the target security algorithm of the user plane belongs to a set of security algorithms indicated by information about a security algorithm supported by a second node.

In another possible implementation of the eleventh aspect, the resource scheduling message further includes a fourth MAC, and the processing unit is further configured to check message integrity of the resource scheduling message based on the fourth MAC by using the target security algorithm of the user plane.

According to a twelfth aspect, an embodiment of this application provides a communication apparatus including a sending unit configured to send a service attribute report response message to a first node, where the service attribute report response message includes an identifier of a first service and/or a data packet size of the first service; and a processing unit configured to determine a target MAC length of a user plane based on a MAC length supported by a target security algorithm of the user plane and at least one of the identifier of the first service and the data packet size of the first service, where the target MAC length of the user plane is used to indicate a length of a MAC for performing integrity protection on data of the first service.

A method for determining the target MAC length of the user plane that is the same as that in the first node is configured in the apparatus. Therefore, the apparatus may determine the target MAC length of the user plane based on a MAC length supported by a security algorithm of the user plane and the identifier of the first service and/or the data packet size of the first service, and then use the target MAC length of the user plane as a MAC length of a message used to process the first service. In this way, different MAC lengths can be determined for different services or services of different data packet sizes, to improve flexibility of the MAC length.

However, the same method for determining the target MAC length of the user plane is configured in both the apparatus and the first node such that the first node determines the target MAC length of the user plane in a specific manner, and therefore the apparatus also determines the target MAC length of the user plane in a same manner. In this way, a node does not need to send a target MAC length to a peer node, to save network resources.

In a possible implementation of the twelfth aspect, the processing unit is further configured to determine, based on the MAC length supported by the target security algorithm of the user plane and a correspondence between the ID of the first service and a MAC length, the MAC length corresponding to the ID of the first service as the target MAC length of the user plane; or determine, based on the MAC length supported by the target security algorithm of the user plane and a correspondence between the data packet size of the first service and a MAC length, the MAC length corresponding to the data packet size of the first service as the target MAC length of the user plane.

In another possible implementation of the twelfth aspect, the processing unit is further configured to determine a second length selection policy based on the ID of the first service and/or the data packet size of the first service; and determine the target MAC length of the user plane based on the second length selection policy and the MAC length supported by the target security algorithm of the user plane.

In another possible implementation of the twelfth aspect, the identifier of the first service corresponds to a first service type, and integrity protection needs to be performed on data of a service whose type is the first service type.

In another possible implementation of the twelfth aspect, the target security algorithm of the user plane corresponds to a second algorithm selection policy, and the target security algorithm of the user plane belongs to a set of security algorithms indicated by information about a security algorithm supported by a second node.

According to a thirteenth aspect, an embodiment of this application provides a communication apparatus including a receiving unit configured to receive a service attribute report response message from a second node, where the service attribute report response message includes at least one service identifier, the at least one service identifier includes an identifier of at least one second service, the identifier of the at least one second service corresponds to a second service type, and integrity protection does not need to be performed on data of a service whose type is the second service type; and a sending unit configured to send a resource scheduling message to the second node, where the resource scheduling message is used to indicate that integrity protection is not to be enabled for the service corresponding to the identifier of the at least one second service.

It can be seen that services of different service types have different integrity protection requirements. The apparatus may determine, based on an identifier of a first service, whether to enable integrity protection. For example, an audio noise reduction service is a service having a relatively low security requirement such that integrity protection may not need to be performed on data of the audio noise reduction service, and therefore, a MAC length corresponding to the audio noise reduction service may not be determined.

In a possible implementation of the thirteenth aspect, the at least one service identifier includes an identifier of at least one first service, the identifier of the at least one first service corresponds to a first service type, and integrity protection needs to be performed on data of a service whose type is the first service type.

In another possible implementation of the thirteenth aspect, the resource scheduling message is further used to indicate a target MAC length of a user plane that is used for the at least one first service.

According to a fourteenth aspect, an embodiment of this application provides a communication apparatus including a sending unit configured to send a service attribute report response message to a first node, where the service attribute report response message includes at least one service identifier, the at least one service identifier includes an identifier of at least one second service, the identifier of the at least one second service corresponds to a second service type, and integrity protection does not need to be performed on data of a service whose type is the second service type; a receiving unit configured to receive a resource scheduling message from the first node; and a processing unit configured to determine, based on the resource scheduling message, that integrity protection is not to be enabled for the service corresponding to the identifier of the at least one second service.

It can be seen that services of different service types have different integrity protection requirements. The first node may determine, based on an identifier of a first service, whether to enable integrity protection. For example, an audio noise reduction service is a service having a relatively low security requirement such that integrity protection may not need to be performed on data of the audio noise reduction service, and therefore, a MAC length corresponding to the audio noise reduction service may not be determined.

In a possible implementation of the fourteenth aspect, the at least one service identifier includes an identifier of at least one first service, the identifier of the at least one first service corresponds to a first service type, and integrity protection needs to be performed on data of a service whose type is the first service type.

The processing unit is further configured to determine, based on the resource scheduling message, that integrity protection is to be enabled for the service corresponding to the identifier of the at least one first service.

In another possible implementation of the fourteenth aspect, the resource scheduling message is further used to indicate a length of a MAC for performing integrity protection on data of the at least one first service.

According to a fifteenth aspect, embodiments of this application further provide a communication method including receiving an association request message from a second node, where the association request message includes information about a security algorithm supported by the second node and an identity of the second node; determining a target security algorithm of a signaling plane and a target MAC length of the signaling plane according to a first algorithm selection policy, where the target security algorithm of the signaling plane belongs to a set of security algorithms indicated by the information about the security algorithm supported by the second node; determining a target security algorithm of a user plane and a target MAC length of the user plane based on a second algorithm selection policy and the identity of the second node, where the target security algorithm of the user plane belongs to the set of security algorithms indicated by the information about the security algorithm supported by the second node, and the target MAC length of the user plane is used to indicate a length of a MAC for performing integrity protection on data of a first service; and generating a first MAC by using the target security algorithm of the signaling plane, where a length of the first MAC is the target MAC length of the signaling plane.

In embodiments of this application, different policies may be configured in a first node to determine different MAC lengths, to improve flexibility of the MAC length. Further, the first node may determine the target security algorithm of the user plane and the target MAC of the user plane based on the identity of the second node, to meet requirements of different types of nodes for MAC lengths. For example, some nodes that process important services may use a relatively long MAC length to improve security. For another example, some assistant nodes or ordinary nodes may use a relatively short MAC length to reduce resource consumption and improve communication efficiency.

In a possible implementation of the fifteenth aspect, determining a target security algorithm of a signaling plane and a target MAC length of the signaling plane according to a first algorithm selection policy includes determining the target security algorithm of the signaling plane and the target MAC length of the signaling plane according to a first length selection policy and the first algorithm selection policy.

In another possible implementation of the fifteenth aspect, determining a target security algorithm of a signaling plane and a target MAC length of the signaling plane according to a first algorithm selection policy includes determining the target security algorithm of the signaling plane according to the first algorithm selection policy; and determining the target MAC length of the signaling plane according to the first length selection policy and the target security algorithm of the signaling plane.

In another possible implementation of the fifteenth aspect, determining a target security algorithm of a signaling plane and a target MAC length of the signaling plane according to a first algorithm selection policy includes determining the target security algorithm of the signaling plane according to the first algorithm selection policy, where a MAC length corresponding to the target security algorithm of the signaling plane is the target MAC length of the signaling plane.

In another possible implementation of the fifteenth aspect, determining a target security algorithm of a user plane and a target MAC length of the user plane based on a second algorithm selection policy and the identity of the second node includes determining the target security algorithm of the user plane according to the second algorithm selection policy; determining a second length selection policy based on the identity of the second node; and determining the target MAC length of the signaling plane based on the second length selection policy and the target security algorithm of the user plane.

In another possible implementation of the fifteenth aspect, determining a target security algorithm of a user plane and a target MAC length of the user plane based on a second algorithm selection policy and the identity of the second node includes determining the target security algorithm of the user plane according to the second algorithm selection policy; and determining, based on a MAC length supported by the target security algorithm of the user plane and a correspondence between the identity of the second node and a MAC length, the MAC length corresponding to the identity of the second node as the target MAC length of the user plane.

In another possible implementation of the fifteenth aspect, the method further includes sending a security context request message to the second node, where the security context request message includes a first MAC, information indicating the target security algorithm of the signaling plane, information indicating the target security algorithm of the user plane, the target MAC length of the signaling plane, and the target MAC length of the user plane, and the first MAC is used to check integrity of the security context request message.

In another possible implementation of the fifteenth aspect, the method further includes sending a security context request message to the second node, where the security context request message includes a first MAC, information indicating the target security algorithm of the signaling plane, information indicating the target security algorithm of the user plane, the target MAC length of the signaling plane, the target MAC length of the user plane, and first identity authentication information, the first MAC is used to check integrity of the security context request message, and the first identity authentication information is generated based on a shared key between the first node and the second node; and receiving a security context response message from the second node, where the security context response message includes second identity authentication information and a second MAC, a length of the second MAC is the target MAC length of the signaling plane, the second identity authentication information is used to verify an identity of the second node, and the second MAC is used to check integrity of the security context response message.

In another possible implementation of the fifteenth aspect, the method further includes checking the integrity of the security context response message based on the target security algorithm of the signaling plane and the second MAC; performing verification on the second identity authentication information based on the shared key; and sending an association establishment message to the second node if the check on the integrity of the security context response message succeeds and the verification on the second identity authentication information succeeds, where the association establishment message indicates the second node to establish an association with the first node.

According to a sixteenth aspect, embodiments of this application further provide a communication method including sending an association request message to a first node, where the association request message includes information about a security algorithm supported by a second node and an identity of the second node; receiving a security context request message from the first node, where the security context request message includes information used to indicate a target security algorithm of a signaling plane, information used to indicate a target security algorithm of a user plane, a target MAC length of the signaling plane, a target MAC length of the user plane, and a first MAC; the target security algorithm of the signaling plane and the target MAC length of the signaling plane correspond to a first algorithm selection policy, and the target security algorithm of the signaling plane belongs to a set of security algorithms indicated by the information about the security algorithm supported by the second node; the target security algorithm of the user plane and the target MAC length of the user plane correspond to a second algorithm selection policy and the identity of the second node, and the target security algorithm of the user plane belongs to the set of security algorithms indicated by the information about the security algorithm supported by the second node; and a length of the first MAC is the target MAC length of the signaling plane; and checking integrity of the security context request message based on the first MAC by using the target security algorithm of the signaling plane.

In embodiments of this application, different policies may be configured in the first node to determine different MAC lengths, to improve flexibility of the MAC length. Further, the first node may determine the target security algorithm of the user plane and the target MAC of the user plane based on the identity of the second node, to meet requirements of different types of nodes for MAC lengths. The second node obtains the target MAC length from the first node, and protects message integrity by using the target MAC length. For example, some nodes that process important services may use a relatively long MAC length to improve security. For another example, some assistant nodes or ordinary nodes may use a relatively short MAC length to reduce resource consumption and improve communication efficiency.

In a possible implementation of the sixteenth aspect, the target security algorithm of the signaling plane and the target MAC length of the signaling plane are determined according to the first algorithm selection policy, the target security algorithm of the signaling plane belongs to the set of security algorithms indicated by the information about the security algorithm supported by the second node, and the first MAC is generated according to the target security algorithm of the signaling plane.

In another possible implementation of the sixteenth aspect, the target security algorithm of the user plane and the target MAC length of the user plane are determined according to the second algorithm selection policy, the target security algorithm of the user plane belongs to the set of security algorithms indicated by the information about the security algorithm supported by the second node, and the first MAC is generated according to the target security algorithm of the signaling plane.

In another possible implementation of the sixteenth aspect, the security context request message further includes first identity authentication information. The method further includes performing verification on the first identity authentication information based on a shared key between the second node and the first node; if the check on the integrity of the security context request message succeeds and the verification on the first identity authentication information succeeds, generating a second MAC by using the target security algorithm of the signaling plane, where a length of the second MAC is the target MAC length of the signaling plane; and sending a security context response message to the first node, where the security context response message includes the second MAC and second identity authentication information, and the second identity authentication information is generated based on the shared key between the second node and the first node.

In another possible implementation of the sixteenth aspect, the method further includes receiving an association establishment message from the first node. The association establishment message indicates the second node to establish an association with the first node.

According to a seventeenth aspect, embodiments of this application further provide a communication apparatus including a receiving unit configured to receive an association request message from a second node, where the association request message includes information about a security algorithm supported by the second node and an identity of the second node; and a processing unit configured to determine a target security algorithm of a signaling plane and a target MAC length of the signaling plane according to a first algorithm selection policy, where the target security algorithm of the signaling plane belongs to a set of security algorithms indicated by the information about the security algorithm supported by the second node.

The processing unit is further configured to determine a target security algorithm of a user plane and a target MAC length of the user plane based on a second algorithm selection policy and the identity of the second node. The target security algorithm of the user plane belongs to the set of security algorithms indicated by the information about the security algorithm supported by the second node, and the target MAC length of the user plane is used to indicate a length of a MAC for performing integrity protection on data of a first service.

The processing unit is further configured to generate a first MAC by using the target security algorithm of the signaling plane, and a length of the first MAC is the target MAC length of the signaling plane.

In embodiments of this application, different policies may be configured in the apparatus to determine different MAC lengths, to improve flexibility of the MAC length. Further, the apparatus may determine the target security algorithm of the user plane and the target MAC of the user plane based on the identity of the second node, to meet requirements of different types of nodes for MAC lengths. For example, some nodes that process important services may use a relatively long MAC length to improve security. For another example, some assistant nodes or ordinary nodes may use a relatively short MAC length to reduce resource consumption and improve communication efficiency.

In a possible implementation of the seventeenth aspect, the processing unit is further configured to determine the target security algorithm of the signaling plane and the target MAC length of the signaling plane according to a first length selection policy and the first algorithm selection policy.

In another possible implementation of the seventeenth aspect, the processing unit is further configured to determine the target security algorithm of the signaling plane according to the first algorithm selection policy; and determine the target MAC length of the signaling plane according to the first length selection policy and the target security algorithm of the signaling plane.

In another possible implementation of the seventeenth aspect, the processing unit is further configured to determine the target security algorithm of the signaling plane according to the first algorithm selection policy, where a MAC length corresponding to the target security algorithm of the signaling plane is the target MAC length of the signaling plane.

In another possible implementation of the seventeenth aspect, the processing unit is further configured to determine the target security algorithm of the user plane according to the second algorithm selection policy; determine a second length selection policy based on the identity of the second node; and determine the target MAC length of the signaling plane based on the second length selection policy and the target security algorithm of the user plane.

In another possible implementation of the seventeenth aspect, the processing unit is further configured to determine the target security algorithm of the user plane according to the second algorithm selection policy; and determine, based on a MAC length supported by the target security algorithm of the user plane and a correspondence between the identity of the second node and a MAC length, the MAC length corresponding to the identity of the second node as the target MAC length of the user plane.

In another possible implementation of the seventeenth aspect, the apparatus further includes a sending unit. The sending unit is configured to send a security context request message to the second node. The security context request message includes a first MAC, information indicating the target security algorithm of the signaling plane, information indicating the target security algorithm of the user plane, the target MAC length of the signaling plane, and the target MAC length of the user plane, and the first MAC is used to check integrity of the security context request message.

In another possible implementation of the seventeenth aspect, the apparatus further includes a sending unit. The sending unit is configured to send a security context request message to the second node. The security context request message includes a first MAC, information indicating the target security algorithm of the signaling plane, information indicating the target security algorithm of the user plane, the target MAC length of the signaling plane, the target MAC length of the user plane, and first identity authentication information. The first MAC is used to check integrity of the security context request message, and the first identity authentication information is generated based on a shared key between the first node and the second node.

The receiving unit is further configured to receive a security context response message from the second node. The security context response message includes second identity authentication information and a second MAC, a length of the second MAC is the target MAC length of the signaling plane, the second identity authentication information is used to verify an identity of the second node, and the second MAC is used to check integrity of the security context response message.

In another possible implementation of the seventeenth aspect, the processing unit is further configured to check the integrity of the security context response message based on the target security algorithm of the signaling plane and the second MAC.

The processing unit is further configured to perform verification on the second identity authentication information based on the shared key.

The sending unit is further configured to send an association establishment message to the second node if the check on the integrity of the security context response message succeeds and the verification on the second identity authentication information succeeds. The association establishment message indicates the second node to establish an association with the first node.

According to an eighteenth aspect, embodiments of this application further provide a communication apparatus including a sending unit configured to send an association request message to a first node, where the association request message includes information about a security algorithm supported by a second node and an identity of the second node; a receiving unit, configured to receive a security context request message from the first node, where the security context request message includes information used to indicate a target security algorithm of a signaling plane, information used to indicate a target security algorithm of a user plane, a target MAC length of the signaling plane, a target MAC length of the user plane, and a first MAC; the target security algorithm of the signaling plane and the target MAC length of the signaling plane correspond to a first algorithm selection policy, and the target security algorithm of the signaling plane belongs to a set of security algorithms indicated by the information about the security algorithm supported by the second node; the target security algorithm of the user plane and the target MAC length of the user plane correspond to a second algorithm selection policy and the identity of the second node, and the target security algorithm of the user plane belongs to the set of security algorithms indicated by the information about the security algorithm supported by the second node; and a length of the first MAC is the target MAC length of the signaling plane; and a processing unit configured to check integrity of the security context request message based on the first MAC by using the target security algorithm of the signaling plane.

In embodiments of this application, different policies may be configured in the first node to determine different MAC lengths, to improve flexibility of the MAC length. Further, the first node may determine the target security algorithm of the user plane and the target MAC of the user plane based on the identity of the second node, to meet requirements of different types of nodes for MAC lengths. The apparatus obtains the target MAC length from the first node, and protects message integrity by using the target MAC length. For example, some nodes that process important services may use a relatively long MAC length to improve security. For another example, some assistant nodes or ordinary nodes may use a relatively short MAC length to reduce resource consumption and improve communication efficiency.

In a possible implementation of the eighteenth aspect, the target security algorithm of the signaling plane and the target MAC length of the signaling plane are determined according to the first algorithm selection policy, the target security algorithm of the signaling plane belongs to the set of security algorithms indicated by the information about the security algorithm supported by the second node, and the first MAC is generated according to the target security algorithm of the signaling plane.

In another possible implementation of the eighteenth aspect, the target security algorithm of the user plane and the target MAC length of the user plane are determined according to the second algorithm selection policy, the target security algorithm of the user plane belongs to the set of security algorithms indicated by the information about the security algorithm supported by the second node, and the first MAC is generated according to the target security algorithm of the signaling plane.

In another possible implementation of the eighteenth aspect, the security context request message further includes first identity authentication information. The processing unit is further configured to perform verification on the first identity authentication information based on a shared key between the second node and the first node; and if the check on the integrity of the security context request message succeeds and the verification on the first identity authentication information succeeds, generate a second MAC by using the target security algorithm of the signaling plane, where a length of the second MAC is the target MAC length of the signaling plane.

The receiving unit is further configured to send a security context response message to the first node. The security context response message includes the second MAC and second identity authentication information, and the second identity authentication information is generated based on the shared key between the second node and the first node.

In another possible implementation of the eighteenth aspect, the receiving unit is further configured to receive an association establishment message from the first node. The association establishment message indicates the second node to establish an association with the first node.

According to a nineteenth aspect, embodiments of this application further provide a communication apparatus. The apparatus includes at least one processor and a communications interface, and the at least one processor is configured to invoke a computer program stored in at least one memory such that the apparatus implements the method described in any one of the first aspect or the possible implementations of the first aspect, or the method described in any one of the third aspect or the possible implementations of the third aspect, or the method described in any one of the sixth aspect or the possible implementations of the sixth aspect, or the method described in any one of the fifteenth aspect or the possible implementations of the fifteenth aspect.

According to a twentieth aspect, embodiments of this application further provide a communication apparatus. The apparatus includes at least one processor and a communications interface, and the at least one processor is configured to invoke a computer program stored in at least one memory such that the apparatus implements the method described in any one of the second aspect or the possible implementations of the second aspect, or the method described in any one of the fourth aspect or the possible implementations of the fourth aspect, or the method described in any one of the fifth aspect or the possible implementations of the fifth aspect, or the method described in any one of the seventh aspect or the possible implementations of the seventh aspect, or the method described in any one of the sixteenth aspect or the possible implementations of the sixteenth aspect.

According to a twenty-first aspect, embodiments of this application further provide a communications system. The communications system includes a first node and a second node. The first node includes the apparatus described in any one of the eighth aspect or the possible implementations of the eighth aspect. The second node includes the apparatus described in any one of the ninth aspect or the possible implementations of the ninth aspect.

According to a twenty-second aspect, embodiments of this application further provide a communications system. The communications system includes a first node and a second node. The first node includes the apparatus described in any one of the tenth aspect or the possible implementations of the tenth aspect. The second node includes the apparatus described in any one of the eleventh aspect or the possible implementations of the eleventh aspect.

According to a twenty-third aspect, embodiments of this application further provide a communications system. The communications system includes a first node and a second node. The first node includes the apparatus described in any one of the tenth aspect or the possible implementations of the tenth aspect. The second node includes the apparatus described in any one of the twelfth aspect or the possible implementations of the twelfth aspect.

According to a twenty-fourth aspect, embodiments of this application further provide a communications system. The communications system includes a first node and a second node. The first node includes the apparatus described in any one of the thirteenth aspect or the possible implementations of the thirteenth aspect. The second node includes the apparatus described in any one of the fourteenth aspect or the possible implementations of the fourteenth aspect.

According to a twenty-fifth aspect, embodiments of this application further provide a communications system. The communications system includes a first node and a second node. The first node includes the apparatus described in any one of the seventeenth aspect or the possible implementations of the seventeenth aspect. The second node includes the apparatus described in any one of the eighteenth aspect or the possible implementations of the eighteenth aspect.

According to a twenty-sixth aspect, an embodiment of this application discloses a computer-readable storage medium. The computer-readable storage medium stores a computer program. When the computer program is run on one or more processors, the method described in any one of the first aspect or the possible implementations of the first aspect is performed, or the method described in any one of the third aspect or the possible implementations of the third aspect is performed, or the method described in any one of the sixth aspect or the possible implementations of the sixth aspect is performed, or the method described in any one of the fifteenth aspect or the possible implementations of the fifteenth aspect is performed.

According to a twenty-seventh aspect, an embodiment of this application discloses a computer-readable storage medium. The computer-readable storage medium stores a computer program. When the computer program is run on one or more processors, the method described in any one of the second aspect or the possible implementations of the second aspect is performed, or the method described in any one of the fourth aspect or the possible implementations of the fourth aspect is performed, or the method described in any one of the fifth aspect or the possible implementations of the fifth aspect is performed, or the method described in any one of the seventh aspect or the possible implementations of the seventh aspect is performed, or the method described in any one of the sixteenth aspect or the possible implementations of the sixteenth aspect is performed.

According to a twenty-eighth aspect, an embodiment of this application discloses a chip system. The chip system includes at least one processor and a communications interface, and the at least one processor is configured to invoke a computer program stored in at least one memory, so that an apparatus in which the chip system is located implements the method described in any one of the first aspect or the possible implementations of the first aspect, or the method described in any one of the third aspect or the possible implementations of the third aspect, or the method described in any one of the sixth aspect or the possible implementations of the sixth aspect, or the method described in any one of the fifteenth aspect or the possible implementations of the fifteenth aspect.

According to a twenty-ninth aspect, an embodiment of this application discloses a chip system. The chip system includes at least one processor and a communications interface, and the at least one processor is configured to invoke a computer program stored in at least one memory, so that an apparatus in which the chip system is located implements the method described in any one of the second aspect or the possible implementations of the second aspect, or the method described in any one of the fourth aspect or the possible implementations of the fourth aspect, or the method described in any one of the fifth aspect or the possible implementations of the fifth aspect, or the method described in any one of the seventh aspect or the possible implementations of the seventh aspect, or the method described in any one of the sixteenth aspect or the possible implementations of the sixteenth aspect.

According to a thirtieth aspect, embodiments of this application further provide a smart cockpit product. The smart cockpit product includes a first node (for example, a vehicle cockpit domain controller (CDC)). The first node includes the apparatus described in any one of the first aspect or the possible implementations of the first aspect, or the apparatus described in any one of the third aspect or the possible implementations of the third aspect, or the apparatus described in any one of the sixth aspect or the possible implementations of the sixth aspect, or the method described in any one of the fifteenth aspect or the possible implementations of the fifteenth aspect.

Further, the smart cockpit product further includes a second node (for example, at least one of modules such as a camera, a screen, a microphone, a speaker, a radar, an electronic key, and a passive entry passive start system controller). The second node includes the apparatus described in any one of the second aspect or the possible implementations of the second aspect, or the apparatus described in any one of the fourth aspect or the possible implementations of the fourth aspect, or the apparatus described in any one of the fifth aspect or the possible implementations of the fifth aspect, or the apparatus described in any one of the seventh aspect or the possible implementations of the seventh aspect, or the method described in any one of the sixteenth aspect or the possible implementations of the sixteenth aspect.

According to a thirty-first aspect, embodiments of this application further provide a vehicle. The vehicle includes a first node (for example, a vehicle CDC). The first node includes the apparatus described in any one of the first aspect or the possible implementations of the first aspect, or the apparatus described in any one of the third aspect or the possible implementations of the third aspect, or the apparatus described in any one of the sixth aspect or the possible implementations of the sixth aspect, or the method described in any one of the fifteenth aspect or the possible implementations of the fifteenth aspect.

Further, the vehicle further includes a second node (for example, at least one of modules such as a camera, a screen, a microphone, a speaker, a radar, an electronic key, and a passive entry passive start system controller). The second node includes the apparatus described in any one of the second aspect or the possible implementations of the second aspect, or the apparatus described in any one of the fourth aspect or the possible implementations of the fourth aspect, or the apparatus described in any one of the fifth aspect or the possible implementations of the fifth aspect, or the apparatus described in any one of the seventh aspect or the possible implementations of the seventh aspect, or the method described in any one of the sixteenth aspect or the possible implementations of the sixteenth aspect.

BRIEF DESCRIPTION OF DRAWINGS

The following describes the accompanying drawings used in embodiments of this application.

FIG. 4 is a schematic diagram of an algorithm selection policy according to an embodiment of this application;

FIG. 7 is another schematic diagram of determining a target MAC length of a signaling plane according to an embodiment of this application;

DESCRIPTION OF EMBODIMENTS

Figure 1:
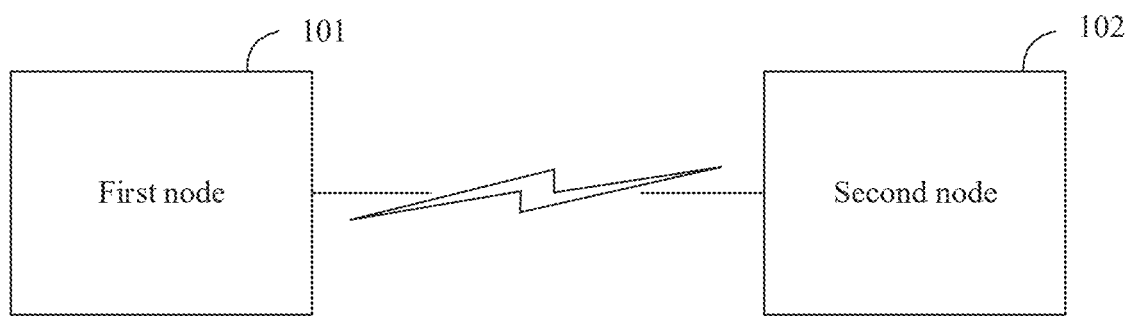
FIG. 1 is a schematic diagram of an architecture of a communications system according to an embodiment of this application.

The following describes embodiments of this application with reference to the accompanying drawings in embodiments of this application. It should be noted that in this application, the word such as "example" or "for example" is used to represent giving an example, an illustration, or a description. Any embodiment or design solution described by using "example" or "for example" in this application shall not be construed as being more preferred or more advantageous than another embodiment or design solution. Use of the word such as "example" or "for example" is intended to present a related concept in a specific manner.

The following first briefly describes related technologies and technical terms in this application for ease of understanding.

1. Node

A node is an electronic device with a data receiving and sending capability. For example, the node may be a vehicle cockpit domain device, or a module (one or more of modules such as a CDC, a camera, a screen, a microphone, a speaker, an electronic key, and a passive entry passive start system controller) in the vehicle cockpit domain device. In a specific implementation process, the node may be a data transit device, such as a router, a repeater, a bridge, or a switch; or may be a terminal device, such as various types of user equipment (UE), a mobile phone, a tablet computer (pad), a desktop computer, a headset, or a speaker; or may include a machine intelligent device, such as a self-driving device, a transportation safety device, a virtual reality (VR) terminal device, an augmented reality (AR) terminal device, a machine type communication (MTC) device, an industrial control device, a telemedicine (remote medical) device, a smart grid device, or a smart city device; or may include a wearable device (such as a smartwatch, a smart band, or a pedometer) or the like. In some technical scenarios, a name of a device with a similar data receiving and sending capability may not be "node". However, for ease of description, electronic devices with data receiving and sending capabilities are collectively referred to as nodes in embodiments of this application.

2. MAC

A MAC is a verification mechanism used by both communication entities in cryptography. It is a tool for ensuring message integrity. Before sending a message, a sender first calculates a MAC by using an integrity protection algorithm (or further using a key) negotiated by both communication parties. Then, the MAC and data are sent together. After receiving a packet, a receiver uses the same integrity protection algorithm (or further uses a key) as the sender to calculate a MAC, and compares the calculated MAC with the received MAC. If they are the same, message integrity check succeeds.

For example, in a LTE system, an integrity protection function of LTE is located at a Packet Data Convergence Protocol (PDCP) layer, and a node at a transmitting end may perform integrity protection on a header and a data part of a PDCP protocol data unit (PDU). Specifically, the node at the transmitting end calculates a 32-bit (bit) message authentication code for integrity (MAC-I) by using an integrity protection algorithm configured at an upper protocol layer and using at least one of parameters such as a key, a COUNT value, a radio bearer identifier, DIRECTION, and a message as an input parameter, and then puts the 32-bit message authentication code for integrity into a MAC-I domain of the PDCP PDU. After receiving the message, a node at a receiving end calculates, by using the same method, an authentication code (XMAC-I) expected by the message, and then performs integrity check by comparing the XMAC-I with the MAC-I. If the MAC-I is equal to the XMAC-I, the receiving end determines that the integrity check succeeds; or if the MAC-I is not equal to the XMAC-I, the receiving end determines that the integrity check fails.

3. Integrity Protection Algorithm

A MAC may be generated by using an integrity protection algorithm, and the integrity protection algorithm may alternatively be referred to as a MAC algorithm, an integrity protection algorithm, or the like. Optionally, the integrity protection algorithm may be implemented by using another encryption algorithm. For example, an integrity protection algorithm implemented by using a hash algorithm is referred to as a hash-based message authentication code (HMAC) algorithm. The hash algorithm may be one of message-digest (MD) 5, secure hash algorithm (SHA)-1, SHA-256, and the like. These different HMAC implementations are usually marked as HMAC-MD5, HMAC-SHA1, HMAC-SHA256, and the like. For another example, a MAC algorithm implemented based on a block cipher algorithm may be referred to as a cipher-based message authentication code (CMAC) algorithm, and the block cipher algorithm may be an AES. Because there are four working modes for block encryption: electronic code book (ECB), cipher block chaining (CBC), cipher feedback mode (CFB), and output feedback mode (OFB), integrity protection algorithms implemented based on block encryption algorithms in different working modes may be referred to as an ECB-MAC algorithm, a CBC-MAC algorithm, and the like. Further, a one-key message authentication code (One-key CBC-MAC, OMAC) is obtained by improving the CBC-MAC algorithm, and was listed as a recommended standard by the National Institute of Standards and Technology (NIST) in 2005.

In addition, the integrity protection algorithm may further include a Galois message authentication code (GMAC), a ZUC cipher algorithm (such as ZUC128 and ZUC256), and a MD algorithm (such as MD2, MD4, or MD5). Further, a cipher algorithm may further include a rapid amplification of cDNA end (RACE) integrity primitives evaluation message digest (RIPEMD) algorithm.

In addition, the integrity protection algorithm may combine two or more algorithms so that the other can continue to protect the message integrity even if it is found that one of the algorithms is vulnerable. For example, in transport layer security (TLS), input data is divided into two half parts, the two half parts are respectively processed by using different integrity protection algorithms (MD5 and SHA-1), and then the two processed parts are XORed, to obtain a MAC.

An integrity protection algorithm may be used to generate a MAC of at least one length. Table 1 shows information about a length of a MAC generated by using a possible MAC algorithm provided in embodiments of this application. It can be seen that a MAC generated by using the CMAC algorithm usually supports a 128-bit, 64-bit, or 32-bit cipher block; lengths of MACs generated by using the GMAC may be 32 bits to 128 bits; and the HMAC may be used for generating digests of a plurality of lengths as MACs.

TABLE 1

Lengths of MACs generated by using different integrity protection algorithms

| Algorithm | Length of a MAC |
|---|---|
| CMAC | Determined by a length of a password generated by using a corresponding block cipher algorithm, and usually 128 bits, 64 bits, or 32 bits |
| GMAC | 32 bits to 128 bits |
| HMAC | Determined by a length of a digest generated by using a corresponding hash algorithm, and usually 256 bits or 128 bits |
| ZUC128 | 32 bits |
| ZUC256 | 32 bits, 64 bits, or 128 bits |

In some specific scenarios, by using an authenticated encryption algorithm, for a given original text, data may be encrypted, and a message authentication code may also be generated. Therefore, it may also be considered that integrity protection is performed on a message in a process of performing authentication and encryption on the message. For example, an AES algorithm based on GMAC (AES-Galois/Counter Mode, AES-GCM), an AES algorithm based on CMAC/Counter Mode (AES-CMAC/Counter Mode, AES-CCM), and the like may be used to perform authentication and encryption on a message, and a MAC can be generated in a process of performing authentication and encryption to protect integrity of the message. Optionally, for a length of a MAC generated by using different authenticated encryption algorithms, refer to a length of a MAC generated by using an integrity protection algorithm. For example, for a length of a MAC generated based on the AES-GCM algorithm, refer to a length of a MAC generated by using the GMAC.

4. Shared Key (SK)

In a communication process, data is transmitted between communication nodes. If data needs to be kept confidential, the data needs to be encrypted by using a key. A shared key is a same secret value stored in nodes of both communication parties. The shared key may be predefined or preconfigured in the nodes of both the communication parties, or may be generated by both the communication parties by using a same key obtaining method, or may be sent by a trusted device (such as a key distribution center (KDC)) to a first node and a second node.

For example, a cockpit domain controller (CDC) of a vehicle and a vehicle-mounted radar device are two nodes that can communicate with each other. When deploying the CDC and the vehicle-mounted radar, a worker of an automobile factory has preconfigured a shared key between the CDC and the vehicle-mounted radar. By using the shared key, security of communication between the CDC of the vehicle and the vehicle-mounted radar can be ensured.

For another example, a CDC and a mobile phone of a vehicle owner are two nodes that can communicate with each other. When the vehicle owner needs to be associated with the CDC of a vehicle by using the mobile phone, the vehicle owner may obtain a shared key by using a key obtaining method, for example, the shared key is generated by exchanging key agreement algorithm parameters between the mobile phone and the CDC of the vehicle by using a key agreement algorithm. When the mobile phone subsequently requests again to associate with the CDC of the vehicle, the shared key may be used to verify identities of the two nodes.

5. Key Derivation

Key derivation is a process of deriving one or more secret values from one secret value. An algorithm used to derive a key is referred to as a key derivation function (KDF), and is also referred to as a key derivation algorithm. For example, a new secret value DK derived from a secret value Key may be represented as follows: DK=KDF (Key).

Common key derivation algorithms include a password-based key derivation function (PBKDF), a scrypt algorithm, and the like. PBKDF algorithms further include a first-generation PBKDF1 and a second-generation PBKDF2. Optionally, during specific implementation, in a key derivation process, a hash algorithm may be used to perform hash change on an entered secret value. Therefore, in a KDF, an algorithm identifier may be further received as an input, to indicate a specific hash algorithm to be used.

6. Signaling Plane and User Plane

In a communications system, a user plane and a control plane usually exist. With the emergence of a software-defined networking (SDN) technology, control plane and user plane (CU) separation gradually becomes a development direction of the communications system. The control plane is also referred to as a signaling plane or a control plane, and is usually used to transmit control signaling. For ease of description, a "signaling plane" is uniformly used for description in embodiments of this application. The user plane is also referred to as a data plane, and is usually used to transmit user data. For ease of description, a "user plane" is uniformly used for description in embodiments of this application.

For example, in a voice call process, the control plane is used to transmit signaling used to control call procedure establishment, maintenance, and release, and the user plane is used to transmit voice data.

In some specific application scenarios, network transmission is divided into a radio network layer and a transport network layer. A user plane at the radio network layer is a circuit switched (CS) domain service (such as voice coding and video coding) or a packet data packet (Packet Switching (PS) Domain) service, namely, true user data. A control plane at the radio network layer includes one or more of a radio access network application part (RANAP), a radio network subsystem application part (RNSAP) protocol, a NodeB application part NBAP) protocol, and the like, and is used to control signaling of a call process. The transport network layer is a bottom-layer bearer. Therefore, a user plane at the transport network layer includes both user data and signaling data. In other words, messages of the radio network layer (the control plane and the user plane) are user plane messages of the transport network layer, and are carried by the transport network layer for sending/receiving. The control plane at the transport network layer is an independent control plane, is located only at the transport network layer, and is used to set up transport bearers for user plane data of the radio network layer (creating, maintaining, and releasing asynchronous transfer mode adaptation layer (AAL2) connections).

In addition, it should be noted that "authentication", "check", and "verification" mentioned in embodiments of this application may mean whether check is correct or reasonable. In embodiments of this application, "association" indicates a process in which a first node establishes a connection to a second node. In some specific technical scenarios, "association" may alternatively be described as "access".

The following describes a system architecture and a service scenario in embodiments of this application. It should be noted that the system architecture and the service scenario described in this application are intended to describe the technical solutions in this application more clearly, and do not constitute a limitation on the technical solutions provided in this application. A person of ordinary skill in the art may know that with evolution of the system architecture and emergence of new service scenarios, the technical solutions provided in this application are also applicable to similar technical problems.

FIG. 1 is a schematic diagram of an architecture of a communications system according to an embodiment of this application. The communications system includes a first node 101 and a second node 102. The second node 202 may request to associate with the first node 101. After the association succeeds, the first node 101 may communicate with the second node 102 via a data link. Optionally, the data link used for communication between the first node 101 and the second node 102 may include various types of connection media, for example, may be a short-distance connection technology including 802.11b/g, Bluetooth, Zigbee, a radio frequency identification (RFID) technology, an ultra wide-band (UWB) technology, and the like; and for another example, may be a long-distance connection technology including a radio access type technology such as a Global System for Mobile Communications (GSM), a General Packet Radio Service (GPRS), and a Universal Mobile Telecommunications System (UMTS). Certainly, it is not excluded that another technology may be used to support communication between the first node and the second node.

To ensure security of communication between the first node and the second node, integrity protection may be performed on a message by using a message authentication code. For example, the first node generates a MAC based on a part or all of data in the message by using an integrity protection algorithm (or further using an integrity protection key), adds the MAC in the message (for example, in a prefix or a suffix of the message), and sends the message to the second node. After receiving the message, the second node first generates a check value based on a corresponding part or all of data by using a corresponding integrity protection algorithm (or further using a corresponding integrity protection key). If the check value is consistent with the MAC, it indicates that the corresponding data in the message is not tampered with.

Optionally, the first node 101 may be a communication initiator, and may be referred to as a primary node or an access point (AP). Correspondingly, the second node 102 may be a communication receiver, and may be referred to as a secondary node.

Figure 2:
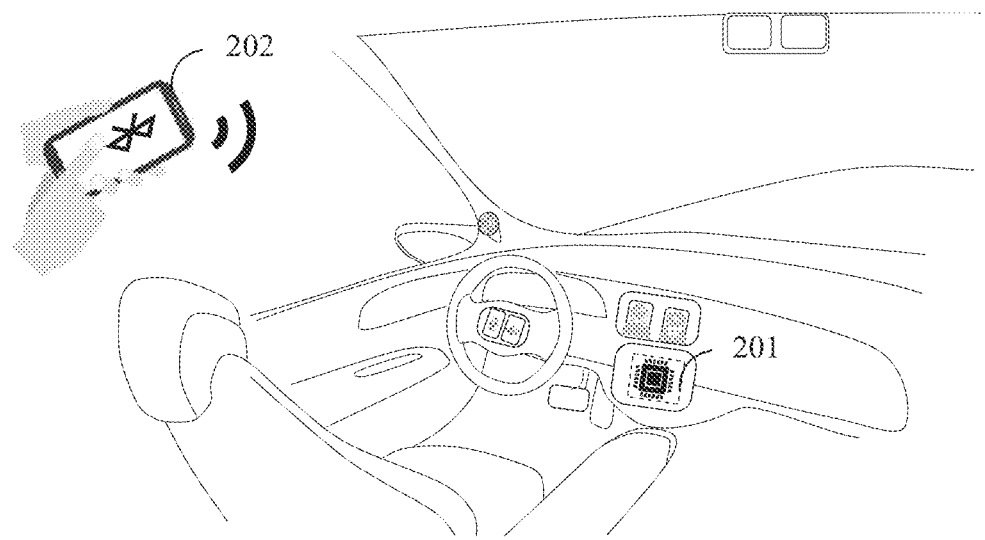
FIG. 2 is a schematic diagram of an application scenario of a communication method according to an embodiment of this application.

In addition, the first node 101 and the second node 102 may be devices of a same type, or may be devices of different types. For example, FIG. 2 is a schematic diagram of an application scenario of a communication method according to an embodiment of this application. A CDC 201 in a vehicle is a control center in a smart cockpit device, and may be considered as the first node 101. A smartphone 202 is a device with a data receiving and sending capability, and may be considered as the second node 102. A message sent by the CDC 201 to the smartphone 202 may carry a MAC, and the smartphone 202 receives the message, checks integrity of the message by using the MAC, and then performs a corresponding operation based on the message. However, in an existing message authentication code technology, a length of a message authentication code is usually fixed, and it is difficult to meet a requirement of a user. For example, the smartphone 202 is connected to the CDC 201 by using Bluetooth. When the CDC 201 needs to send voice data to the smartphone 202, because the in-vehicle voice data has a relatively high privacy requirement, and a length of a message authentication code in a Bluetooth communication process is 32 bits, the message authentication code is easy to be cracked by an attacker, and cannot meet a security requirement. Therefore, a longer MAC length is required to protect data.

Figure 3:
FIG. 3 is a schematic flowchart of a communication method according to an embodiment of this application.

FIG. 3 is a schematic flowchart of a communication method according to an embodiment of this application. The communication method may be implemented based on the communications system shown in FIG. 1. The method includes at least the following steps.

Step S301: A second node sends an association request message to a first node.

Further, the association request message includes information about a security algorithm supported by the second node, and the information about the security algorithm may be a name, an identifier, a predefined symbol, or the like of the security algorithm. The security algorithm supported by the second node includes one or more of information about an integrity protection algorithm, information about an authenticated encryption algorithm, or the like. Optionally, the information about the security algorithm supported by the second node may alternatively be referred to as a security capability (Sec Capabilities) of the second node.

Table 2 is a possible algorithm information table provided in this embodiment of this application. The information about the security algorithm supported by the second node in the association request message may be an algorithm name or an algorithm identifier. For example, the information about the security algorithm supported by the second node may be "GIA2, GIA3, GAC1", indicating that the second node supports a ZUC encryption algorithm, an AES-CMAC algorithm (specifically, an AES-CMAC algorithm supporting a 64-bit MAC length and a 128-bit MAC length), and an AES-GCM algorithm (specifically, an AES-GCM algorithm supporting a 32-bit MAC length). For another example, the information about the security algorithm supported by the second node may be "0010, 0011, 1000", indicating that the second node supports a ZUC encryption algorithm, an AES-CMAC algorithm, and an AES-GCM algorithm.

TABLE 2

Algorithm information table

| Algorithm type | Algorithm name | Algorithm identifier | Algorithm introduction |
|---|---|---|---|
| Integrity protection algorithm | GIA0 | 0000 | Null integrity protection algorithm |
| | GIA1 | 0001 | AES-CMAC algorithm; and a MAC length: 32 bits |
| | GIA2 | 0010 | ZUC algorithm; and a MAC length: 32 bits |
| | GIA3 | 0011 | AES-CMAC algorithm; and a MAC length: 64 bits and 128 bits |
| Authenticated encryption algorithm | GAC1 | 1000 | AES-GCM algorithm; and a MAC length: 32 bits |
| | GAC2 | 1001 | AES-CCM algorithm; and a MAC length: 32 bits |
| | GAC3 | 1010 | AES-GCM algorithm; and a MAC length: 64 bits and 128 bits |
| | GAC4 | 1011 | ZUC algorithm; and a MAC length: 64 bits and 128 bits |

Optionally, the association request message may further include a fresh parameter obtained (or generated) by the second node. The fresh parameter may include at least one of a nonce (number once, NONCE), a counter, a sequence number, and the like. For ease of description, in embodiments of this application, the fresh parameter obtained (or generated) by the second node in the first association request message is referred to as a first fresh parameter.

Optionally, the first node may send an access message or a broadcast message, and the second node receives the access message or the broadcast message from the first node. The second node sends a first association request message to the first node based on the access message or the broadcast message. Specifically, the access message or the broadcast message of the first node may include at least one of an identity of the first node, description information of the first node, information used to indicate access by another node, or the like.

Step S302: The first node determines a target security algorithm of a signaling plane and a target MAC length of the signaling plane according to a first algorithm selection policy.

Further, the target security algorithm of the signaling plane includes one of an integrity protection algorithm, an authenticated encryption algorithm, and the like of the signaling plane. The target security algorithm of the signaling plane is used for integrity protection of a message of the signaling plane, and the target security algorithm of the signaling plane belongs to a set of security algorithms indicated by the information about the security algorithm supported by the second node. For example, the information about the security algorithm supported by the second node may be "GIA2, GIA3, GAC1", indicating that the second node supports a ZUC encryption algorithm, an AES-CMAC algorithm (specifically, an AES-CMAC algorithm supporting a 64-bit MAC length and a 128-bit MAC length), and an AES-GCM algorithm (specifically, an AES-GCM algorithm supporting a 32-bit MAC length). In this case, the target security algorithm of the signaling plane that is determined by the first node belongs to a set including the ZUC encryption algorithm, the AES-CMAC algorithm (specifically, the AES-CMAC algorithm supporting the 64-bit MAC length and the 128-bit MAC length), and the AES-GCM algorithm (specifically, the AES-GCM algorithm supporting the 32-bit MAC length).

The first algorithm selection policy may be a selection policy preconfigured or predefined in the first node. Optionally, the first algorithm selection policy may be implemented by using a priority, or may be implemented according to a preconfigured or predefined selection sequence, or may be implemented in a manner of an algorithm, a model, or the like. For example, FIG. 4 is a schematic diagram of a possible first algorithm selection policy according to an embodiment of this application. Refer to an area 401. A priority of an algorithm whose identifier is "0001" (a corresponding algorithm is an AES-CMAC algorithm) is 1. This may indicate that the first node preferentially selects the AES-CMAC algorithm (for details, refer to Table 2, and it is an AES-CMAC algorithm supporting a 32-bit MAC length) as the target security algorithm of the signaling plane. For another example, a first model is preconfigured in the first node. The first model is a neural network obtained through deep reinforcement learning training. The neural network is obtained through training by using a plurality of pieces of sample data. Therefore, the first model may determine an optimal target security algorithm based on the information about the security algorithm supported by the second node. In this way, the first model may be considered as the first algorithm selection policy.

Optionally, that the first node determines a target security algorithm of a signaling plane and a target MAC length of the signaling plane according to a first algorithm selection policy includes at least the following two cases:

Case 1: The first node determines the target security algorithm of the signaling plane and the target MAC length of the signaling plane according to a first length selection policy and the first algorithm selection policy. The first length selection policy may be a selection policy preconfigured or predefined in the first node, and may be implemented by using a priority, or may be implemented according to a preconfigured or predefined selection sequence, or may be implemented in a manner of an algorithm, a model, or the like. For example, the first length selection policy may be selecting a longest MAC length or a shortest MAC length. Further optionally, the selecting a longest MAC length may be a length selection policy that is configured as a default length selection policy in the first node.

Optionally, that the first node determines the target security algorithm of the signaling plane and the target MAC length of the signaling plane according to a first length selection policy and the first algorithm selection policy may specifically have at least the following two implementations:

Implementation 1: The first node determines the target security algorithm of the signaling plane according to the first algorithm selection policy, and determines the target MAC length of the signaling plane according to the first length selection policy and the target security algorithm of the signaling plane.

Figure 5:
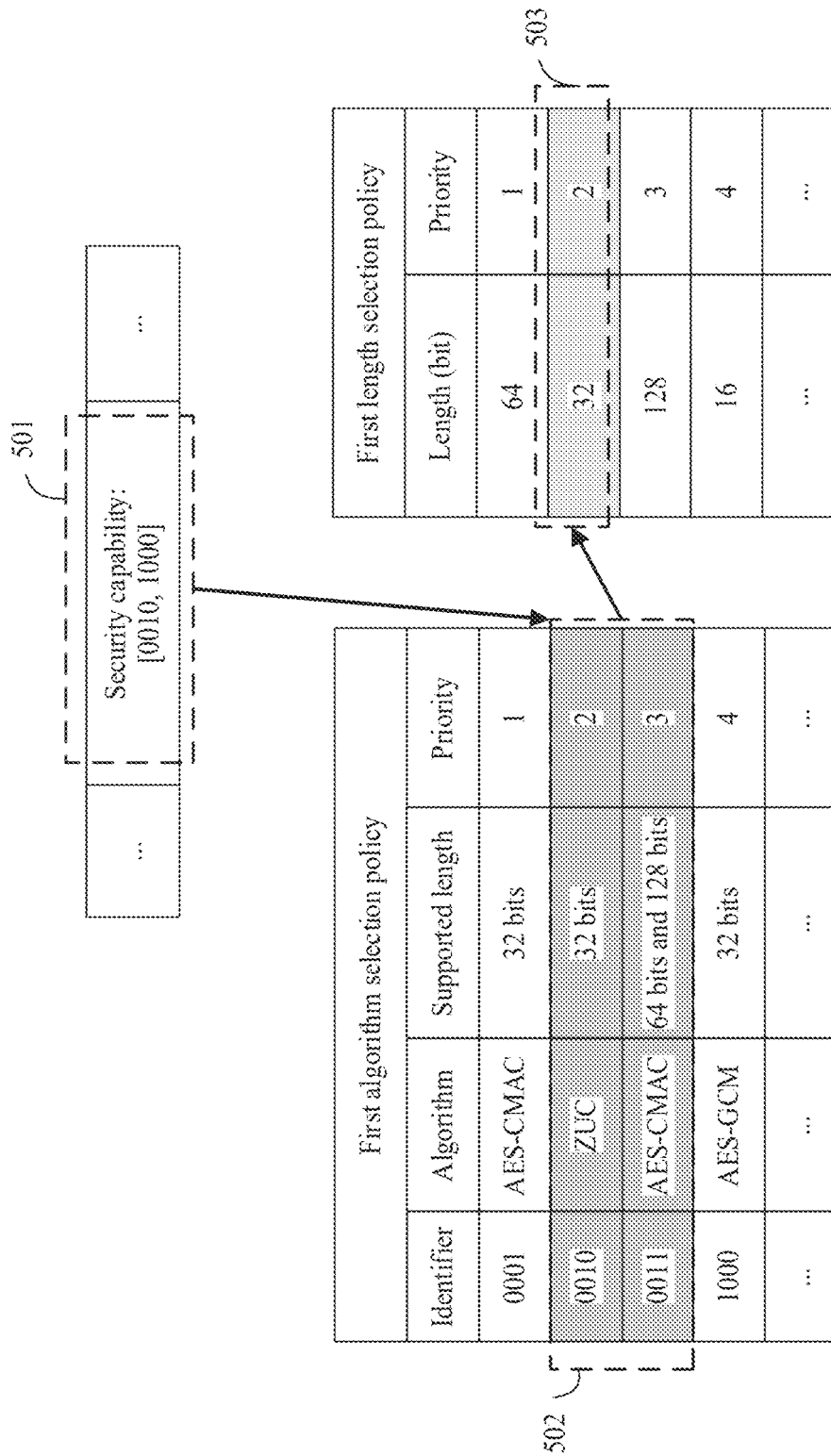
FIG. 5 is a schematic diagram of determining a target MAC length of a signaling plane according to an embodiment of this application.

For example, FIG. 5 is a schematic diagram of a possible method for determining a target MAC length of a signaling plane according to an embodiment of this application. Refer to an area 501, and it can be seen that information about a security algorithm supported by the second node indicates that the information about the security algorithm supported by the second node is "0011, 1010" and indicates that algorithms supported by the second node are an AES-CMAC algorithm and an AES-GCM algorithm. The first node implements the first algorithm selection policy in a priority manner. Refer to an area 502, and it can be seen that a priority of the AES-CMAC algorithm is 2, and a priority of the AES-GCM algorithm is 3. Therefore, the AES-CMAC is determined as the target security algorithm of the signaling plane according to the first algorithm selection policy. MAC lengths supported by the AES-CMAC algorithm corresponding to the identifier "0011" are 64 bits and 128 bits. According to the first length selection policy shown in FIG. 5, it can be seen that a priority of the 64 bits is higher than a priority of the 128 bits. Therefore, the 64 bits are determined as the target MAC length of the signaling plane (refer to an area 503).

For another example, a default first length selection policy configured in the first node may be selecting a longest MAC length in MAC lengths supported by the target security algorithm. For example, MAC lengths supported by the AES-CMAC algorithm corresponding to the identifier "0011" are 64 bits and 128 bits, and then the first node may select the 128 bits as the target MAC length of the signaling plane by default. Alternatively, a default first length selection policy configured in the first node may be selecting a shortest MAC length in MAC lengths supported by the target security algorithm.

Implementation 2: The first node determines, according to the first length selection policy, an algorithm or an algorithm set that supports a first length. The first node determines, according to the first algorithm selection policy, a first algorithm in the algorithm or algorithm set that supports the first length, and if the first algorithm is a security algorithm supported by the second node, determines the first algorithm as the target security algorithm of the signaling plane, and determines the first length as the target MAC length of the signaling plane.

Figure 6:
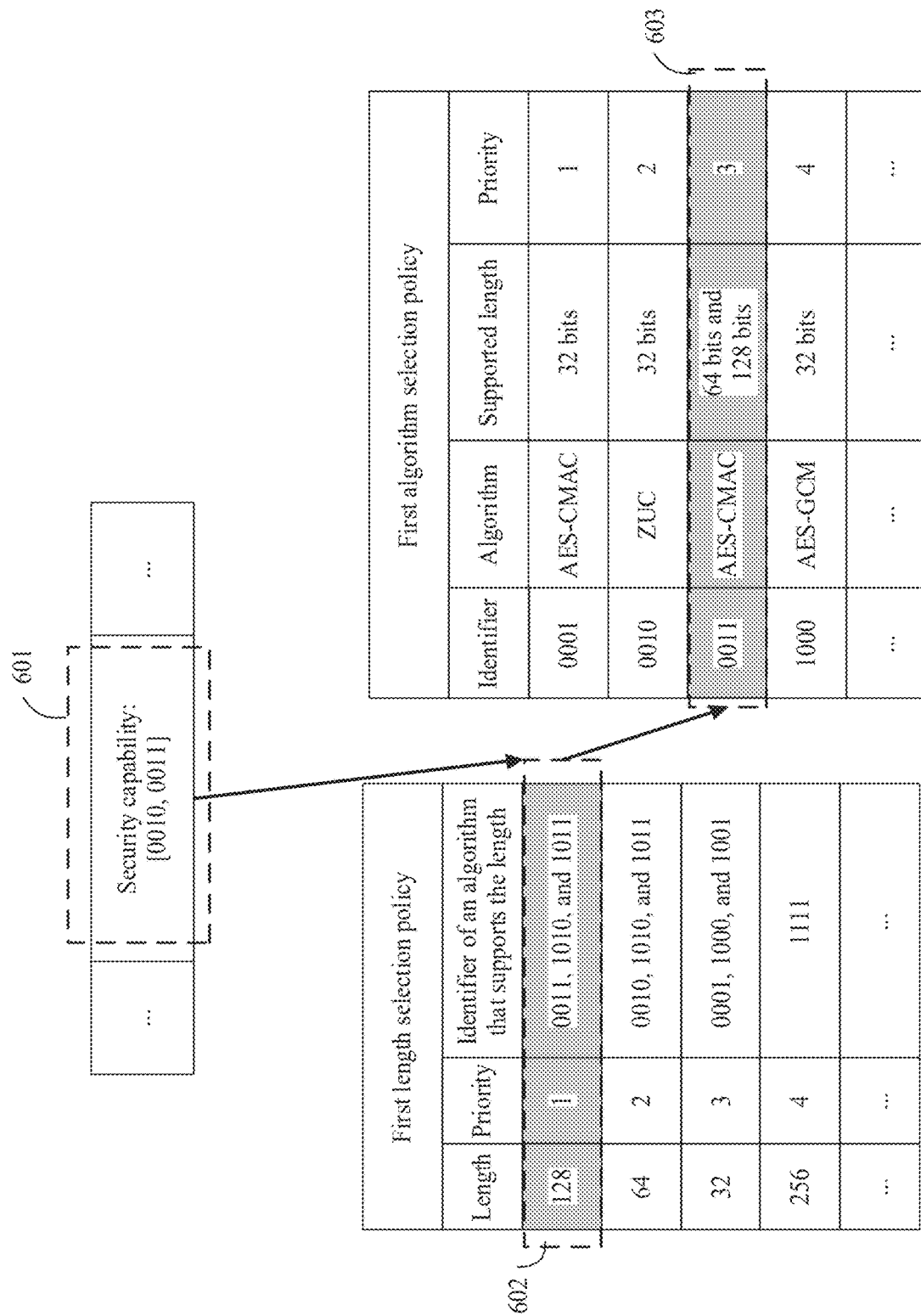
FIG. 6 is another schematic diagram of determining a target MAC length of a signaling plane according to an embodiment of this application.

For example, FIG. 6 is a schematic diagram of another possible method for determining a target MAC length of a signaling plane according to an embodiment of this application. Refer to an area 602, the first node determines, according to the first length selection policy, an algorithm group (namely, algorithms corresponding to identifiers "0011, 1010, and 1011" respectively) that supports a 128-bit MAC length. Refer to an area 603, and the first node determines an algorithm with a highest priority (namely, the AES-CMAC algorithm corresponding to the identifier "0011") according to the first algorithm selection policy. Refer to an area 601, it can be seen that the second node supports the algorithm corresponding to the identifier "0011". Therefore, the AES-CMAC algorithm is determined as the target security algorithm of the signaling plane, and 128 bits are determined as the target MAC length of the signaling plane.

It may be understood that, if algorithms that support a specific length are not supported by the second node, an algorithm or an algorithm set that supports a next length may be selected. For example, if algorithms that support 128 bits (namely, algorithms respectively corresponding to the identifiers "0011, 1010, and 1011") are not supported by the second node, the target security algorithm may be selected from an algorithm corresponding to a MAC length of a next priority. Case 2: The first node determines the target security algorithm of the signaling plane according to the first algorithm selection policy, where a MAC length corresponding to the target security algorithm of the signaling plane is the target MAC length of the signaling plane. Specifically, there may be at least the following two implementations.

Implementation 3: The target security algorithm of the signaling plane supports generation of a MAC of only one length. In this case, the first node determines the target security algorithm of the signaling plane according to the first algorithm selection policy, and determines the MAC length supported by the target security algorithm of the signaling plane as the target MAC length of the signaling plane. For example, an algorithm whose identifier is "0001" (a corresponding algorithm is an AES-CMAC algorithm) supports generation of a MAC of only one length of 32 bits. When the first node determines, according to the first algorithm selection policy, that the target security algorithm of the signaling plane is the algorithm whose identifier is "0001", the corresponding 32 bits are used as the target MAC length of the signaling plane. For another example, the HMAC256 algorithm is one of the HMAC algorithms, and only a 256-bit MAC length can be generated. Therefore, when the second node supports only the HMAC256 algorithm, 256 bits corresponding to the HMAC256 are used as the target MAC length of the signaling plane.

Implementation 4: The first node pre-stores a correspondence between a target security algorithm and a MAC length, and the first node determines, based on a correspondence between the target security algorithm of the signaling plane and a MAC length, the MAC length corresponding to the target security algorithm of the signaling plane as the target MAC length of the signaling plane. The correspondence may be preconfigured or predefined. For example, FIG. 7 is a schematic diagram of another possible first algorithm selection policy according to an embodiment of this application. Refer to an area 701, and the first algorithm policy may further indicate a correspondence between a security algorithm and a length. Different correspondences indicate different priorities. A priority of an AES-CMAC algorithm whose identifier is "0001" and a priority of a corresponding 32-bit MAC length are 1. After determining the AES-CMAC algorithm whose identifier is "0001" as the target security algorithm of the signaling plane according to the first algorithm selection policy, the first node determines, based on a correspondence between an AES-CMAC algorithm and a MAC length, 32 bits corresponding to the AES-CMAC algorithm whose identifier is "0001" as the target MAC length of the signaling plane.

Step S303: The first node generates a first MAC by using the target security algorithm of the signaling plane.

Further, a length of the first MAC is the target MAC length of the signaling plane, and the first MAC is used by the second node to check integrity of a security context request message.

Optionally, in addition to the target security algorithm, when the first MAC is generated, a shared key (which may be specifically an integrity protection key) between the first node and the second node and message data on which integrity protection needs to be performed by using the first MAC are further required. For example, the first MAC may be obtained according to a cipher-based message authentication code (CMAC) algorithm by using a shared key K1 (which may be specifically an integrity protection key) and a part or all of data data1 other than the first MAC in the security context request message. For example, the first MAC=CMAC (K1, data1).

Optionally, the communication method in this embodiment of this application may further include step S304 or some or all of step S304 to step S311. Step S304 to step S311 are specifically as follows.

Step S304: The first node sends the security context request message to the second node.

Further, the security context request message includes information used to indicate the target security algorithm of the signaling plane and information used to indicate the target MAC length of the signaling plane. Further, the security context request message includes the first MAC. The length of the first MAC is the target MAC length of the signaling plane, and the first MAC is further used to check integrity of the security context request message. Further, the first MAC is used by the second node to check the integrity of the security context request message.

Optionally, the information used to indicate the target MAC length of the signaling plane may have at least the following several possible cases.

Case 1: The information used to indicate the target MAC length of the signaling plane may be directly the target MAC length of the signaling plane. For example, the security context request message includes "signaling plane MAC length: 64 bits", and the second node may obtain the target MAC length of the signaling plane based on the context request message. In this case, the security context request message includes the first MAC, the information used to indicate the target security algorithm of the signaling plane, and the target MAC length of the signaling plane.

Case 2: The information used to indicate the target MAC length of the signaling plane may be the first MAC. Further, the length of the first MAC is the target MAC length of the signaling plane, and the second node may determine the target MAC length of the signaling plane based on the length of the first MAC. In this case, the security context request message includes the first MAC and the information used to indicate the target security algorithm of the signaling plane.

Case 3: When the determined target security algorithm of the signaling plane corresponds to only one MAC length, the information used to indicate the target MAC length of the signaling plane may be information used to indicate the target security algorithm of the signaling plane. For example, an algorithm whose identifier is "0001" (a corresponding algorithm is an AES-CMAC algorithm) supports generation of a MAC of only one length of 32 bits. Therefore, if the target security algorithm of the signaling plane corresponds to the identifier "0001", the identifier "0001" may be carried in the security context request message. The identifier "0001" is used to indicate the target security algorithm of the signaling plane. Because the algorithm corresponds to only the 32-bit MAC, the identifier may also indicate that the target MAC length of the signaling plane is 32 bits. In this case, the security context request message includes the first MAC and the information used to indicate the target security algorithm of the signaling plane.

It should be noted that there is an optional design in embodiments of this application. If the determined target security algorithm of the signaling plane corresponds to only one MAC length, the first node may add, in a message sent to the second node, information indicating the target security algorithm of the signaling plane, and the information indicating the target security algorithm of the signaling plane may also be used to indicate the target MAC length of the signaling plane. Correspondingly, if the determined target security algorithm of a user plane corresponds to only one MAC length, the first node may add, in a message, information indicating a target security algorithm of the user plane, and the information indicating the target security algorithm of the user plane may also be used to indicate a target MAC length of the user plane.

Optionally, the security context request message may further include a fresh parameter obtained (or generated) by the first node. The fresh parameter may include at least one of a NONCE, a counter, a sequence number, and the like. For ease of description, the fresh parameter in the security context request message is referred to as a second fresh parameter.

Optionally, the security context request message further includes first identity authentication information. The first identity authentication information is generated by the first node based on the shared key between the first node and the second node. The shared key may be a pre-shared key between the first node and the second node. For example, the first node may generate the first identity authentication information AUTHa based on the pre-shared key (PSK) by using a key derivation function (KDF), that is, AUTHa=KDF (PSK). Optionally, when the association request message includes a first fresh parameter, the first identity authentication information may be generated based on the shared key and the first fresh parameter. For example, the first identity authentication information AUTHa is generated based on the pre-shared key PSK and the first fresh parameter NONCEe by using a KDF, for example, AUTHa=KDF (PSK, NONCEe).

Further optionally, during actual processing, parameters used by the first node to generate the first identity authentication information may further include other information. For example, the generated first identity authentication information AUTHa may satisfy: AUTHa=KDF (PSK, association request message).

Further optionally, when the security context request message includes the second fresh parameter, the first identity authentication information AUTHa generated by the first node may further satisfy: AUTHa=KDF (PSK, NONCEa, association request message), where NONCEa is the second fresh parameter in the security context request message.

Optionally, the first node may encrypt some or all data in the security context request message by using an encryption key. Correspondingly, the second node may receive the security context request message, and decrypt a corresponding encrypted part to obtain message content.

Step S305: The second node checks integrity of the security context request message based on the first MAC by using the target security algorithm of the signaling plane.

Further, the second node checks message integrity of the security context request message based on the first MAC, to prevent content in the security context request message from being tampered with by an attacker.

In a possible solution, the first node generates the first MAC in a specific manner, and therefore the second node also generates a check value in a same manner. If the generated check value is the same as the first MAC, the message integrity check succeeds. For example, if the first MAC is obtained by the first node by using the target security algorithm of the signaling plane based on the shared key K1 and a part or all of data data1 other than the first MAC in the security context request message, the second node also generates a check value check1 in a same manner, that is, check1=CMAC (K1, data1). If the check1 is the same as the first MAC, it indicates that the data data1 is not tampered with, and integrity check on the security context request message succeeds.

Optionally, if the integrity check fails, it indicates that the security context request message may be tampered with by the attacker. Therefore, the second node may discard the security context request message, or ignore the security context request message, or further include skipping applying the target security algorithm in the security context request message or skipping applying the target MAC information in the security context request message.

Step S306: The second node performs verification on the first identity authentication information based on the shared key between the second node and the first node.

Specifically, the first identity authentication information is generated by the first node based on the shared key between the first node and the second node. Therefore, the second node also verifies, based on the shared key, whether the first identity authentication information is correct.

In an optional solution, according to a protocol specification, if the first node uses a specific parameter to generate the first identity authentication information, the second node should also use the same parameter to generate check information. If the check information is the same as the first identity authentication information, it is considered that the verification succeeds. For example, the first identity authentication information is generated by using a KDF. Therefore, the second node may use the KDF to generate the check information, which is also referred to as a check value test1. The second node verifies, by using the check information, whether the first identity authentication information is correct. An example is used for description below.

For example, if the first identity authentication information AUTHa is KDF (PSK, NONCEe), the second node obtains, based on the PSK and the first fresh parameter NONCEe by using the KDF, that the check value test1=KDF (PSK, NONCEe). If the check value test1 is the same as AUTHa, the verification succeeds.

Optionally, if the verification on the first identity authentication information fails, it indicates that the identity of the first node is untrusted. Therefore, the second node may discard the security context request message, or ignore the security context request message, or further include skipping applying the target security algorithm in the security context request message or skipping applying the target MAC length in the security context request message. Further, the second node may disconnect from the first node, to associate a correct node.

Optionally, the second node may first perform the operation of step S306 and then perform the operation of step S305.

Step S307: The second node generates a second MAC by using the target security algorithm of the signaling plane.

Specifically, a length of the second MAC is the target MAC length of the signaling plane, and the second MAC is used by the first node to check integrity of a security context response message. During specific implementation, in addition to the target security algorithm, when the second MAC is generated, the shared key (which may be specifically an integrity protection key) between the second node and the first node and message data on which integrity protection needs to be performed by using the second MAC are further required.

For example, the second MAC may be obtained according to a CMAC algorithm by using a shared key K1 (which may be specifically an integrity protection key) and a part or all of data data2 other than the second MAC in the security context response message. For example, the second MAC=CMAC (K1, data2).

Step S308: The second node sends the security context response message to the first node.

Specifically, the security context response message includes the second MAC, and the second MAC is used to verify integrity of the security context response message.

Optionally, the security context response message further includes second identity authentication information. The second identity authentication information is generated by the second node based on the shared key between the second node and the first node. The shared key may be a pre-shared key between the second node and the first node. For example, the second node may generate the second identity authentication information AUTHe based on the pre-shared key PSK by using the KDF, for example, AUTHe=KDF (PSK).

Optionally, when the security context request message includes the second fresh parameter, the second identity authentication information may be generated by the second node based on the shared key and the second fresh parameter. For example, the second node generates the second identity authentication information AUTHe based on the pre-shared key PSK and the second fresh parameter NONCEa by using the KDF, for example, AUTHe=KDF (PSK, NONCEa).

Further optionally, during actual processing, parameters used by the second node to generate the second identity authentication information may further include other information. For example, the generated second identity authentication information AUTHe may satisfy: AUTHe=KDF (PSK, security context request message).

Further optionally, when the association request message includes the first fresh parameter, the second identity authentication information AUTHe generated by the second node may further satisfy: AUTHe=KDF (PSK, NONCEa, security context request message), where NONCEa is the first fresh parameter in the association request message.

Optionally, the second node may encrypt some or all data in the security context response message by using an encryption key. Correspondingly, the first node may receive the security context response message, and decrypt a corresponding encrypted part to obtain message content.

Step S309: The second node checks integrity of the security context response message based on the second MAC by using the target security algorithm of the signaling plane.

Specifically, the first node checks message integrity of the security context response message based on the second MAC, to prevent content in the security context response message from being tampered with by the attacker.

In a possible solution, the second node generates the second MAC in a specific manner, and therefore the first node also generates a check value in a same manner. If the generated check value is the same as the second MAC, the message integrity check succeeds. For example, if the second MAC is obtained by the second node by using the target security algorithm of the signaling plane based on the shared key K1 and a part or all of data data2 other than the second MAC in the security context request message, the first node also generates a check value check2 in a same manner, that is, check2=CMAC (K1, data2). If the check2 is the same as the second MAC, it indicates that the data data2 is not tampered with, and integrity check on the security context request message succeeds.

Optionally, if the integrity check fails, it indicates that the security context response message may be tampered with by the attacker. Therefore, the first node may discard the security context response message, or ignore the security context response message, or further include skipping applying the target security algorithm of the signaling plane or skipping applying the target MAC length of the signaling plane.

Step S310: The first node performs verification on the second identity authentication information based on the shared key between the first node and the second node.

Specifically, the second identity authentication information is generated by the second node based on the shared key between the second node and the first node. Therefore, the first node also verifies, based on the shared key, whether the second identity authentication information is correct.

In an optional solution, according to a protocol specification, if the second node uses a specific parameter to generate the second identity authentication information, the first node should also use the same parameter to generate check information. If the check information is the same as the second identity authentication information, it is considered that the verification succeeds. For example, the second identity authentication information is generated by using a KDF. Therefore, the first node may use the KDF to generate the check information, which is also referred to as a check value test2. The first node verifies, by using the check information, whether the second identity authentication information is correct. The following uses an example for description.

For example, if the second identity authentication information AUTHe is KDF (PSK, NONCEa), the first node obtains, based on the PSK and the second fresh parameter NONCEa by using the KDF, that the check value test2=KDF (PSK, NONCEa). If the check value test2 is the same as AUTHe, the verification succeeds.

Optionally, if the verification on the second identity authentication information fails, it indicates that the identity of the second node is untrusted. Therefore, the first node may discard the security context response message, or ignore the security context response message, or further include skipping applying the target security algorithm of the signaling plane or skipping applying the target MAC length of the signaling plane. Further, the first node may disconnect from the second node, to associate a correct node.

Optionally, the second node may first perform the operation of step S310 and then perform the operation of step S309.

Step S311: The first node sends an association establishment message to the second node.

Specifically, the association establishment message may indicate the second node to establish an association with the first node.

Optionally, the association establishment message may further carry a MAC that protects integrity of the association establishment message. The MAC that protects the integrity of the association establishment message may be generated by using the target security algorithm of the signaling plane. A length of the MAC that protects the integrity of the association establishment message is the target MAC length of the signaling plane.

Optionally, the first node may encrypt a part or all of data in the association establishment message by using an encryption key. Correspondingly, the second node may receive the association establishment message, and decrypt a corresponding encrypted part to obtain message content.

Optionally, the first node may further determine the target security algorithm of the user plane according to a second algorithm policy. The target security algorithm of the user plane belongs to a set of security algorithms indicated by the information about the security algorithm supported by the second node. The target security algorithm of the user plane may be sent to the second node by using the security context request message, so that the second node receives the security context request message to obtain the target security algorithm of the user plane. Further, optionally, the second algorithm policy and the first algorithm policy may be a same algorithm policy.

Optionally, the first node may further obtain an identifier of a first service and/or a data packet size of the first service. The first node may determine the target MAC length of the user plane based on a MAC length supported by the target security algorithm of the user plane and at least one of the identifier of the first service and the data packet size of the first service. The target MAC length of the user plane is used to indicate a length of a MAC for performing integrity protection on data of the first service. Further, optionally, the first node may send a resource scheduling message to the second node. The resource scheduling message includes the target MAC length of the user plane. Correspondingly, the second node receives the resource scheduling message, to obtain the target MAC length of the user plane. It should be noted that the first service may be a service processed (or executed) by the second node, or may be a service that is processed by another node and forwarded by the second node.

In the method shown in FIG. 3, the first node determines the target security algorithm of the signaling plane and the target MAC length of the signaling plane based on the information about the security algorithm supported by the second node and according to a preconfigured or predefined algorithm policy, and then uses the target MAC length of the signaling plane as a MAC length of a signaling message between the first node and the second node. In this way, the first node may formulate different selection policies based on requirements, to determine a MAC length that meets the requirement, so as to improve flexibility of the MAC length. For example, an algorithm with relatively high security may be selected from algorithms supported by the second node, and a relatively long MAC length may further be selected, so that it is difficult for the attacker to crack the MAC, thereby enhancing integrity of a message protected by the MAC and improving data security in a node communication process.

Figure 8:
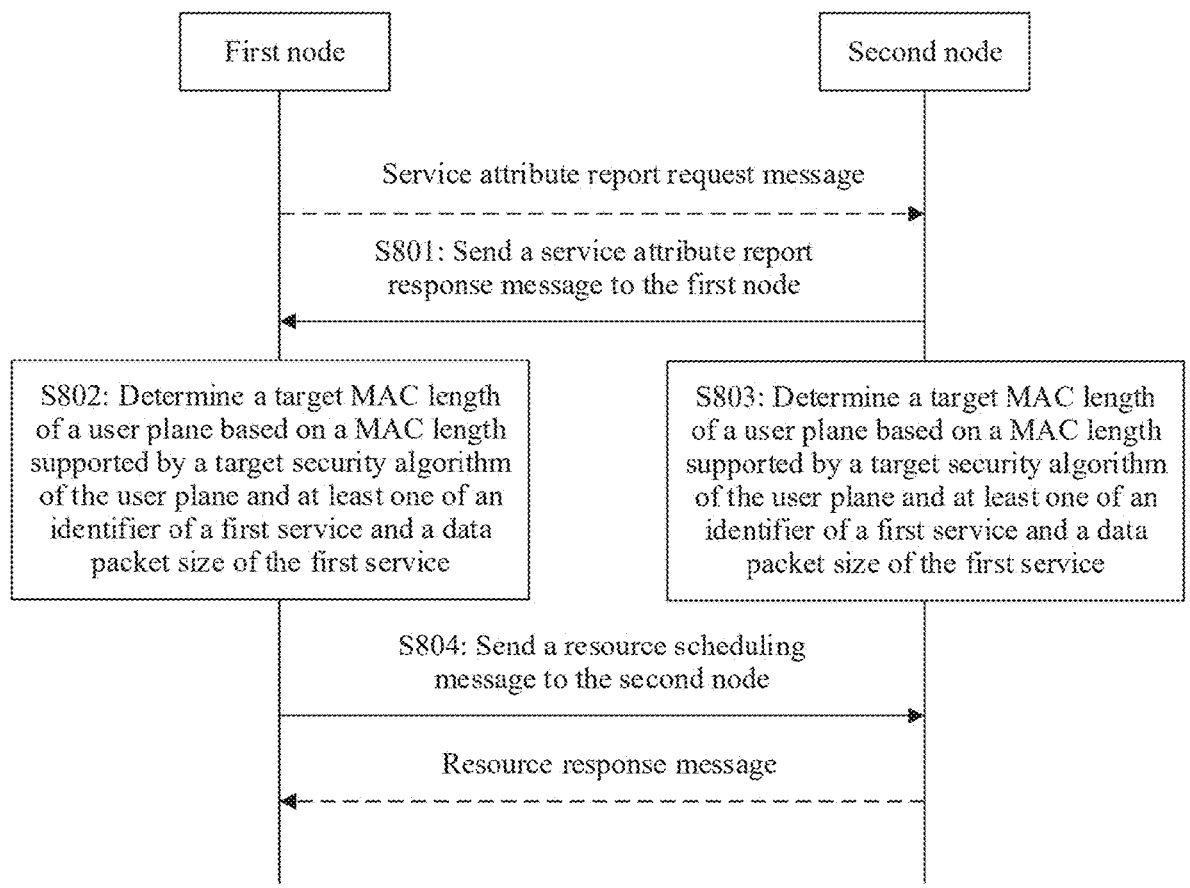
FIG. 8 is a schematic flowchart of another communication method according to an embodiment of this application.

FIG. 8 is a schematic flowchart of a communication method according to an embodiment of this application. The communication method may be implemented based on the communications system shown in FIG. 1. The method includes at least the following steps.

Step S801: A second node sends a service attribute report response message to a first node.

Further, the service attribute report response message includes an identifier of a first service and/or a data packet size of the first service.

Optionally, the first node may send the service attribute report request message to one or more nodes including the second node. Correspondingly, the second node receives the service attribute report request message from the first node, to send the service attribute report response message to the first node. Specifically, the service attribute report request message of the first node may include at least one of an identity of the first node, identity description information of the first node, information used to indicate to send the service attribute report response message, or the like. After receiving the service attribute report request message, the second node sends the service attribute report response message to the first node.

Step S802: The first node determines a target MAC length of the user plane based on a MAC length supported by a target security algorithm of the user plane and at least one of the identifier of the first service and the data packet size of the first service.

Specifically, the target MAC length of the user plane is used to indicate a length of a MAC for performing integrity protection on data of the first service. In a specific implementation process, at least the following four cases are included:

Case 1: The first node determines a second length selection policy based on the identifier of the first service and/or the data packet size of the first service. The second node determines the target MAC length of the user plane based on the second length selection policy and a MAC length supported by the target security algorithm of the user plane. The target MAC length of the user plane is used to indicate a length of a MAC performing integrity protection on data of the first service. The second length selection policy may be a selection policy preconfigured or predefined in the first node, and may be implemented by using a priority, or may be implemented according to a preconfigured or predefined selection sequence, or may be implemented in a manner of an algorithm, a model, or the like.

Figure 9A:
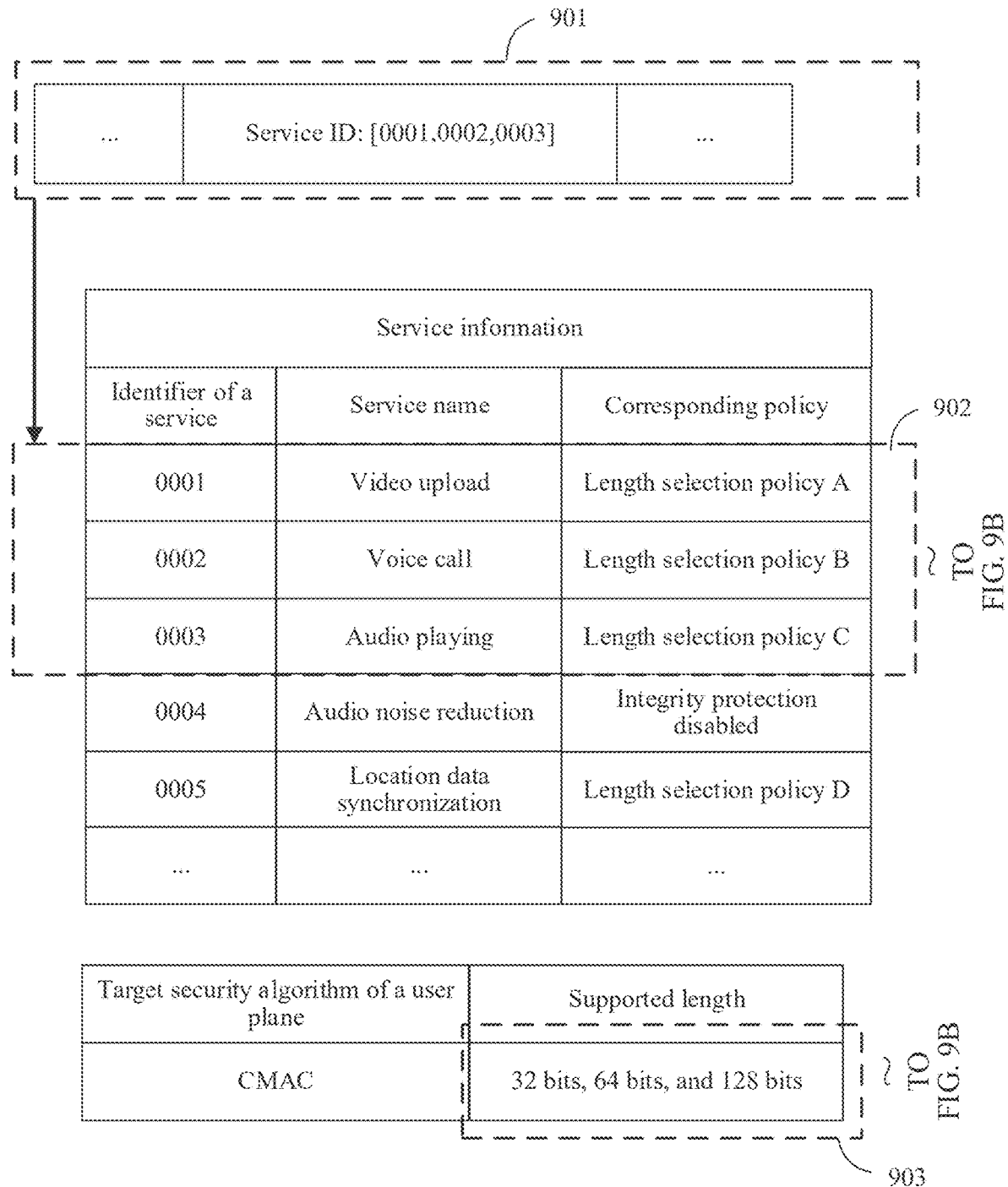
FIG. 9A and FIG. 9B are a schematic diagram of determining a target MAC length of a user plane according to an embodiment of this application.
Figure 9B:
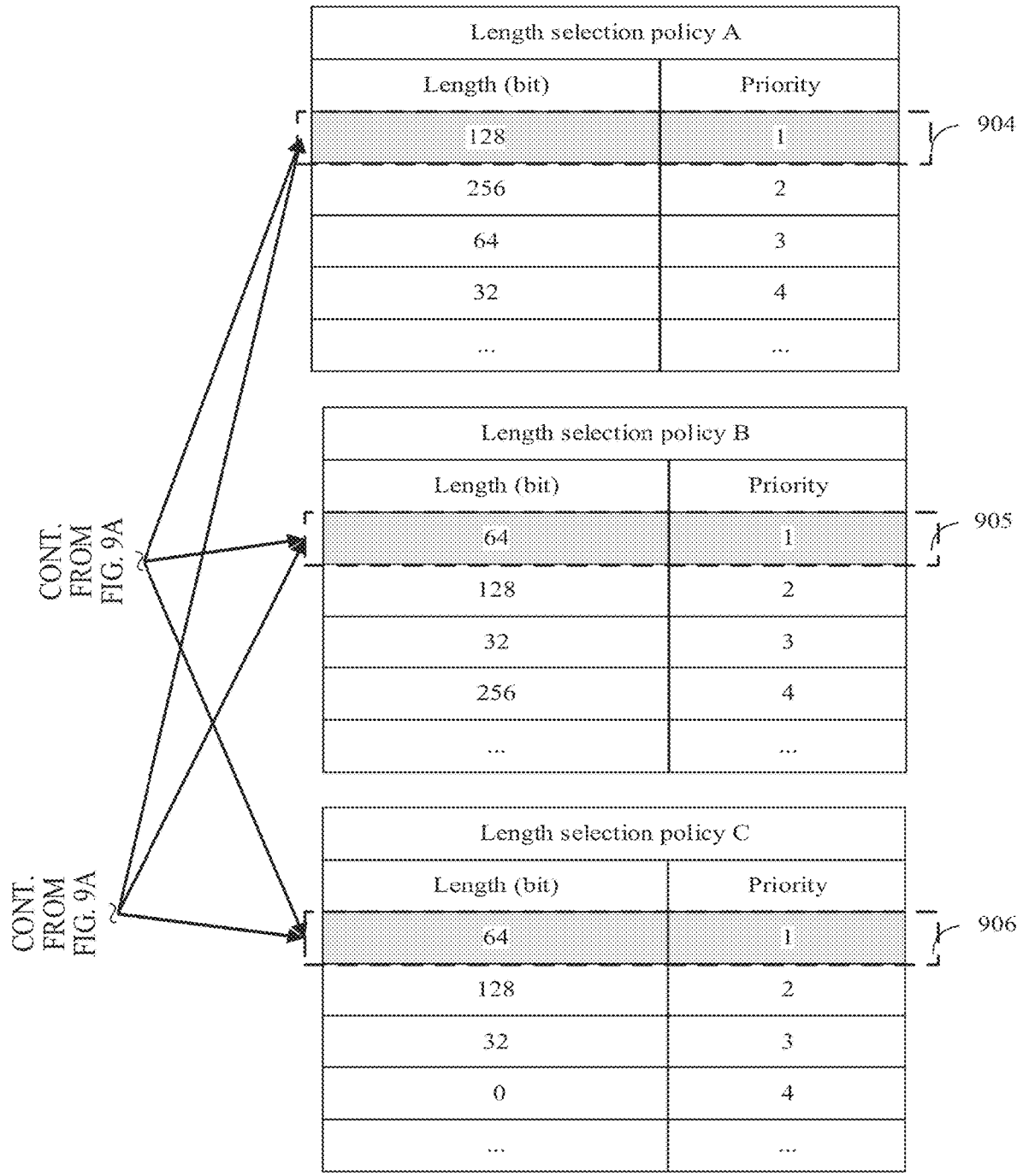

For example, FIG. 9A and FIG. 9B are a schematic diagram of a method for determining a target MAC length of a user plane according to an embodiment of this application. An area 901 includes an identity (ID) number of some services, which may be used as an identifier of a service. Different service identifiers generally correspond to different services. For example, an identifier "0001" indicates video upload, an identifier "0002" indicates a voice call, and an identifier "0003" indicates audio playing. Refer to an area 902. It can be learned that different length selection policies may be determined based on identifiers of different services. For example, a video upload service whose identifier is "0001" corresponds to a length selection policy A. The first node may determine, based on the length selection policy A corresponding to the service and a length 903 supported by the target security algorithm of the user plane, that the length of the target MAC of the user plane is 128 bits (refer to an area 904), and a MAC generated based on the MAC length is used to perform integrity protection on data of the service whose identifier is "0001". Similarly, refer to an area 905, and it can be learned that a length of a MAC for performing integrity protection on the service whose identifier is "0002" is 64 bits. Refer to an area 906, and it can be learned that a length of a MAC for performing integrity protection on the service whose identifier is "0003" is 64 bits.

It should be noted that it may be determined, by using the identifier of the service, that integrity protection is not enabled for the service. For example, refer to FIG. 9A and FIG. 9B, and integrity protection may not be enabled for a noise reduction service whose identifier is "0004". In addition, whether to enable integrity protection may alternatively be determined by using the length selection policy. For example, in a length selection policy C, if a MAC length is 0, it indicates that integrity protection is not enabled.

Figure 10:
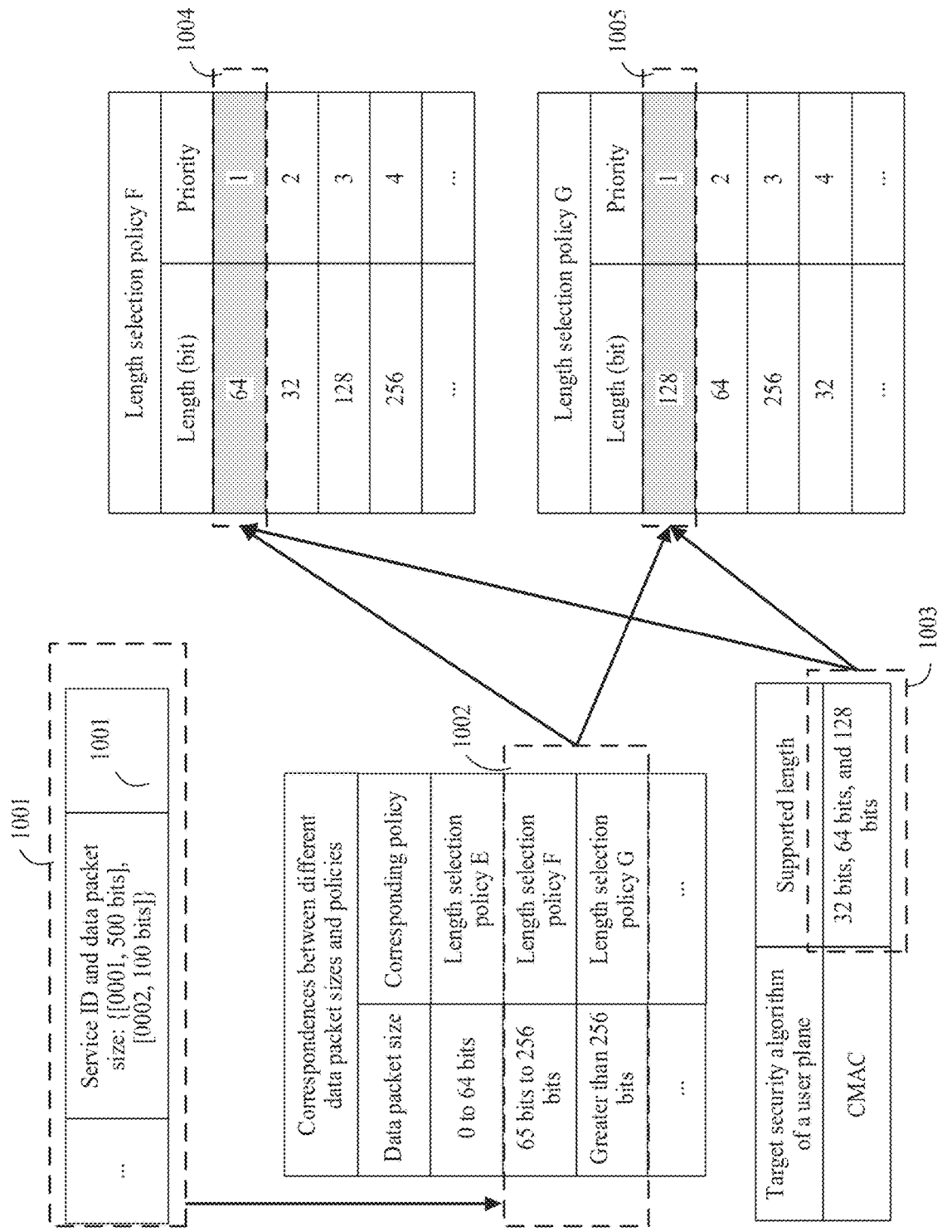
FIG. 10 is another schematic diagram of determining a target MAC length of a user plane according to an embodiment of this application.

For another example, FIG. 10 is a schematic diagram of a method for determining a target MAC length of a user plane according to an embodiment of this application. In an area 1001, identifiers of some services and corresponding data packet sizes are provided. For example, a data packet size corresponding to an identifier "0001" is 500 bits. Refer to an area 1002. It can be learned that different length selection policies may be determined based on different data packet sizes. For example, a data packet size between 65 bits and 256 bits corresponds to a length selection policy F. The first node may determine, based on the length selection policy F corresponding to the data packet size and a length 1003 supported by the target security algorithm of the user plane, that the target MAC length of the user plane is 64 bits (refer to an area 1004), and a MAC generated based on the MAC length is used to perform integrity protection on data of the service whose identifier is "0002". Similarly, refer to the area 1004, and it can be learned that a length of a MAC for performing integrity protection on the service whose identifier is "0001" is 128 bits. Certainly, the data packet sizes shown in FIG. 10 are merely examples. In a specific implementation process, there is another data packet size, or a corresponding length selection policy may be determined by using a range of the data packet size. Details are not described herein again.

Case 2: The first node determines the target MAC length of the user plane based on the MAC length supported by the target security algorithm of the user plane and the identifier of the first service.

Optionally, a correspondence between the identifier of the first service and a MAC length is in the first node, and this correspondence may be preconfigured or predefined. The first node may determine, based on the MAC length supported by the target security algorithm of the user plane and the correspondence between the identifier of the first service and the MAC length, the MAC length corresponding to the identifier of the first service as the target MAC length of the user plane.

TABLE 3

Correspondence between an identifier of a service and a MAC length

| Identifier of a service | Service name | MAC length | Whether to enable integrity protection |
|---|---|---|---|
| 0001 | Video upload | 128 bits | Yes |
| 0002 | Voice call | 128 bits | Yes |
| 0003 | Audio playing | 64 bits | Yes |
| 0004 | Audio noise reduction | 0 | No |
| 0005 | Location data synchronization | 128 bits | Yes |

For example, Table 3 shows a possible correspondence between an identifier of a service and a MAC length according to an embodiment of this application. An identifier "0001" indicates a video upload service, and a corresponding MAC length is 128 bits. If the target security algorithm of the user plane supports a 128-bit MAC length, 128 bits may be determined as the target MAC length of the user plane.

It may be understood that, if the target security algorithm of the user plane does not support a MAC length corresponding to a service, a relatively close MAC length may be selected from lengths supported by the target security algorithm of the user plane as the target MAC length of the user plane. A specific implementation process is not described again.

Optionally, the service report request message may include identifiers of a plurality of services. Correspondingly, the first node may determine a plurality of corresponding target MAC lengths of user planes, and the plurality of target MAC lengths of the user planes are separately used to perform integrity protection on data of the plurality of services.

Case 3: The first node determines the target MAC length of the user plane based on the MAC length supported by the target security algorithm of the user plane and the data packet size of the first service. Specifically, the first node may preconfigure or predefine a correspondence between the data packet size of the first service and a MAC length. The first node may determine, based on the MAC length supported by the target security algorithm of the user plane and the correspondence between the data packet size of the first service and the MAC length, the MAC length corresponding to the data packet size of the first service as the target MAC length of the user plane.

Case 4: When the target security algorithm of the user plane corresponds to only one MAC length, the first node may also determine, based on a MAC length corresponding to the target security algorithm of the user plane, the MAC length as the target MAC length of the user plane. For example, an algorithm whose identifier is "0001" (a corresponding algorithm is an AES-CMAC algorithm) supports generation of a MAC of only one length of 32 bits. When the target security algorithm of the user plane is the algorithm whose identifier is "0001", corresponding 32 bits are used as the target MAC length of the user plane. For another example, HMAC256 supports generation of only a 256-bit MAC length. Therefore, when the target security algorithm of the user plane is the HMAC256 algorithm, 256 bits corresponding to the HMAC256 are used as the target MAC length of the user plane.

Optionally, before determining the target MAC length of the user plane, the first node first determines that integrity protection needs to be performed on the data of the first service. Specifically, services of different service types have different integrity protection requirements. The first node may determine, based on the identifier of the first service, whether to enable integrity protection, and generate a corresponding target MAC of the user plane only for a service for which integrity protection needs to be enabled, and therefore security requirements of different services can be met. For example, a video upload service is a service having a relatively high security requirement, so that integrity protection needs to be performed on data of the video upload service, and therefore, a length of a MAC used to protect the data of this service needs to be determined. For another example, the identifier of the first service corresponds to a first service type, and integrity protection needs to be performed on data of a service whose type is the first service type such that a MAC length of the service belonging to the first service type is determined.

Optionally, the target security algorithm of the user plane belongs to a set of security algorithms indicated by the information about the security algorithm supported by the second node. Further, optionally, the target security algorithm of the user plane may be determined by the first node by using a second algorithm selection policy, and the second algorithm selection policy may be a selection policy preconfigured or predefined in the first node. Optionally, the second algorithm selection policy may be implemented by using a priority, or may be implemented according to a preconfigured or predefined selection order. For example, FIG. 4 is a schematic diagram of a possible algorithm selection policy according to an embodiment of this application. Refer to an area 401. A priority of an AES-CMAC algorithm is 1, indicating that when the second node supports the AES-CMAC algorithm, the AES-CMAC algorithm is preferentially selected as the target security algorithm of the user plane.

Optionally, the communication method in this embodiment of this application may further include one or both of step S803 and step S804. Step S803 and step S804 are specifically as follows.

Step S803: The second node determines a target MAC length of a user plane based on a MAC length supported by a target security algorithm of the user plane and at least one of an identifier of a first service and a data packet size of the first service.

Specifically, a method for determining a target MAC length of a user plane that is the same as that in the first node is configured in the second node such that the target MAC length of the user plane can be determined on the second node. In a possible solution, according to a protocol specification, the first node determines a target MAC length of a user plane in a specific manner, and therefore, the second node also determines a target MAC length of a user plane in a same manner. In this way, a node does not need to send a target MAC length to a peer node, to save network resources. It may be understood that for a specific method for determining a target MAC length of a user plane, refer to the specific description in step S802. Details are not described herein again.

Step S804: The first node sends a resource scheduling message to the second node.

Specifically, the resource scheduling message may include the target MAC length of the user plane, or the resource scheduling message includes information used to indicate the target MAC length of the user plane. Optionally, when the second node determines the target MAC length of the user plane by using step S803, the resource scheduling message may not include the target MAC length of the user plane.

Optionally, the second node may further send a resource response message to the first node. The resource response message is used to indicate that the second node has received the resource scheduling message.

Optionally, the first node and/or the second node may further generate a third MAC by using the target security algorithm of the user plane and the target MAC length of the user plane, and the third MAC is used to perform integrity protection on data of the first service. For example, if the first node determines that a MAC length of a video upload service (namely, a service whose identifier is "0001") is 128 bits, the first node and/or the second node may generate a third MAC whose length is 128 bits. The third MAC is used to ensure message integrity of the video upload service.

Optionally, the service attribute report request message, the service attribute report response message, the resource scheduling message, the resource response message, and the like are signaling plane messages. Therefore, integrity protection may be performed on message content by using a target security algorithm of the signaling plane. The target security algorithm of the signaling plane corresponds to a first algorithm selection policy. Further optionally, the first node may further obtain information about a security algorithm of the second node, and the first node may determine a target security algorithm of the signaling plane and a target MAC length of the signaling plane based on the first algorithm selection policy. The target security algorithm of the signaling plane belongs to a set of security algorithms indicated by the information about the security algorithm supported by the second node. A resource scheduling message is used as an example. The first node may generate a fourth MAC by using the target security algorithm of the signaling plane. A length of the fourth MAC is the target MAC length of the signaling plane. The fourth MAC may be carried in a prefix or a suffix of the resource scheduling message, to ensure integrity of the resource scheduling message.

Further optionally, the first node may send a security context request message to the second node. The security context request message includes the target security algorithm of the signaling plane, the target security algorithm of the user plane, and the target MAC length of the signaling plane. Correspondingly, the second node receives the security context request message, to obtain the target security algorithm of the signaling plane, the target security algorithm of the user plane, and the target MAC length of the signaling plane.

In the method shown in FIG. 8, the first node may determine the target MAC length of the user plane based on a MAC length supported by a security algorithm of the user plane and the identifier of the first service and/or the data packet size of the first service, and then use the target MAC length of the user plane as a MAC length of a message used to process the first service. In this way, different MAC lengths can be determined for different services or services of different data packet sizes, to improve flexibility of the MAC length. For a service with relatively high security, a relatively long MAC length may be used such that it is difficult to be cracked, and data security is improved. In addition, for some messages that do not have a high security requirement or have a relatively small data packet, a relatively short MAC length may be used, to avoid affecting communication efficiency and reduce resource consumption during network transmission.

Figure 11:
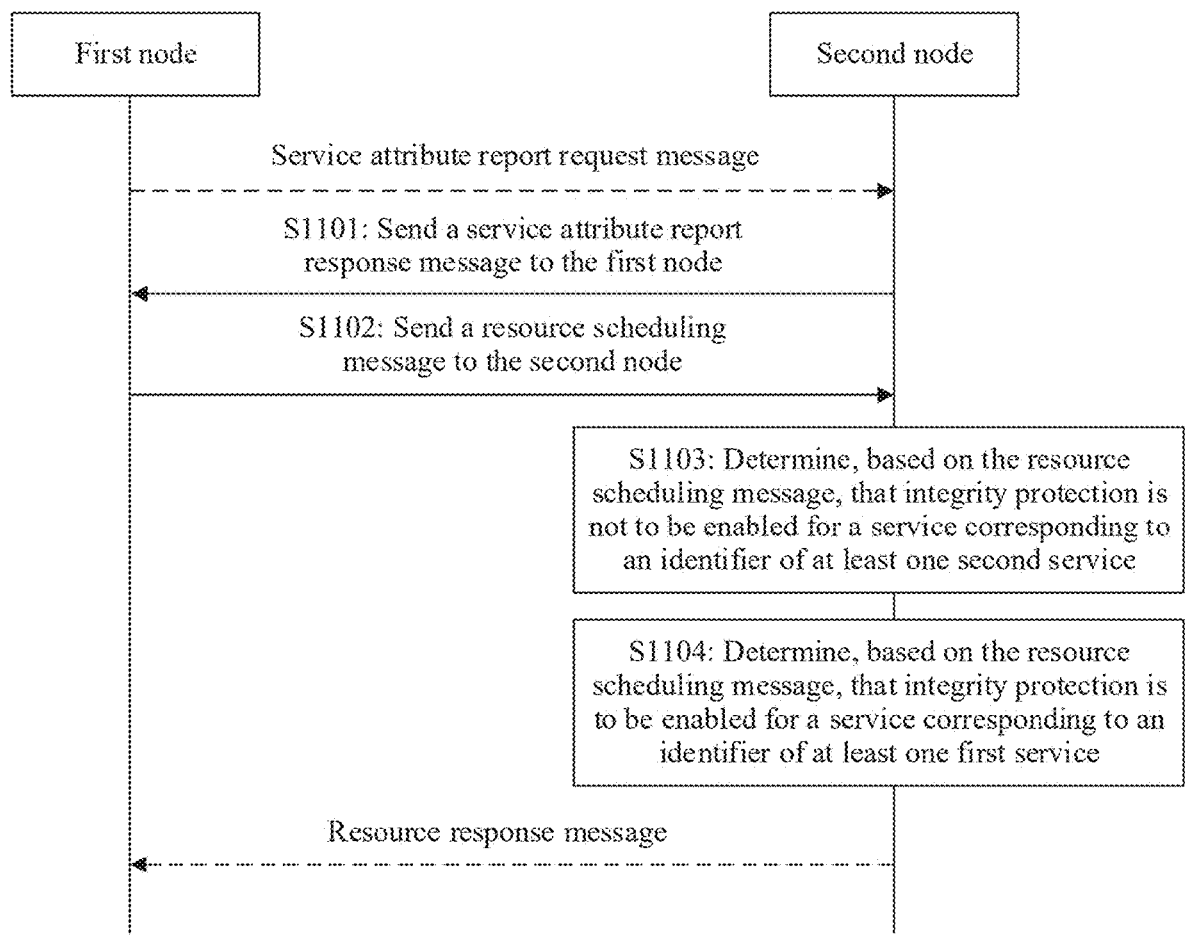
FIG. 11 is a schematic flowchart of another communication method according to an embodiment of this application.

FIG. 11 is a schematic flowchart of a communication method according to an embodiment of this application. The communication method may be implemented based on the communications system shown in FIG. 1. The method includes at least the following steps.

Step S1101: A second node sends a service attribute report response message to a first node. Correspondingly, the first node receives the service attribute report response message.

Specifically, the service attribute report response message includes at least one service identifier. Further, the at least one service identifier may include an identifier of at least one second service, the identifier of the at least one second service corresponds to a second service type, and integrity protection does not need to be performed on data of a service whose type is the second service type.

For example, Table 4 is a possible service type corresponding to a service identifier according to this embodiment of this application. It can be learned that an identifier "0001" indicates a video upload service, and is a major service type, and integrity protection needs to be enabled. Correspondingly, an identifier "0004" indicates an audio noise reduction service, and is a minor service type, and integrity protection does not need to be enabled.

TABLE 4

Service type corresponding to a service identifier

| Service identifier | Service name | Service type | Whether to enable integrity protection |
|---|---|---|---|
| 0001 | Video upload | Major | Yes |
| 0002 | Voice call | Major | Yes |

TABLE 4-continued

Service type corresponding to a service identifier

| Service identifier | Service name | Service type | Whether to enable integrity protection |
|---|---|---|---|
| 0003 | Audio playing | Normal | Yes |
| 0004 | Audio noise reduction | Minor | No |
| 0005 | Location data synchronization | Major | Yes |

Step S1102: The first node sends a resource scheduling message to the second node.

Specifically, the resource scheduling message includes information indicating to enable integrity protection and/or information indicating not to enable integrity protection. For a service that does not need to enable integrity protection, the resource scheduling message may include information indicating not to enable integrity protection for the service. Correspondingly, for a service that needs to enable integrity protection, the resource scheduling message may include a MAC length indicating to perform integrity protection on data of the service.

For example, an identifier of a second service corresponds to the second service type, and integrity protection does not need to be performed on data of a service whose type is the second service type. Therefore, the resource scheduling message may include a first field, and data in the first field may be used to indicate that integrity protection is not enabled for the service corresponding to the identifier of the at least one second service. For example, when the data in the first field is "0", it indicates that integrity protection is not enabled for the service corresponding to the identifier of the second service.

The first node sends the resource scheduling message to the second node, and correspondingly, the second node receives the resource scheduling message from the first node.

Step S1103: The second node determines, based on the resource scheduling message, that integrity protection is not to be enabled for a service corresponding to the identifier of the at least one second service. It should be noted that, this step is optional, and is performed only when at least one second service exists.

Specifically, the resource scheduling message may include the first field, and the data in the first field may be used to indicate that integrity protection is not enabled for the service corresponding to the identifier of the at least one second service. For example, when the data in the first field is "0", it indicates that integrity protection is not enabled for the service corresponding to the identifier of the second service.

Step S1104: The second node determines, based on the resource scheduling message, that integrity protection is to be enabled for a service corresponding to an identifier of the at least one first service. It should be noted that, this step is optional, and is performed only when at least one first service exists. Specifically, for a service for which integrity protection needs to be enabled, the resource scheduling message may include a MAC length indicating to perform integrity protection on data of the service. For example, an identifier of a first service corresponds to a first service type, and integrity protection needs to be performed on data of a service whose type is the first service type. Therefore, the resource scheduling message includes information indicating that integrity protection is to be enabled for the service corresponding to the identifier of the first service. Specifically, there may be the following three implementations.

Manner 1: The resource scheduling message may include a second field, and data in the second field may be used to indicate to enable integrity protection. For example, when the data in the second field is "1", it indicates that integrity protection is enabled for the service corresponding to the identifier of the first service.

Manner 2: When the resource scheduling message carries an algorithm/or a MAC length for performing integrity protection on the data of the service, the resource scheduling message may indicate the second node to enable integrity protection for the service. For example, the resource scheduling message includes the target MAC length of the user plane corresponding to the first service, or the resource scheduling message includes information used to indicate the target MAC length of the user plane corresponding to the first service. The target MAC length of the user plane corresponding to the first service is used to indicate a length of MAC for performing integrity protection on the data of the first service. Further, the target MAC length of the user plane corresponding to the first service may be determined based on the method described in the embodiment shown in FIG. 8, and details are not described herein again.

Optionally, the second node may further send a resource response message to the first node. The resource response message is used to indicate that the second node has received the resource scheduling message.

In the method shown in FIG. 11, services of different service types have different integrity protection requirements. The first node may determine, based on the identifier of the first service, whether to enable integrity protection. For example, an audio noise reduction service is a service having a relatively low security requirement, so that integrity protection may not need to be performed on data of the audio noise reduction service, and therefore, a MAC length corresponding to the audio noise reduction service may not be determined.

Further, the first node may add indication information in a resource scheduling message, so that the second node determines, based on the indication information, whether integrity protection is to be enabled for a service.

The foregoing method embodiment shown in FIG. 11 includes many possible implementation solutions. The following describes some implementation solutions with reference to FIG. 12. It should be noted that, for related concepts or operations or logical relationships that are not described in FIG. 12, refer to the corresponding descriptions in the embodiment shown in FIG. 11.

Figure 12:
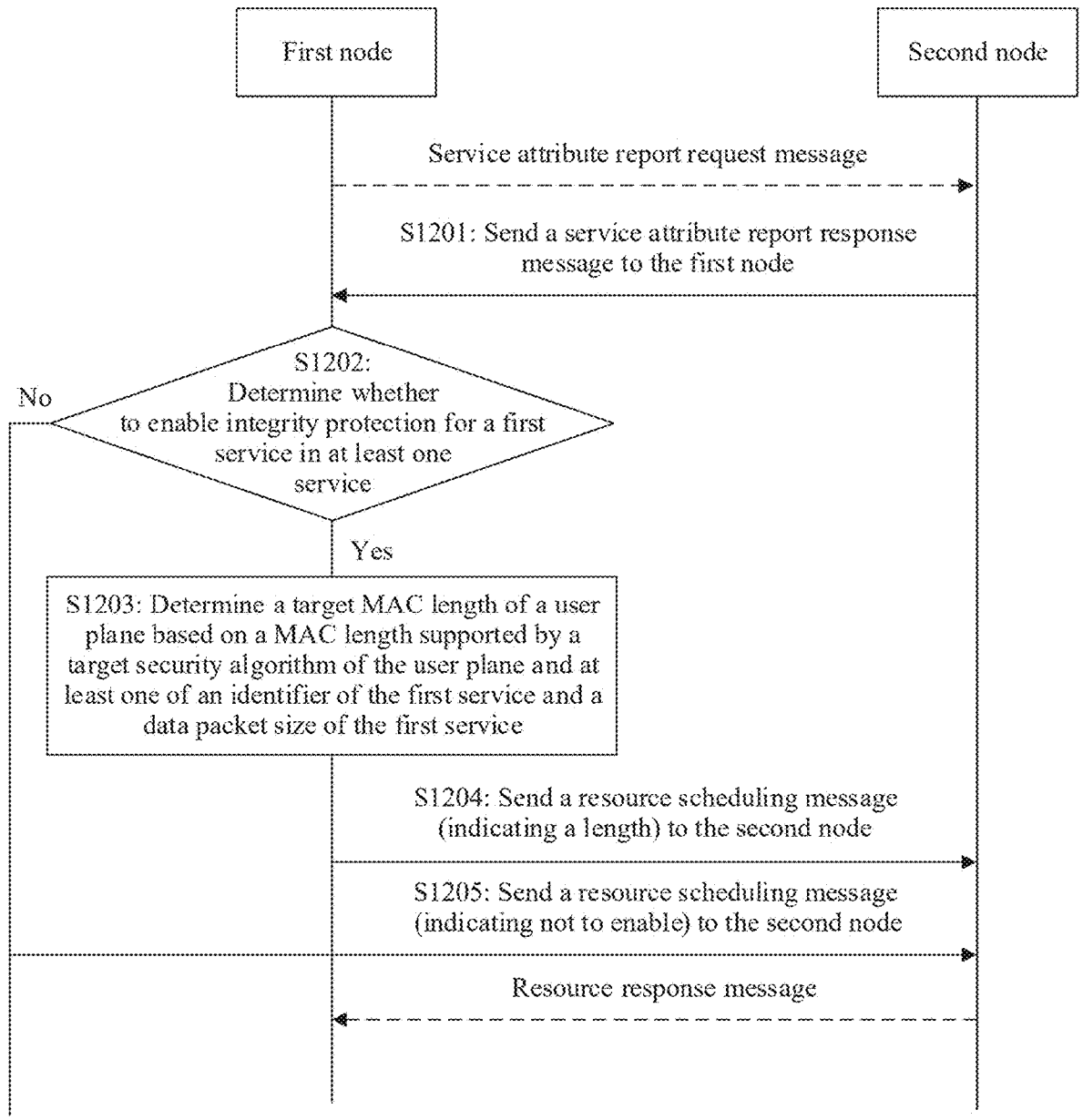
FIG. 12 is a schematic flowchart of another communication method according to an embodiment of this application.

FIG. 12 is a schematic flowchart of a communication method according to an embodiment of this application. The communication method may be implemented based on the communications system shown in FIG. 1. The method includes at least the following steps.

Step S1201: A second node sends a service attribute report response message to a first node.

Further, the service attribute report response message includes at least one service identifier, and the at least one service identifier includes a service identifier of a first service. Optionally, the service attribute report response message may further include a data packet size of at least one service, and the at least one data packet size includes a data packet size of the first service.

Optionally, the first node may send a service attribute report request message to one or more nodes including the second node, and the second node receives the service attribute report request message from the first node, to send the service attribute report response message to the first node.

Step S1202: The first node determines whether to enable integrity protection for the first service in the at least one service.

Further, the first node may determine, by using an identifier of the first service, whether to enable integrity protection for the service. For example, Table 4 is a possible service type corresponding to a service identifier according to this embodiment of this application. It can be learned that an identifier "0001" indicates a video upload service, and integrity protection needs to be enabled. Correspondingly, an identifier "0004" indicates an audio noise reduction service, and integrity protection does not need to be enabled.

Step S1203: If the first node determines that integrity protection needs to be enabled for the first service, the first node determines a target MAC length of a user plane based on a MAC length supported by a target security algorithm of the user plane and at least one of the identifier of the first service and the data packet size of the first service.

Further, the service attribute report message includes the service identifier of the first service. Therefore, the first node may determine the target MAC length of the user plane based on the MAC length supported by the user plane and the identifier of the first service. Further, optionally, when the service attribute report message includes the data packet size corresponding to the first service, the first node may determine the target MAC length of the user plane based on the MAC length supported by the target security algorithm of the user plane and at least one of the identifier of the first service and the data packet size of the first service. The target MAC length of the user plane is used to indicate a length of a MAC for performing integrity protection on data of the first service. For a specific method for determining a target MAC length of a user plane, refer to detailed descriptions of step S802. Details are not described herein again.

Step S1204: The first node sends a resource scheduling message to the second node.

Further, when integrity protection needs to be enabled for the first service, the resource scheduling message includes the target MAC length of the user plane, or the resource scheduling message includes information used to indicate the target MAC length of the user plane. The target MAC length of the user plane is used to indicate a length of a MAC for performing integrity protection on data of the first service.

Correspondingly, the second node receives the resource scheduling message, and may obtain the target MAC length of the user plane.

Step S1205: If the first node determines that integrity protection does not need to be enabled for the first service, the first node sends a resource scheduling message to the second node.

Further, when integrity protection does not need to be enabled for the first service, there may be a first field in the resource scheduling message, and data in the first field may be used to indicate that integrity protection is not enabled for the service corresponding to the identifier of the first service. For example, when the data in the first field is "0", it indicates that integrity protection is not enabled for the service corresponding to the identifier of the first service.

Optionally, the service attribute report response message may carry identifiers of a plurality of services. In this case, the second node may determine whether integrity protection is enabled for the plurality of services. Correspondingly, the resource scheduling message may be used to indicate whether integrity protection is enabled for the plurality of services. For a service for which integrity protection needs to be enabled, MAC lengths separately corresponding to the plurality of services need to be further included.

Correspondingly, the second node receives the resource scheduling message, and may determine not to enable integrity protection for the first service.

Optionally, the second node may further send a resource response message to the first node. The resource response message is used to indicate that the first node has received the resource scheduling message.

Figure 13:
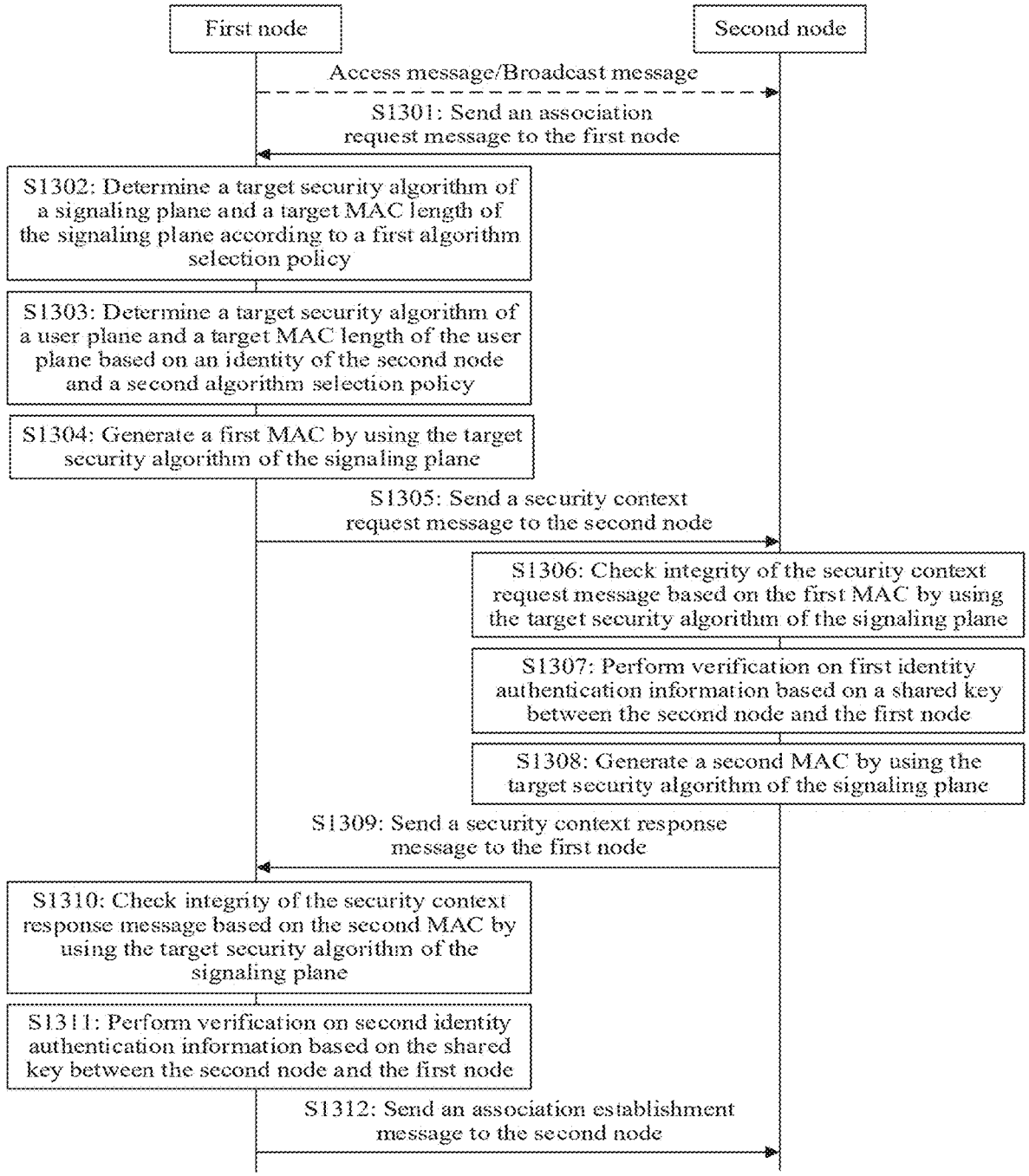
FIG. 13 is a schematic flowchart of another communication method according to an embodiment of this application.

FIG. 13 is a schematic flowchart of a communication method according to an embodiment of this application. The communication method may be implemented based on the communications system shown in FIG. 1. The method includes at least the following steps.

Step S1301: A second node sends an association request message to a first node.

Further, a first message includes information about a security algorithm supported by the second node and an identity of the second node. The security algorithm supported by the second node includes one or more of an encryption algorithm, an integrity protection algorithm, an authentication encryption algorithm, or the like supported by the second node. Optionally, the information about the security algorithm supported by the second node may alternatively be referred to as a security capability (Sec Capabilities) of the second node. The identity of the second node is also referred to as a device identifier of the second node, and the identity of the second node may be an ID, a MAC address, a domain name, a domain address, or another user-defined identifier of the second node. The ID of the second node may be a fixed ID, or may be a temporary ID.

Optionally, the first message may further include a fresh parameter obtained (or generated) by the second node.

Optionally, the first node may send an access message or a broadcast message, and the second node receives the access message or the broadcast message from the first node, to send a first association request message to the first node.

Step S1302: The first node determines a target security algorithm of a signaling plane and a target MAC length of the signaling plane according to a first algorithm selection policy. For specific descriptions, refer to step S302.

Step S1303: The first node determines a target security algorithm of a user plane and a target MAC length of the user plane based on the identity of the second node and a second algorithm selection policy.

Further, there may be at least the following three manners.

Manner 1: The first node determines the target security algorithm of the user plane according to the second algorithm selection policy. Further, the first node determines a second length selection policy based on the identity of the second node such that the target MAC length of the user plane may be determined based on the second length selection policy and the target security algorithm of the user plane.

Manner 2: The first node determines the target security algorithm of the user plane according to the second algorithm selection policy, and further determines, based on a MAC length supported by the target security algorithm of the user plane and a correspondence between the identity of the second node and a MAC length, the MAC length corresponding to the identity of the second node as the target MAC length of the user plane.

Manner 3: The first node determines the target security algorithm of the user plane based on the second algorithm selection policy. The first node may determine a second length selection policy, and determine the target MAC length of the user plane according to the second length selection policy. The target MAC length of the user plane is a MAC length supported by the target security algorithm of the user plane. Optionally, the second length selection policy may be a length selection policy preconfigured or predefined in the first node. Therefore, when the second length selection policy is determined, the identity of the second node may not be used.

Step S1304: The first node generates a first MAC by using the target security algorithm of the signaling plane.

For specific descriptions, refer to step S303.

Optionally, the communication method in this embodiment of this application may further include step S1305 or some or all of step S1305 to step S1312. Step S1305 to step S1312 are specifically as follows.

Step S1305: The first node sends a security context request message to the second node.

Further, the security context request message includes the first MAC, information indicating the target security algorithm of the signaling plane, information indicating the target security algorithm of the user plane, information indicating the target MAC length of the signaling plane, and information indicating the target MAC length of the user plane, and the first MAC is used to verify integrity of the security context request message. Optionally, the security context request message may further include a second fresh parameter obtained (or generated) by the first node.

Optionally, the security context request message further includes first identity authentication information. The first identity authentication information is generated by the first node based on a shared key between the first node and the second node. For a detailed description, refer to corresponding descriptions in S304.

Optionally, the security context request message may be encrypted by using an encryption key of the first node. Correspondingly, after receiving the security context request message, the second node decrypts message content by using a corresponding encryption key.

Step S1306: The second node checks integrity of the security context request message based on the first MAC by using the target security algorithm of the signaling plane.

For specific descriptions, refer to step S305.

Step S1307: The second node performs verification on the first identity authentication information based on the shared key between the second node and the first node.

For specific descriptions, refer to step S306.

Step S1308: The second node generates a second MAC by using the target security algorithm of the signaling plane.

For specific descriptions, refer to step S307.

Step S1309: The second node sends a security context response message to the first node.

For specific descriptions, refer to step S308.

Step S1310: The second node checks integrity of the security context response message based on the second MAC by using the target security algorithm of the signaling plane.

For specific descriptions, refer to step S309.

Step S1311: The first node performs verification on the second identity authentication information based on the shared key between the first node and the second node.

For specific descriptions, refer to step S310.

Step S1312: The first node sends an association establishment message to the second node.

Further, the association establishment message indicates the second node to establish an association with the first node.

For specific descriptions, refer to step S311.

In the embodiment shown in FIG. 13, different policies may be configured in the first node to determine different MAC lengths, to improve flexibility of the MAC length. Further, the first node may determine the target security algorithm of the user plane and the target MAC of the user plane based on the identity of the second node, to meet requirements of different types of nodes for MAC lengths. For example, some nodes that process important services may use a relatively long MAC length to improve security. For another example, some assistant nodes or ordinary nodes may use a relatively short MAC length to reduce resource consumption and improve communication efficiency.

The foregoing describes in detail the methods in embodiments of this application. The following provides apparatuses in embodiments of this application.

Figure 14:
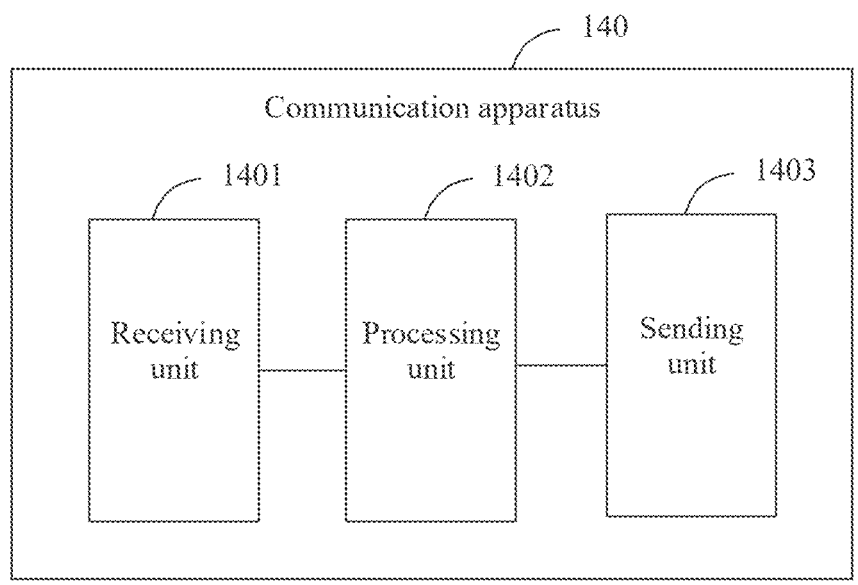
FIG. 14 is a schematic diagram of a structure of a communication apparatus according to an embodiment of this application.

FIG. 14 is a schematic diagram of a structure of a communication apparatus 140 according to an embodiment of this application. The apparatus 140 may be a node, or may be a component such as a chip or an integrated circuit in a node. The apparatus 140 may include a receiving unit 1401 and a processing unit 1402. Descriptions of the units are as follows.

The receiving unit 1401 is configured to receive an association request message from a second node. The association request message includes information about a security algorithm supported by the second node.

The processing unit 1402 is configured to determine a target security algorithm of a signaling plane and a target MAC length of the signaling plane according to a first algorithm selection policy. The target security algorithm of the signaling plane belongs to a set of security algorithms indicated by the information about the security algorithm supported by the second node.

The processing unit 1402 is further configured to generate a first MAC by using the target security algorithm of the signaling plane. A length of the first MAC is the target MAC length of the signaling plane.

In this embodiment of this application, the apparatus 140 determines the target security algorithm of the signaling plane and the target MAC length of the signaling plane based on the information about the security algorithm supported by the second node and by using a preconfigured or predefined algorithm policy, and then uses the target MAC length of the signaling plane as a MAC length of a signaling message between a first node and the second node. In this way, different MAC lengths can be determined based on different policies configured in the apparatus 140, to improve flexibility of the MAC length. Further, an algorithm selection policy may be preconfigured or predefined based on a communication requirement of the first node. For example, an algorithm with relatively high security and a relatively long MAC length may be preferentially selected, to improve data security.

In a possible implementation, the processing unit 1402 is specifically configured to: determine the target security algorithm of the signaling plane and the target MAC length of the signaling plane according to a first length selection policy and the first algorithm selection policy.

In another possible implementation, the processing unit 1402 is specifically configured to: determine the target security algorithm of the signaling plane according to the first algorithm selection policy, where a MAC length corresponding to the target security algorithm of the signaling plane is the target MAC length of the signaling plane.

In another possible implementation, the apparatus 140 further includes: a sending unit 1403, configured to send a security context request message to the second node, where the security context request message includes the first MAC, information indicating the target security algorithm of the signaling plane, and the target MAC length of the signaling plane, and the first MAC is used to check integrity of the security context request message.

In another possible implementation, the apparatus 140 further includes a sending unit 1403 configured to send a security context request message to the second node, where the security context request message includes the first MAC and information indicating the target security algorithm of the signaling plane, the first MAC is used to check integrity of the security context request message, and the first MAC is further used to indicate the target MAC length of the signaling plane.

In another possible implementation, the apparatus further includes a sending unit 1403 configured to send a security context request message to the second node. The security context request message includes the first MAC, information indicating the target security algorithm of the signaling plane, the target MAC length of the signaling plane, and first identity authentication information; the first MAC is used to check integrity of the security context request message; and the first identity authentication information is generated based on a shared key between a first node and the second node.

The receiving unit 1401 is further configured to receive a security context response message from the second node. The security context response message includes second identity authentication information and a second MAC, a length of the second MAC is the target MAC length of the signaling plane, the second identity authentication information is used to verify an identity of the second node, and the second MAC is used to check integrity of the security context response message.

In another possible implementation, the security context request message further includes a target security algorithm of a user plane, and the processing unit 1402 is further configured to determine the target security algorithm of the user plane according to a second algorithm selection policy, where the target security algorithm of the user plane belongs to the set of security algorithms indicated by the information about the security algorithm supported by the second node.

In another possible implementation, the receiving unit 1401 is further configured to obtain an identifier of a first service and/or a data packet size of the first service.

The processing unit 1402 is further configured to determine a target MAC length of the user plane based on a MAC length supported by the target security algorithm of the user plane and at least one of the identifier of the first service and the data packet size of the first service. The target MAC length of the user plane is used to indicate a length of a MAC for performing integrity protection on data of the first service.

The sending unit 1403 is further configured to send a resource scheduling message to the second node, and the resource scheduling message includes the target MAC length of the user plane.

It should be noted that for implementation of each unit, refer to corresponding descriptions in the embodiment shown in FIG. 3. The apparatus 140 is the first node in the embodiment shown in FIG. 3.

In addition, in embodiments of this application, division of units in the apparatus is merely logical division based on functions, and is not used as a limitation on a specific structure of the apparatus. In specific implementation, some functional modules may be subdivided into more small functional modules, or some functional modules may be combined into one functional module. However, regardless of whether these functional modules are subdivided or combined, performed procedures are roughly the same. For example, the apparatus 140 is used as an example. The receiving unit 1401 and the sending unit 1403 may alternatively be combined into a communications unit, and the communications unit is configured to implement functions of the receiving unit 1401 and the sending unit 1403. Usually, each unit corresponds to program code (or program instructions) of the unit. When program code corresponding to the units is run on a processor, the units are enabled to perform corresponding procedures to implement corresponding functions.

Figure 15:
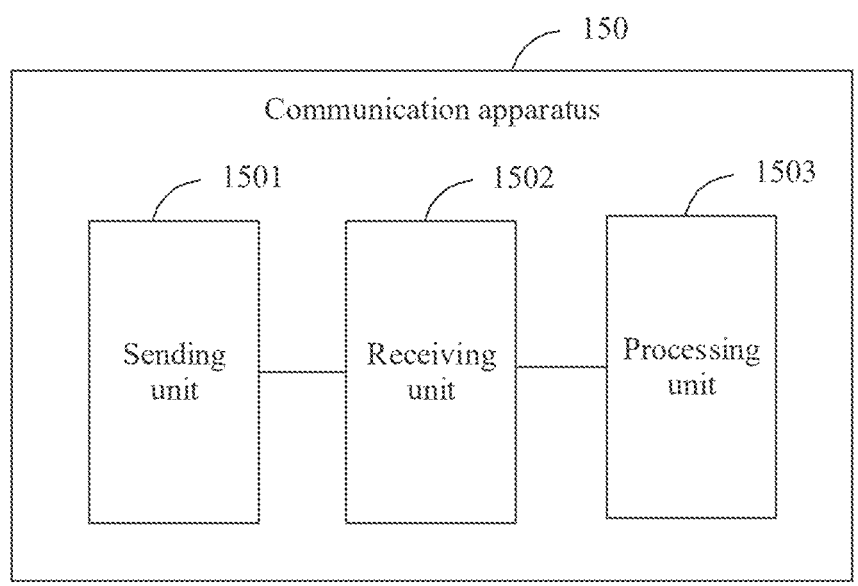
FIG. 15 is a schematic diagram of a structure of another communication apparatus according to an embodiment of this application.

FIG. 15 is a schematic diagram of a structure of a communication apparatus 150 according to an embodiment of this application. The apparatus 150 may be a node, or may be a component such as a chip or an integrated circuit in a node. The apparatus 150 may include a sending unit 1501 and a receiving unit 1502. Descriptions of the units are as follows.

The sending unit 1501 is configured to send an association request message to a first node, where the association request message includes information about a security algorithm supported by a second node.

The receiving unit 1502 is configured to receive a security context request message from the first node, where the security context request message includes information used to indicate a target security algorithm of a signaling plane and information used to indicate a target MAC length of the signaling plane, the target security algorithm of the signaling plane and the target MAC length of the signaling plane correspond to a first algorithm selection policy, and the target security algorithm of the signaling plane belongs to a set of security algorithms indicated by the information about the security algorithm supported by the second node.

In this embodiment of this application, the apparatus 150 sends, to the first node, the information about the security algorithm supported by the second node. The first node determines the target security algorithm of the signaling plane and the target MAC length of the signaling plane based on the information about the security algorithm supported by the second node and by using a preconfigured or predefined algorithm policy, and then uses the target MAC length of the signaling plane as a MAC length of a signaling message between the first node and the second node. In this way, different MAC lengths can be determined based on different policies configured in the apparatus 150, to improve flexibility of the MAC length. For example, an algorithm with relatively high security may be selected from algorithms supported by the second node, and a relatively long MAC length may further be selected, to improve data security.

In a possible implementation, the security context request message includes a first MAC, and a length of the first MAC is the target MAC length of the signaling plane. The apparatus further includes: a processing unit 1503, configured to check integrity of the security context request message based on the first MAC by using the target security algorithm of the signaling plane.

In a possible implementation, the first MAC is the information used to indicate the target MAC length of the signaling plane. In a possible implementation, the security context request message further includes first identity authentication information. The processing unit is further configured to perform verification on the first identity authentication information based on a shared key between the second node and the first node.

The processing unit 1503 is further configured to: if the check on the integrity of the security context request message succeeds and the verification on the first identity authentication information succeeds, generate a second MAC by using the target security algorithm of the signaling plane. A length of the second MAC is the target MAC length of the signaling plane.

The sending unit 1501 is further configured to send a security context response message to the first node. The security context response message includes the second MAC and second identity authentication information, and the second identity authentication information is generated based on the shared key between the second node and the first node.

In another possible implementation, the security context request message further includes information indicating a target security algorithm of a user plane, the target security algorithm of the user plane corresponds to a second algorithm selection policy, and the target security algorithm of the user plane belongs to the set of security algorithms indicated by the information about the security algorithm supported by the second node.

The receiving unit 1502 is further configured to receive a resource scheduling message from the first node. The resource scheduling message includes a target MAC length of the user plane, the target MAC length of the user plane corresponds to the target security algorithm of the user plane and at least one of an identifier of a first service and a data packet size of the first service, and the target MAC length of the user plane is used to indicate a length of a MAC for performing integrity protection on data of the first service.

It should be noted that for implementation of each unit, refer to corresponding descriptions in the embodiment shown in FIG. 3. The apparatus 150 is the second node in the embodiment shown in FIG. 3.

Figure 16:
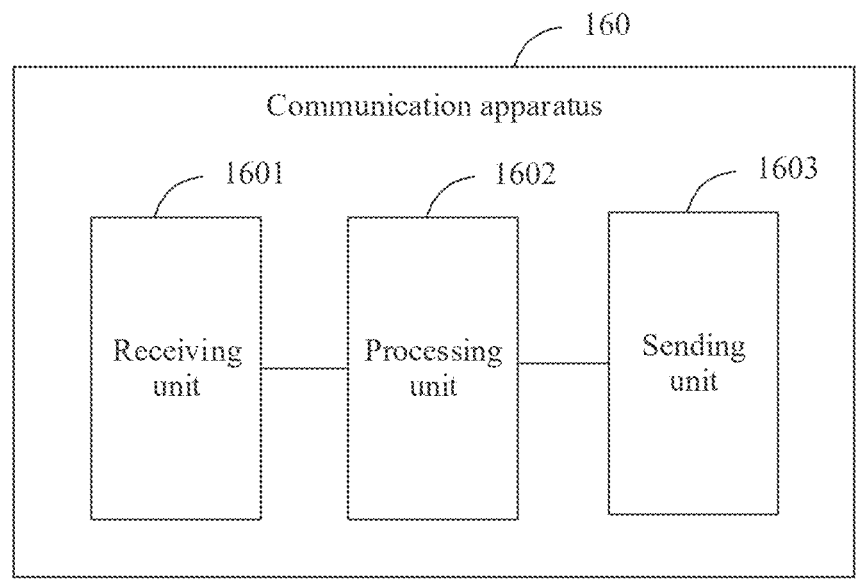
FIG. 16 is a schematic diagram of a structure of another communication apparatus according to an embodiment of this application.

FIG. 16 is a schematic diagram of a structure of a communication apparatus 160 according to an embodiment of this application. The apparatus 160 may be a node, or may be a component such as a chip or an integrated circuit in a node. The apparatus 160 may include a receiving unit 1601 and a processing unit 1602. Descriptions of the units are as follows.

The receiving unit 1601 is configured to receive a service attribute report response message from a second node, where the service attribute report response message includes an identifier of a first service and/or a data packet size of the first service.

The processing unit 1602 is configured to determine a target MAC length of a user plane based on a MAC length supported by a target security algorithm of the user plane and at least one of the identifier of the first service and the data packet size of the first service, where the target MAC length of the user plane is used to indicate a length of a MAC for performing integrity protection on data of the first service.

In this embodiment of this application, the apparatus 160 determines the target MAC length of the user plane based on a MAC length supported by a security algorithm of the user plane, the identifier of the first service, and the data packet size of the first service, and then uses the target MAC length of the user plane as a MAC length of a message used to process the first service. In this way, different MAC lengths can be determined for different services or services of different data packet sizes, to improve flexibility of the MAC length. For a service with relatively high security, a relatively long MAC length may be used such that it is difficult to be cracked, and data security is improved. In addition, for some messages that do not have a high privacy requirement or have a relatively small data packet, a relatively short MAC length may be used, to avoid affecting communication efficiency and reduce resource consumption during network transmission.

In a possible implementation, the processing unit 1602 is further configured to determine, based on the MAC length supported by the target security algorithm of the user plane and a correspondence between the identifier of the first service and a MAC length, the MAC length corresponding to the identifier of the first service as the target MAC length of the user plane; or determine, based on the MAC length supported by the target security algorithm of the user plane and a correspondence between the data packet size of the first service and a MAC length, the MAC length corresponding to the data packet size of the first service as the target MAC length of the user plane.

In another possible implementation, the processing unit 1602 is further configured to determine a second length selection policy based on the identifier of the first service and/or the data packet size of the first service; and determine the target MAC length of the user plane based on the second length selection policy and the MAC length supported by the target security algorithm of the user plane.

In another possible implementation, the identifier of the first service corresponds to the first service type, and integrity protection needs to be performed on data of a service whose type is the first service type.

In another possible implementation, the apparatus 160 further includes a sending unit 1603 configured to send a resource scheduling message to the second node, and the resource scheduling message includes the target MAC length of the user plane.

In another possible implementation, the processing unit 1602 is further configured to generate a third MAC by using the target security algorithm of the user plane, where a length of the third MAC is the target MAC length of the user plane, and the third MAC is used to perform integrity protection on the data of the first service.

In another possible implementation, the receiving unit 1601 is further configured to obtain information about a security algorithm supported by the second node.

The processing unit 1602 is further configured to determine a target security algorithm of a signaling plane and a target MAC length of the signaling plane according to a first algorithm selection policy. The target security algorithm of the signaling plane belongs to a set of security algorithms indicated by the information about the security algorithm supported by the second node.

The processing unit 1602 is further configured to generate a fourth MAC by using the target security algorithm of the signaling plane, and a length of the fourth MAC is the target MAC length of the signaling plane.

The sending unit 1603 is further configured to send a resource scheduling message to the second node. The resource scheduling message includes the fourth MAC and the target MAC length of the user plane, and the fourth MAC is used to perform integrity protection on the resource scheduling message.

In another possible implementation, the processing unit 1602 is further configured to determine the target security algorithm of the user plane according to a second algorithm selection policy, where the target security algorithm of the user plane belongs to the set of security algorithms indicated by the information about the security algorithm supported by the second node.

It should be noted that for implementation of each unit, refer to corresponding descriptions in the embodiment shown in FIG. 8. The apparatus 160 is the first node in the embodiment shown in FIG. 8.

Figure 17:
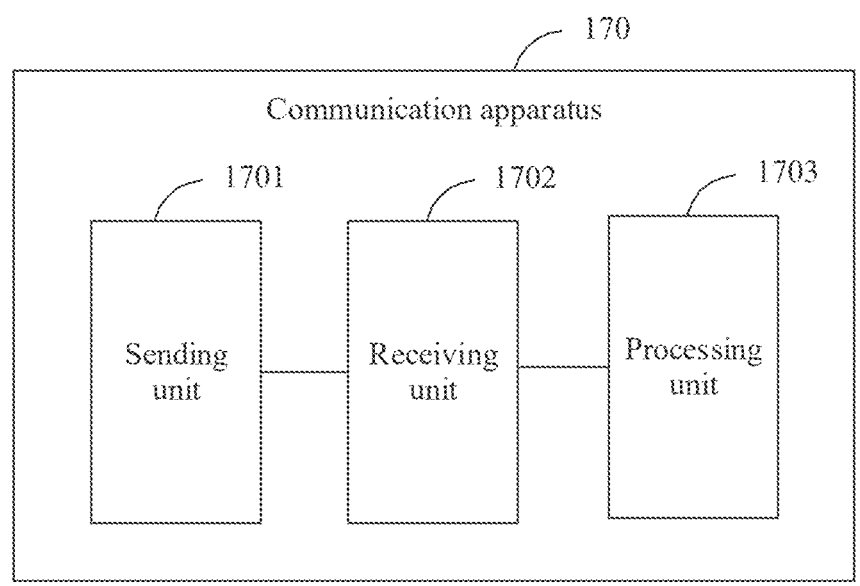
FIG. 17 is a schematic diagram of a structure of another communication apparatus according to an embodiment of this application.

FIG. 17 is a schematic diagram of a structure of a communication apparatus 170 according to an embodiment of this application. The apparatus 170 may be a node, or may be a component such as a chip or an integrated circuit in a node. The apparatus 170 may include a sending unit 1701 and a receiving unit 1702. Descriptions of the units are as follows.

The sending unit 1701 is configured to send a service attribute report response message to a first node, where the service attribute report response message includes an identifier of a first service and/or a data packet size of the first service.

The receiving unit 1702 is configured to receive a resource scheduling message from the first node, where the resource scheduling message includes a target MAC length of a user plane; the target MAC length of the user plane is a MAC length supported by a target security algorithm of the user plane, and the target MAC length of the user plane corresponds to at least one of the identifier of the first service and the data packet size of the first service; and the target MAC length of the user plane is used to indicate a length of a MAC for performing integrity protection on data of the first service.

In the embodiment, services of different service types have different integrity protection requirements. The apparatus 170 may determine, based on the identifier of the first service, whether to enable integrity protection. For example, an audio noise reduction service is a service having a relatively low security requirement such that integrity protection may not need to be performed on data of the audio noise reduction service.

In a possible implementation, the identifier of the first service corresponds to a first service type, and integrity protection needs to be performed on data of a service whose type is the first service type.

In another possible implementation, the target security algorithm of the user plane corresponds to a second algorithm selection policy, and the target security algorithm of the user plane belongs to a set of security algorithms indicated by information about a security algorithm supported by a second node.

In another possible implementation, the resource scheduling message further includes a fourth MAC, and the processing unit is further configured to: check message integrity of the resource scheduling message based on the fourth MAC by using the target security algorithm of the user plane.

It should be noted that for implementation of each unit, refer to corresponding descriptions in the embodiment shown in FIG. 8. The apparatus 170 is the second node in the embodiment shown in FIG. 8.

Figure 18:
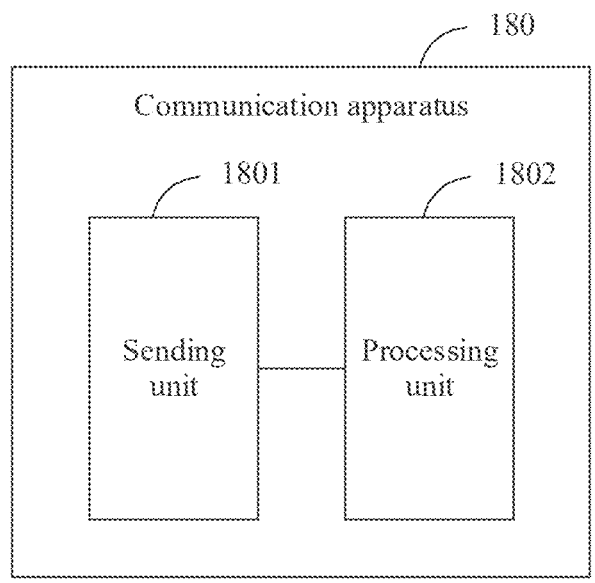
FIG. 18 is a schematic diagram of a structure of another communication apparatus according to an embodiment of this application.

FIG. 18 is a schematic diagram of a structure of a communication apparatus 180 according to an embodiment of this application. The apparatus 180 may be a node, or may be a component such as a chip or an integrated circuit in a node. The apparatus 180 may include a sending unit 1801 and a processing unit 1802. Descriptions of the units are as follows.

The sending unit 1801 is configured to send a service attribute report response message to a first node, where the service attribute report response message includes an identifier of a first service and/or a data packet size of the first service.

The processing unit 1802 is configured to determine a target MAC length of a user plane based on a MAC length supported by a target security algorithm of the user plane and at least one of the identifier of the first service and the data packet size of the first service, where the target MAC length of the user plane is used to indicate a length of a MAC for performing integrity protection on data of the first service.

A method for determining the target MAC length of the user plane that is the same as that in the first node is configured in the apparatus 180. Therefore, the apparatus 180 may determine the target MAC length of the user plane based on a MAC length supported by a security algorithm of the user plane and the identifier of the first service and/or the data packet size of the first service, and then use the target MAC length of the user plane as a MAC length of a message used to process the first service. In this way, different MAC lengths can be determined for different services or services of different data packet sizes, to improve flexibility of the MAC length.

However, the same method for determining the target MAC length of the user plane is configured in both the apparatus 180 and the first node, so that the first node determines the target MAC length of the user plane in a specific manner, and therefore the apparatus 180 also determines the target MAC length of the user plane in a same manner. In this way, a node does not need to send a target MAC length to a peer node, to save network resources.

In another possible implementation, the processing unit 1802 is specifically configured to: determine, based on the MAC length supported by the target security algorithm of the user plane and a correspondence between the identifier ID of the first service and a MAC length, the MAC length corresponding to the ID of the first service as the target MAC length of the user plane; or determine, based on the MAC length supported by the target security algorithm of the user plane and a correspondence between the data packet size of the first service and a MAC length, the MAC length corresponding to the data packet size of the first service as the target MAC length of the user plane.

In another possible implementation, the processing unit 1802 is specifically configured to: determine a second length selection policy based on the ID of the first service and/or the data packet size of the first service; and determine the target MAC length of the user plane based on the second length selection policy and the MAC length supported by the target security algorithm of the user plane.

In another possible implementation, the identifier of the first service corresponds to a first service type, and integrity protection needs to be performed on data of a service whose type is the first service type.

In another possible implementation, the target security algorithm of the user plane corresponds to a second algorithm selection policy, and the target security algorithm of the user plane belongs to a set of security algorithms indicated by information about a security algorithm supported by a second node.

It should be noted that for implementation of each unit, refer to corresponding descriptions in the embodiment shown in FIG. 8. The apparatus 180 is the second node in the embodiment shown in FIG. 8.

Figure 19:
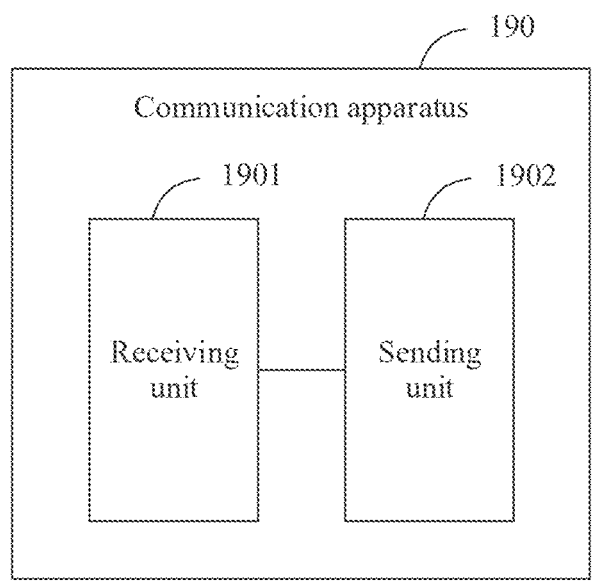
FIG. 19 is a schematic diagram of a structure of another communication apparatus according to an embodiment of this application.

FIG. 19 is a schematic diagram of a structure of a communication apparatus 190 according to an embodiment of this application. The apparatus 190 may be a node, or may be a component such as a chip or an integrated circuit in a node. The apparatus 190 may include a receiving unit 1901 and a sending unit 1902. Descriptions of the units are as follows.

The receiving unit 1901 is configured to receive a service attribute report response message from a second node, where the service attribute report response message includes at least one service identifier, the at least one service identifier includes an identifier of at least one second service, the identifier of the at least one second service corresponds to a second service type, and integrity protection does not need to be performed on data of a service whose type is the second service type.

The sending unit 1902 is configured to send a resource scheduling message to the second node, where the resource scheduling message is used to indicate that integrity protection is not to be enabled for the service corresponding to the identifier of the at least one second service.

It can be seen that services of different service types have different integrity protection requirements. The apparatus may determine, based on an identifier of a first service, whether to enable integrity protection. For example, an audio noise reduction service is a service having a relatively low security requirement, so that integrity protection may not need to be performed on data of the audio noise reduction service, and therefore, a MAC length corresponding to the audio noise reduction service may not be determined.

In a possible implementation, the at least one service identifier includes an identifier of at least one first service, the identifier of the at least one first service corresponds to a first service type, and integrity protection needs to be performed on data of a service whose type is the first service type.

In another possible implementation, the resource scheduling message is further used to indicate a target MAC length of a user plane that is used for the at least one first service.

It should be noted that for implementation of each unit, refer to corresponding descriptions in the embodiment shown in FIG. 11 or FIG. 12. The apparatus 190 may be the first node in the embodiment shown in FIG. 11 or FIG. 12.

Figure 20:
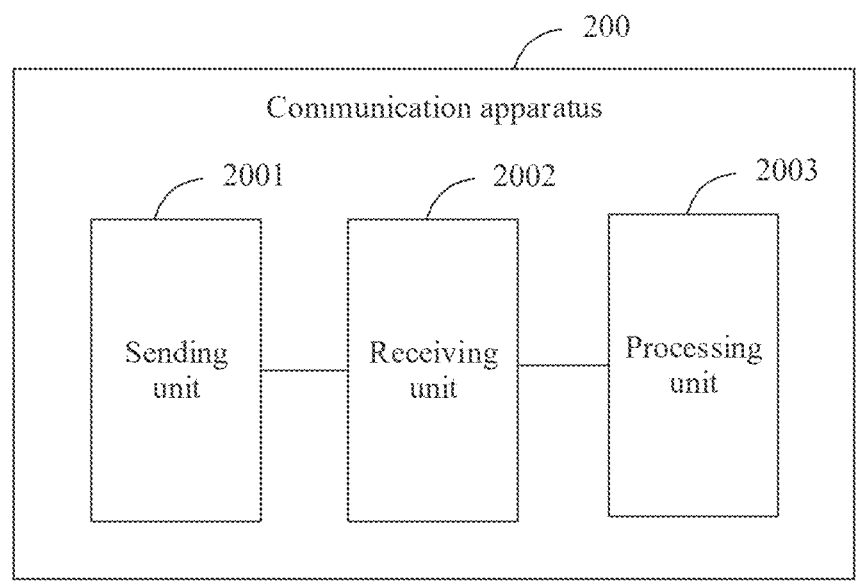
FIG. 20 is a schematic diagram of a structure of another communication apparatus according to an embodiment of this application.

FIG. 20 is a schematic diagram of a structure of a communication apparatus 200 according to an embodiment of this application. The apparatus 200 may be a node, or may be a component such as a chip or an integrated circuit in a node. The apparatus 200 may include a sending unit 2001, a receiving unit 2002, and a processing unit 2003. Descriptions of the units are as follows.

The sending unit 2001 is configured to send a service attribute report response message to a first node, where the service attribute report response message includes at least one service identifier, the at least one service identifier includes an identifier of at least one second service, the identifier of the at least one second service corresponds to a second service type, and integrity protection does not need to be performed on data of a service whose type is the second service type.

The receiving unit 2002 is configured to receive a resource scheduling message from the first node.

The processing unit 2003 is configured to determine, based on the resource scheduling message, that integrity protection is not to be enabled for the service corresponding to the identifier of the at least one second service.

It can be seen that services of different service types have different integrity protection requirements. The first node may determine, based on an identifier of a first service, whether to enable integrity protection. For example, an audio noise reduction service is a service having a relatively low security requirement, so that integrity protection may not need to be performed on data of the audio noise reduction service, and therefore, a MAC length corresponding to the audio noise reduction service may not be determined.

In a possible implementation, the at least one service identifier includes an identifier of at least one first service, the identifier of the at least one first service corresponds to a first service type, and integrity protection needs to be performed on data of a service whose type is the first service type.

The processing unit 2003 is further configured to determine, based on the resource scheduling message, that integrity protection is to be enabled for the service corresponding to the identifier of the at least one first service.

In another possible implementation, the resource scheduling message is further used to indicate a length of a MAC for performing integrity protection on data of the at least one first service.

It should be noted that for implementation of each unit, refer to corresponding descriptions in the embodiment shown in FIG. 11 or FIG. 12. The apparatus 200 is the second node in the embodiment shown in FIG. 11 or FIG. 12.

Figure 21:
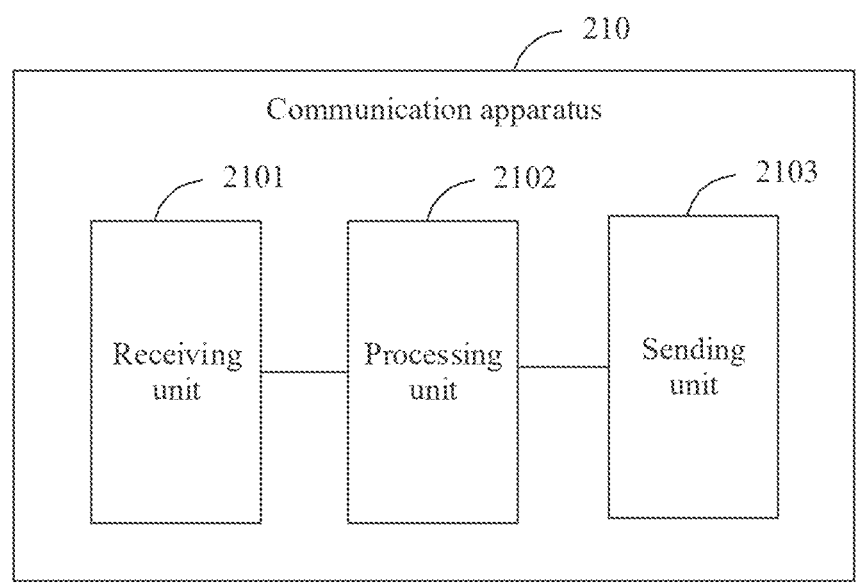
FIG. 21 is a schematic diagram of a structure of another communication apparatus according to an embodiment of this application.

FIG. 21 is a schematic diagram of a structure of a communication apparatus 210 according to an embodiment of this application. The apparatus 210 may be a node, or may be a component such as a chip or an integrated circuit in a node. The apparatus 210 may include a receiving unit 2101 and a processing unit 2102. Descriptions of the units are as follows.

The receiving unit 2101 is configured to receive an association request message from a second node, where the association request message includes information about a security algorithm supported by the second node and an identity of the second node.

The processing unit 2102 is configured to determine a target security algorithm of a signaling plane and a target MAC length of the signaling plane according to a first algorithm selection policy, where the target security algorithm of the signaling plane belongs to a set of security algorithms indicated by the information about the security algorithm supported by the second node.

The processing unit 2102 is further configured to determine a target security algorithm of a user plane and a target MAC length of the user plane based on a second algorithm selection policy and the identity of the second node. The target security algorithm of the user plane belongs to the set of security algorithms indicated by the information about the security algorithm supported by the second node, and the target MAC length of the user plane is used to indicate a length of a MAC for performing integrity protection on data of a first service.

The processing unit 2102 is further configured to generate a first MAC by using the target security algorithm of the signaling plane, and a length of the first MAC is the target MAC length of the signaling plane.

In embodiments of this application, different policies may be configured in the apparatus 210 to determine different MAC lengths, to improve flexibility of the MAC length.

Further, the apparatus 210 may determine the target security algorithm of the user plane and the target MAC of the user plane based on the identity of the second node, to meet requirements of different types of nodes for MAC lengths. For example, some nodes that process important services may use a relatively long MAC length to improve security. For another example, some assistant nodes or ordinary nodes may use a relatively short MAC length to reduce resource consumption and improve communication efficiency.

In a possible implementation, the processing unit 2102 is specifically configured to: determine the target security algorithm of the signaling plane and the target MAC length of the signaling plane according to a first length selection policy and the first algorithm selection policy.

In another possible implementation, the processing unit 2102 is specifically configured to: determine the target security algorithm of the signaling plane according to the first algorithm selection policy; and determine the target MAC length of the signaling plane according to the first length selection policy and the target security algorithm of the signaling plane.

In another possible implementation, the processing unit 2102 is specifically configured to: determine the target security algorithm of the signaling plane according to the first algorithm selection policy, where a MAC length corresponding to the target security algorithm of the signaling plane is the target MAC length of the signaling plane.

In another possible implementation, the processing unit 2102 is specifically configured to: determine the target security algorithm of the user plane according to the second algorithm selection policy; and determine a second length selection policy based on the identity of the second node; and determine the target MAC length of the signaling plane based on the second length selection policy and the target security algorithm of the user plane.

In another possible implementation, the processing unit 2102 is specifically configured to: determine the target security algorithm of the user plane according to the second algorithm selection policy; and determine, based on a MAC length supported by the target security algorithm of the user plane and a correspondence between the identity of the second node and a MAC length, the MAC length corresponding to the identity of the second node as the target MAC length of the user plane.

In another possible implementation, the apparatus further includes a sending unit 2103. The sending unit 2103 is configured to send a security context request message to the second node. The security context request message includes a first MAC, information indicating the target security algorithm of the signaling plane, information indicating the target security algorithm of the user plane, the target MAC length of the signaling plane, and the target MAC length of the user plane, and the first MAC is used to check integrity of the security context request message.

In another possible implementation, the apparatus further includes a sending unit 2103. The sending unit 2103 is configured to send a security context request message to the second node. The security context request message includes a first MAC, information indicating the target security algorithm of the signaling plane, information indicating the target security algorithm of the user plane, the target MAC length of the signaling plane, the target MAC length of the user plane, and first identity authentication information. The first MAC is used to check integrity of the security context request message, and the first identity authentication information is generated based on a shared key between the first node and the second node.

The receiving unit 2101 is further configured to receive a security context response message from the second node. The security context response message includes second identity authentication information and a second MAC, a length of the second MAC is the target MAC length of the signaling plane, the second identity authentication information is used to verify an identity of the second node, and the second MAC is used to check integrity of the security context response message.

In another possible implementation, the processing unit 2102 is further configured to check the integrity of the security context response message based on the target security algorithm of the signaling plane and the second MAC.

The processing unit 2102 is further configured to perform verification on the second identity authentication information based on the shared key.

The apparatus further includes a sending unit 2103. The sending unit 2103 is configured to send an association establishment message to the second node if the check on the integrity of the security context response message succeeds and the verification on the second identity authentication information succeeds. The association establishment message indicates the second node to establish an association with the first node.

It should be noted that for implementation of each unit, refer to corresponding descriptions in the embodiment shown in FIG. 13. The apparatus 210 is the first node in the embodiment shown in FIG. 13.

Figure 22:
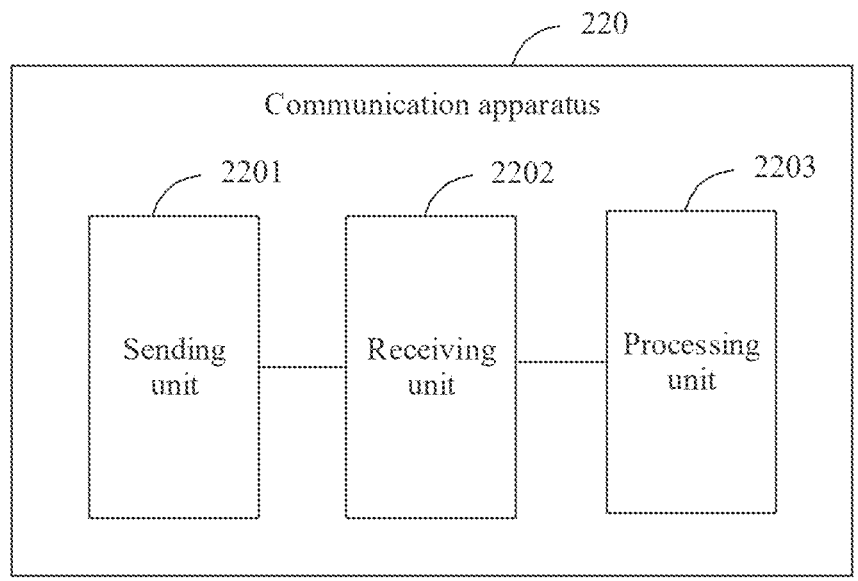
FIG. 22 is a schematic diagram of a structure of another communication apparatus according to an embodiment of this application.

FIG. 22 is a schematic diagram of a structure of a communication apparatus 220 according to an embodiment of this application. The apparatus 220 may be a node, or may be a component such as a chip or an integrated circuit in a node. The apparatus 220 may include a sending unit 2201, a receiving unit 2202, and a processing unit 2203. Descriptions of the units are as follows.

The sending unit 2201 is configured to send an association request message to a first node, where the association request message includes information about a security algorithm supported by a second node and an identity of the second node.

The receiving unit 2202 is configured to a security context request message from the first node, where the security context request message includes information used to indicate a target security algorithm of a signaling plane, information used to indicate a target security algorithm of a user plane, a target MAC length of the signaling plane, a target MAC length of the user plane, and a first MAC; the target security algorithm of the signaling plane and the target MAC length of the signaling plane correspond to a first algorithm selection policy, and the target security algorithm of the signaling plane belongs to a set of security algorithms indicated by the information about the security algorithm supported by the second node; the target security algorithm of the user plane and the target MAC length of the user plane correspond to a second algorithm selection policy and the identity of the second node, and the target security algorithm of the user plane belongs to the set of security algorithms indicated by the information about the security algorithm supported by the second node; and a length of the first MAC is the target MAC length of the signaling plane.

The processing unit 2203 is configured to check integrity of the security context request message based on the first MAC by using the target security algorithm of the signaling plane.

In embodiments of this application, different policies may be configured in the first node to determine different MAC lengths, to improve flexibility of the MAC length. Further, the first node may determine the target security algorithm of the user plane and the target MAC of the user plane based on the identity of the second node, to meet requirements of different types of nodes for MAC lengths. The apparatus 220 obtains the target MAC length from the first node, and protects message integrity by using the target MAC length. For example, some nodes that process important services may use a relatively long MAC length to improve security. For another example, some assistant nodes or ordinary nodes may use a relatively short MAC length to reduce resource consumption and improve communication efficiency.

In a possible implementation, the target security algorithm of the signaling plane and the target MAC length of the signaling plane are determined according to the first algorithm selection policy, the target security algorithm of the signaling plane belongs to the set of security algorithms indicated by the information about the security algorithm supported by the second node, and the first MAC is generated according to the target security algorithm of the signaling plane.

In another possible implementation, the target security algorithm of the user plane and the target MAC length of the user plane are determined according to the second algorithm selection policy, the target security algorithm of the user plane belongs to the set of security algorithms indicated by the information about the security algorithm supported by the second node, and the first MAC is generated according to the target security algorithm of the signaling plane.

In another possible implementation, the security context request message further includes first identity authentication information. The processing unit 2203 is further configured to: perform verification on the first identity authentication information based on a shared key between the second node and the first node The processing unit 2202 is further configured to: if the check on the integrity of the security context request message succeeds and the verification on the first identity authentication information succeeds, generate a second MAC by using the target security algorithm of the signaling plane. A length of the second MAC is the target MAC length of the signaling plane.

The receiving unit 2202 is further configured to send a security context response message to the first node. The security context response message includes the second MAC and second identity authentication information, and the second identity authentication information is generated based on the shared key between the second node and the first node.

In another possible implementation, the receiving unit 2202 is further configured to receive an association establishment message from the first node. The association establishment message indicates the second node to establish an association with the first node.

It should be noted that for implementation of each unit, refer to corresponding descriptions in the embodiment shown in FIG. 13. The apparatus 220 is the second node in the embodiment shown in FIG. 13.

Figure 23:
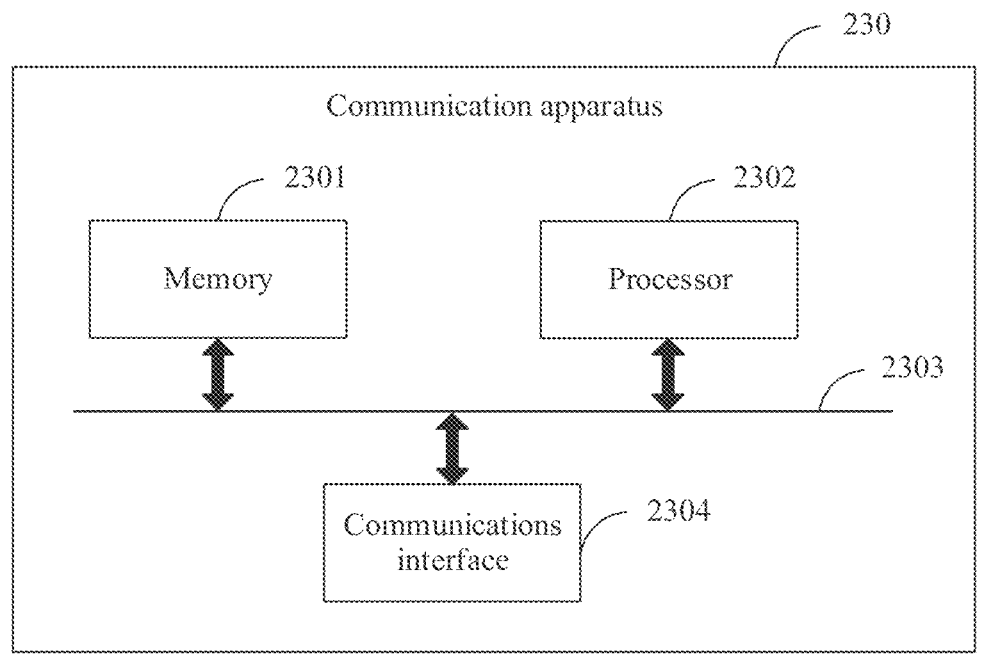
FIG. 23 is a schematic diagram of a structure of another communication apparatus according to an embodiment of this application.

FIG. 23 is a schematic diagram of a structure of a communication apparatus 230 according to an embodiment of this application. The apparatus 230 may be a node, or may be a component in a node. The apparatus 230 may include at least one memory 2301 and at least one processor 2302. Optionally, the apparatus may further include a bus 2303. Optionally, the apparatus may further include a communications interface 2304. The memory 2301, the processor 2302, and the communications interface 2304 are connected through the bus 2303.

The memory 2301 is configured to provide storage space, and the storage space may store data such as an operating system and a computer program. The memory 2301 may be one or a combination of a random-access memory (RAM), a read-only memory (ROM), an erasable programmable ROM (EPROM), a compact disc ROM (CD-ROM), or the like.

The processor 2302 is a module that performs an arithmetic operation and/or a logic operation, and may be specifically one or a combination of processing modules such as a central processing unit (CPU), a graphics processing unit (GPU), a microprocessor unit (MPU), an application-specific integrated circuit (ASIC), a field-programmable gate array (FPGA), and a complex programmable logic device (CPLD).

The communications interface 2304 is configured to receive data sent from the outside and/or send data to the outside, and may be an interface of a wired link such as an Ethernet cable, or may be a wireless link (Wi-Fi, Bluetooth, or the like) interface. Optionally, the communications interface 2304 may further include a transmitter (for example, a radio frequency transmitter or an antenna), a receiver, or the like coupled to the interface.

The processor 2302 in the apparatus 230 is configured to read the computer program stored in the memory 2301, to perform the foregoing communication method, for example, the communication method described in FIG. 3, FIG. 8, FIG. 11, FIG. 12, or FIG. 13.

For example, the processor 2302 in the apparatus 230 is configured to read the computer program stored in the memory 2301, to perform the following operations: receiving an association request message from a second node through the communications interface 2304, where the association request message includes information about a security algorithm supported by the second node; determining a target security algorithm of a signaling plane and a target MAC length of the signaling plane according to a first algorithm selection policy, where the target security algorithm of the signaling plane belongs to a set of security algorithms indicated by the information about the security algorithm supported by the second node; and generating a first MAC by using the target security algorithm of the signaling plane, where a length of the first MAC is the target MAC length of the signaling plane.

In this embodiment of this application, the apparatus 230 determines the target security algorithm of the signaling plane and the target MAC length of the signaling plane based on the information about the security algorithm supported by the second node and by using a preconfigured or predefined algorithm policy, and then uses the target MAC length of the signaling plane as a MAC length of a signaling message between a first node and the second node. In this way, different MAC lengths can be determined based on different policies configured in the apparatus 230, to improve flexibility of the MAC length. Further, an algorithm selection policy may be preconfigured or predefined based on a communication requirement of the first node. For example, an algorithm with relatively high security and a relatively long MAC length may be preferentially selected, to improve data security.

In a possible implementation, the processor 2302 is specifically configured to determine the target security algorithm of the signaling plane and the target MAC length of the signaling plane according to a first length selection policy and the first algorithm selection policy.

In another possible implementation, the processor 2302 is specifically configured to: determine the target security algorithm of the signaling plane according to the first algorithm selection policy; and determine the target MAC length of the signaling plane according to the first length selection policy and the target security algorithm of the signaling plane.

In another possible implementation, the processor 2302 is specifically configured to determine a target security algorithm of the signaling plane according to the first algorithm selection policy, where a MAC length corresponding to the target security algorithm of the signaling plane is the target MAC length of the signaling plane.

In another possible implementation, the processor 2302 is further configured to send a security context request message to the second node through the communications interface 2304, where the security context request message includes the first MAC, information indicating the target security algorithm of the signaling plane, and the target MAC length of the signaling plane, and the first MAC is used to check integrity of the security context request message.

It can be seen that the apparatus 230 may add, in the security context request message, the information indicating the target security algorithm of the signaling plane and the target MAC length of the signaling plane, so that the second node may obtain the target security algorithm of the signaling plane and the target MAC length of the signaling plane by using the security context request message. Further, the security context request message may carry the first MAC that is used by the second node to check the integrity of the security context request message, to prevent the security context request message from being tampered with by an attacker.

In another possible implementation, the processor 2302 is further configured to send a security context request message to the second node through the communications interface 2304, where the security context request message includes the first MAC and information indicating the target security algorithm of the signaling plane, the first MAC is used to check integrity of the security context request message, and the first MAC is further used to indicate the target MAC length of the signaling plane.

In another possible implementation, after determining the target security algorithm of the signaling plane and the target MAC length of the signaling plane according to the first algorithm selection policy, the processor 2302 is further configured to: send a security context request message to the second node through the communications interface 2304, where the security context request message includes the first MAC, information indicating the target security algorithm of the signaling plane, the target MAC length of the signaling plane, and first identity authentication information, the first MAC is used to check integrity of the security context request message, and the first identity authentication information is generated based on a shared key between the first node and the second node; and receiving a security context response message from the second node through the communications interface 2304, where the security context response message includes second identity authentication information and a second MAC, a length of the second MAC is the target MAC length of the signaling plane, the second identity authentication information is used to verify an identity of the second node, and the second MAC is used to check integrity of the security context response message.

The shared key is a secret value shared between the first node and the second node, and may be used to generate identity authentication information for verifying an identity of a node. It can be seen that the apparatus 230 may generate the first identity authentication information by using the shared key, and the first identity authentication information is used by the second node to verify an identity of the first node. Correspondingly, the first node may also verify an identity of the second node by using the second identity authentication information. If an attacker wants to obtain the target security algorithm of the signaling plane or the target MAC length of the signaling plane by forging an identity of the second node, verification performed by the apparatus 230 on the identity cannot succeed because the shared key cannot be forged. Therefore, it is avoided that the first node communicates with an untrusted node, and communication security of the first node is improved.

In another possible implementation, the processor 2302 is further configured to: check the integrity of the security context response message based on the target security algorithm of the signaling plane and the second MAC; perform verification on the second identity authentication information based on the shared key; and send an association establishment message to the second node if the check on the integrity of the security context response message succeeds and the verification on the second identity authentication information succeeds, where the association establishment message indicates the second node to establish an association with the first node.

In another possible implementation, the security context request message further includes a target security algorithm of a user plane. The processor 2302 is further configured to determine the target security algorithm of the user plane according to a second algorithm selection policy, where the target security algorithm of the user plane belongs to the set of security algorithms indicated by the information about the security algorithm supported by the second node.

In another possible implementation, the processor 2302 is further configured to: obtain an identifier of a first service and/or a data packet size of the first service; determine a target MAC length of the user plane based on a MAC length supported by the target security algorithm of the user plane and at least one of the identifier of the first service and the data packet size of the first service, where the target MAC length of the user plane is used to indicate a length of a MAC for performing integrity protection on data of the first service; and send a resource scheduling message to the second node through the communications interface 2304, where the resource scheduling message includes the target MAC length of the user plane.

It can be seen that the target MAC length of the user plane may be determined based on the MAC length supported by a security algorithm of the user plane, the identifier of the first service, and the data packet size of the first service. Different MAC lengths may be determined for different services or services with different data packet sizes. This improves flexibility of the MAC length. For a service with relatively high security, a relatively long MAC length may be used, so that it is difficult to be cracked, and data security is improved.

It should be noted that for implementation of each unit, refer to corresponding descriptions in the embodiment shown in FIG. 3. The apparatus 230 is the first node in the embodiment shown in FIG. 3.

Figure 24:
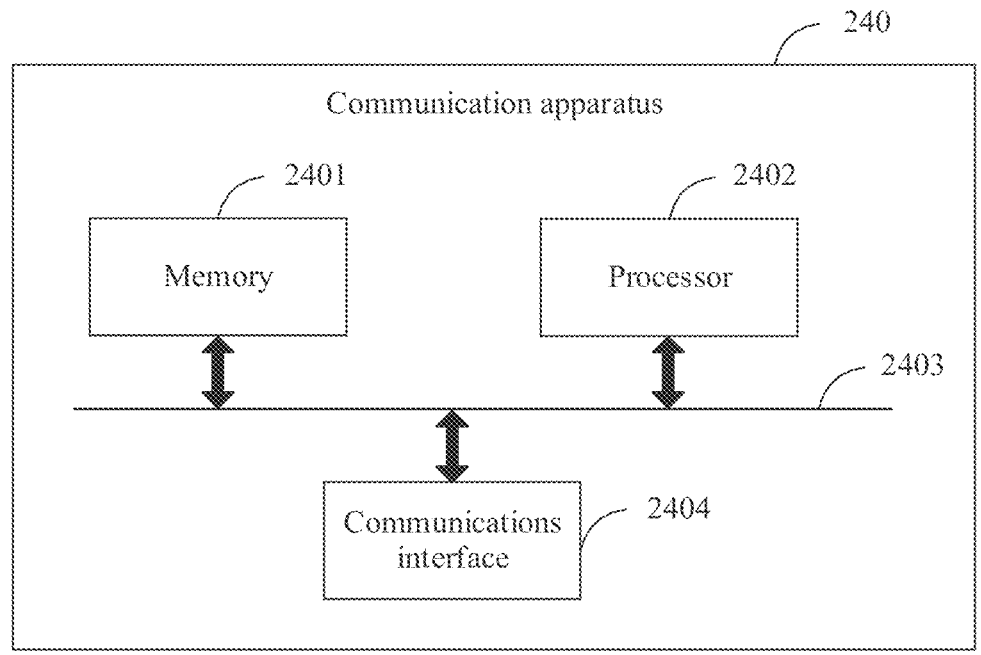
FIG. 24 is a schematic diagram of a structure of another communication apparatus according to an embodiment of this application.

FIG. 24 is a schematic diagram of a structure of a communication apparatus 240 according to an embodiment of this application. The apparatus 240 may be a node, or may be a component in a node. The apparatus 240 may include at least one memory 2401 and at least one processor 2402. Optionally, the apparatus may further include a bus 2403. Optionally, the apparatus may further include a communications interface 2404. The memory 2401, the processor 2402, and the communications interface 2404 are connected through the bus 2403.

The memory 2401 is configured to provide storage space, and the storage space may store data such as an operating system and a computer program. The memory 2401 may be one or a combination of a RAM, a ROM, an EPROM, a CD-ROM, and the like.

The processor 2402 is a module that performs an arithmetic operation and/or a logic operation, and may be specifically one or a combination of processing modules such as a CPU, a GPU, an MPU, an ASIC, an FPGA, and a CPLD.

The communications interface 2404 is configured to receive data sent from the outside and/or send data to the outside, and may be an interface of a wired link such as an Ethernet cable, or may be a wireless link (Wi-Fi, Bluetooth, or the like) interface. Optionally, the communications interface 2404 may further include a transmitter (for example, a radio frequency transmitter or an antenna), a receiver, or the like coupled to the interface.

The processor 2402 in the apparatus 240 is configured to read the computer program stored in the memory 2401, to perform the foregoing communication method, for example, the communication method described in FIG. 3.

For example, the processor 2402 in the apparatus 240 is configured to read the computer program stored in the memory 2401, to perform the following operations: sending an association request message to a first node through the communications interface 2404, where the association request message includes information about a security algorithm supported by a second node; and receiving a security context request message from the first node through the communications interface 2404, where the security context request message includes information used to indicate a target security algorithm of a signaling plane, a target MAC length of the signaling plane, and a first MAC, the target security algorithm of the signaling plane and the target MAC length of the signaling plane correspond to a first algorithm selection policy, and the target security algorithm of the signaling plane belongs to a set of security algorithms indicated by the information about the security algorithm supported by the second node.

In this embodiment of this application, the apparatus 240 sends, to the first node, the information about the security algorithm supported by the second node. The first node determines the target security algorithm of the signaling plane and the target MAC length of the signaling plane based on the information about the security algorithm supported by the second node and by using a preconfigured or predefined algorithm policy, and then uses the target MAC length of the signaling plane as a MAC length of a signaling message between the first node and the second node. In this way, different MAC lengths can be determined based on different policies configured in the apparatus 240, to improve flexibility of the MAC length. For example, an algorithm with relatively high security may be selected from algorithms supported by the second node, and a relatively long MAC length may further be selected, to improve data security.

In a possible implementation, the security context request message includes the first MAC, and a length of the first MAC is the target MAC length of the signaling plane. The processor 2402 is specifically configured to check integrity of the security context request message based on the first MAC by using the target security algorithm of the signaling plane.

In a possible implementation, the first MAC is information used to indicate the target MAC length of the signaling plane.

In a possible implementation, the target security algorithm of the signaling plane and the target MAC length of the signaling plane are determined according to the first algorithm selection policy, and the first MAC is generated according to the target security algorithm of the signaling plane.

In another possible implementation, the security context request message further includes first identity authentication information. The processor 2402 is further configured to: performing verification on the first identity authentication information based on a shared key between the second node and the first node; if the check on the integrity of the security context request message succeeds and the verification on the first identity authentication information succeeds, generating a second MAC by using the target security algorithm of the signaling plane, where a length of the second MAC is the target MAC length of the signaling plane; and sending a security context response message to the first node through the communications interface 2404, where the security context response message includes the second MAC and second identity authentication information, and the second identity authentication information is generated based on the shared key between the second node and the first node.

In another possible implementation, the processor 2402 is further configured to receive an association establishment message from the first node through the communications interface 2404. The association establishment message indicates the second node to establish an association with the first node.

In another possible implementation, the security context request message further includes information indicating a target security algorithm of a user plane, the target security algorithm of the user plane corresponds to a second algorithm selection policy, and the target security algorithm of the user plane belongs to the set of security algorithms indicated by the information about the security algorithm supported by the second node. The method further includes: receiving a resource scheduling message from the first node through the communications interface 2404, where the resource scheduling message includes a target MAC length of the user plane, the target MAC length of the user plane corresponds to the target security algorithm of the user plane and at least one of an identifier of a first service and a data packet size of the first service, and the target MAC length of the user plane is used to indicate a length of a MAC for performing integrity protection on data of the first service.

It can be seen that different MAC lengths can be determined for different services or services of different data packet sizes, to improve flexibility of the MAC length. For a service with relatively high security, a relatively long MAC length may be used, so that it is difficult to be cracked, and data security is improved.

Further, the first node may add, in the resource scheduling message, the information indicating the target security algorithm of the user plane and the target MAC length of the user plane, so that the apparatus 240 may obtain the target security algorithm of the user plane and the target MAC length of the user plane by using the resource scheduling message.

It should be noted that for implementation of each unit, refer to corresponding descriptions in the embodiment shown in FIG. 3. The apparatus 240 is the second node in the embodiment shown in FIG. 3.

Figure 25:
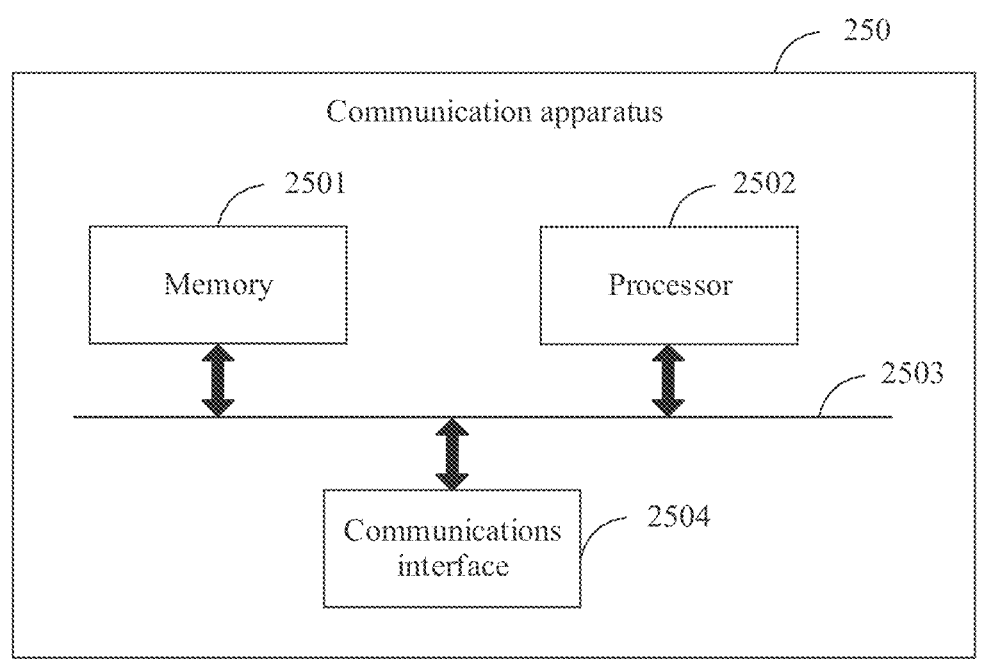
FIG. 25 is a schematic diagram of a structure of another communication apparatus according to an embodiment of this application.

FIG. 25 is a schematic diagram of a structure of a communication apparatus 240 according to an embodiment of this application. The apparatus 250 may be a node, or may be a component in a node. The apparatus 250 may include at least one memory 2501 and at least one processor 2502. Optionally, the apparatus may further include a bus 2503. Optionally, the apparatus may further include a communications interface 2504. The memory 2501, the processor 2502, and the communications interface 2504 are connected through the bus 2503.

The memory 2501 is configured to provide storage space, and the storage space may store data such as an operating system and a computer program. The memory 2501 may be one or a combination of a RAM, a ROM, an EPROM, a CD-ROM, and the like.

The processor 2502 is a module that performs an arithmetic operation and/or a logic operation, and may be specifically one or a combination of processing modules such as a CPU, a GPU, an MPU, an ASIC, an FPGA, and a CPLD.

The communications interface 2504 is configured to receive data sent from the outside and/or send data to the outside, and may be an interface of a wired link such as an Ethernet cable, or may be a wireless link (Wi-Fi, Bluetooth, or the like) interface. Optionally, the communications interface 2504 may further include a transmitter (for example, a radio frequency transmitter or an antenna), a receiver, or the like coupled to the interface.

The processor 2502 in the apparatus 250 is configured to read the computer program stored in the memory 2501, to perform the foregoing communication method, for example, the communication method described in FIG. 8.

For example, the processor 2502 in the apparatus 250 is configured to read the computer program stored in the memory 2501, to perform the following operations: receiving a service attribute report response message from a second node through the communications interface 2504, where the service attribute report response message includes an identifier of a first service and/or a data packet size of the first service; and determining a target MAC length of a user plane based on a MAC length supported by a target security algorithm of the user plane and at least one of the identifier of the first service and the data packet size of the first service, where the target MAC length of the user plane is used to indicate a length of a MAC for performing integrity protection on data of the first service.

In this embodiment of this application, the apparatus 250 determines the target MAC length of the user plane based on a MAC length supported by a security algorithm of the user plane, the identifier of the first service, and the data packet size of the first service, and then uses the target MAC length of the user plane as a MAC length of a message used to process the first service. In this way, different MAC lengths can be determined for different services or services of different data packet sizes, to improve flexibility of the MAC length. For a service with relatively high security, a relatively long MAC length may be used, so that it is difficult to be cracked, and data security is improved. In addition, for some messages that do not have a high privacy requirement or have a relatively small data packet, a relatively short MAC length may be used, to avoid affecting communication efficiency and reduce resource consumption during network transmission.

In a possible implementation, the processor 2502 is specifically configured to determine the target MAC length of the user plane based on the MAC length supported by the target security algorithm of the user plane and the identifier of the first service; or determine the target MAC length of the user plane based on the MAC length supported by the target security algorithm of the user plane and the data packet size of the first service.

In another possible implementation, the processor 2502 is specifically configured to: determine, based on the MAC length supported by the target security algorithm of the user plane and a correspondence between the identifier of the first service and a MAC length, the MAC length corresponding to the identifier of the first service as the target MAC length of the user plane; or determine, based on the MAC length supported by the target security algorithm of the user plane and a correspondence between the data packet size of the first service and a MAC length, the MAC length corresponding to the data packet size of the first service as the target MAC length of the user plane.

In another possible implementation, the determining a target MAC length of a user plane based on a target security algorithm of the user plane and at least one of the identifier of the first service and the data packet size of the first service includes: determining a second length selection policy based on the identifier of the first service and/or the data packet size of the first service; and determining the target MAC length of the user plane based on the second length selection policy and the MAC length supported by the target security algorithm of the user plane.

In another possible implementation, the identifier of the first service corresponds to a first service type, and integrity protection needs to be performed on data of a service whose type is the first service type.

Services of different service types have different integrity protection requirements. The first node may determine, based on the identifier of the first service, whether to enable integrity protection, and generate a corresponding target MAC of the user plane only for a service for which integrity protection needs to be enabled, and therefore security requirements of different services can be met. For example, a video upload service is a service having a relatively high security requirement, so that integrity protection needs to be performed on data of the video upload service, and therefore, a length of a MAC used to protect the data of this service needs to be determined.

In another possible implementation, the processor 2502 is further configured to send a resource scheduling message to the second node through the communications interface 2504, where the resource scheduling message includes the target MAC length of the user plane.

In a possible implementation, the method further includes generating a third MAC by using the target security algorithm of the user plane, where a length of the third MAC is the target MAC length of the user plane, and the third MAC is used to perform integrity protection on the data of the first service.

In another possible implementation, the processor 2502 is further configured to obtain information about a security algorithm supported by the second node; determine a target security algorithm of a signaling plane and a target MAC length of the signaling plane according to a first algorithm selection policy, where the target security algorithm of the signaling plane belongs to a set of security algorithms indicated by the information about the security algorithm supported by the second node; generate a fourth MAC by using the target security algorithm of the signaling plane, where a length of the fourth MAC is the target MAC length of the signaling plane; and send a resource scheduling message to the second node through the communications interface 2504, where the resource scheduling message includes the fourth MAC and the target MAC length of the user plane, and the fourth MAC is used to perform integrity protection on the resource scheduling message.

In another possible implementation, the processor 2502 is further configured to determine the target security algorithm of the user plane according to a second algorithm selection policy, where the target security algorithm of the user plane belongs to the set of security algorithms indicated by the information about the security algorithm supported by the second node.

It should be noted that for implementation of each unit, refer to corresponding descriptions in the embodiment shown in FIG. 8. The apparatus 250 is the first node in the embodiment shown in FIG. 8.

Figure 26:
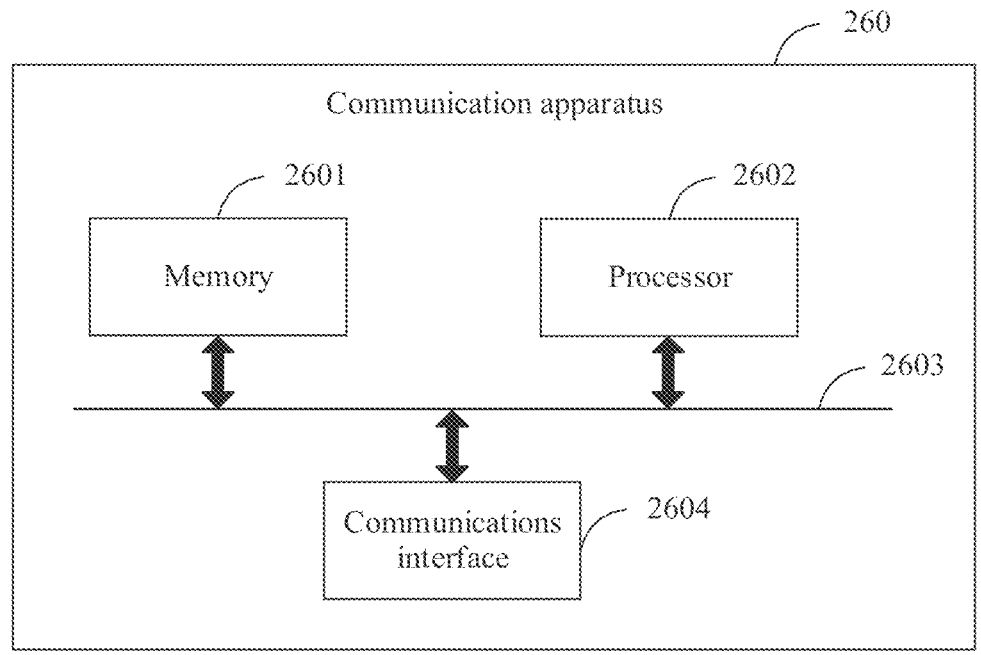
FIG. 26 is a schematic diagram of a structure of another communication apparatus according to an embodiment of this application.

FIG. 26 is a schematic diagram of a structure of a communication apparatus 260 according to an embodiment of this application. The apparatus 260 may be a node, or may be a component in a node. The apparatus 260 may include at least one memory 2601 and at least one processor 2602. Optionally, the apparatus may further include a bus 2603. Optionally, the apparatus may further include a communications interface 2604. The memory 2601, the processor 2602, and the communications interface 2604 are connected through the bus 2603.

The memory 2601 is configured to provide storage space, and the storage space may store data such as an operating system and a computer program. The memory 2601 may be one or a combination of a RAM, a ROM, an EPROM, a CD-ROM, and the like.

The processor 2602 is a module that performs an arithmetic operation and/or a logic operation, and may be specifically one or a combination of processing modules such as a CPU, a GPU, an MPU, an ASIC, an FPGA, and a CPLD.

The communications interface 2604 is configured to receive data sent from the outside and/or send data to the outside, and may be an interface of a wired link such as an Ethernet cable, or may be a wireless link (Wi-Fi, Bluetooth, or the like) interface. Optionally, the communications interface 2604 may further include a transmitter (for example, a radio frequency transmitter or an antenna), a receiver, or the like coupled to the interface.

The processor 2602 in the apparatus 260 is configured to read the computer program stored in the memory 2601, to perform the foregoing communication method, for example, the communication method described in FIG. 8.

For example, the processor 2602 in the apparatus 260 is configured to read the computer program stored in the memory 2601, to perform the following operations: sending a service attribute report response message to a first node through the communications interface 2604, where the service attribute report response message includes an identifier of a first service and/or a data packet size of the first service; and receiving a resource scheduling message from the first node through the communications interface 2604, where the resource scheduling message includes a target MAC length of a user plane; the target MAC length of the user plane is a MAC length supported by a target security algorithm of the user plane, and the target MAC length of the user plane corresponds to at least one of the identifier of the first service and the data packet size of the first service; and the target MAC length of the user plane is used to indicate a length of a MAC for performing integrity protection on data of the first service.

In the embodiment, services of different service types have different integrity protection requirements. The apparatus 260 may determine, based on the identifier of the first service, whether to enable integrity protection. For example, an audio noise reduction service is a service having a relatively low security requirement, so that integrity protection may not need to be performed on data of the audio noise reduction service.

Further, the first node may add indication information in a resource scheduling message, so that the second node determines, based on the indication information, whether integrity protection is to be enabled for a service.

In a possible implementation, the target MAC length of the user plane is determined based on the MAC length supported by the target security algorithm of the user plane and at least one of the identifier of the first service and the data packet size of the first service.

In another possible implementation, the identifier of the first service corresponds to a first service type, and integrity protection needs to be performed on data of a service whose type is the first service type.

Services of different service types have different integrity protection requirements. The first node may determine, based on the identifier of the first service, whether to enable integrity protection, and generate a corresponding target MAC of the user plane only for a service for which integrity protection needs to be enabled, and therefore security requirements of different services can be met. For example, a video upload service is a service having a relatively high security requirement, so that integrity protection needs to be performed on data of the video upload service, and therefore, a length of a MAC used to protect the data of this service needs to be determined.

In another possible implementation, the target security algorithm of the user plane corresponds to a second algorithm selection policy, and the target security algorithm of the user plane belongs to a set of security algorithms indicated by information about a security algorithm supported by the second node.

In another possible implementation, the resource scheduling message further includes a fourth MAC, and the processor 2602 is further configured to check message integrity of the resource scheduling message based on the fourth MAC by using the target security algorithm of the user plane.

It should be noted that for implementation of each unit, refer to corresponding descriptions in the embodiment shown in FIG. 8. The apparatus 260 is the second node in the embodiment shown in FIG. 8.

Figure 27:
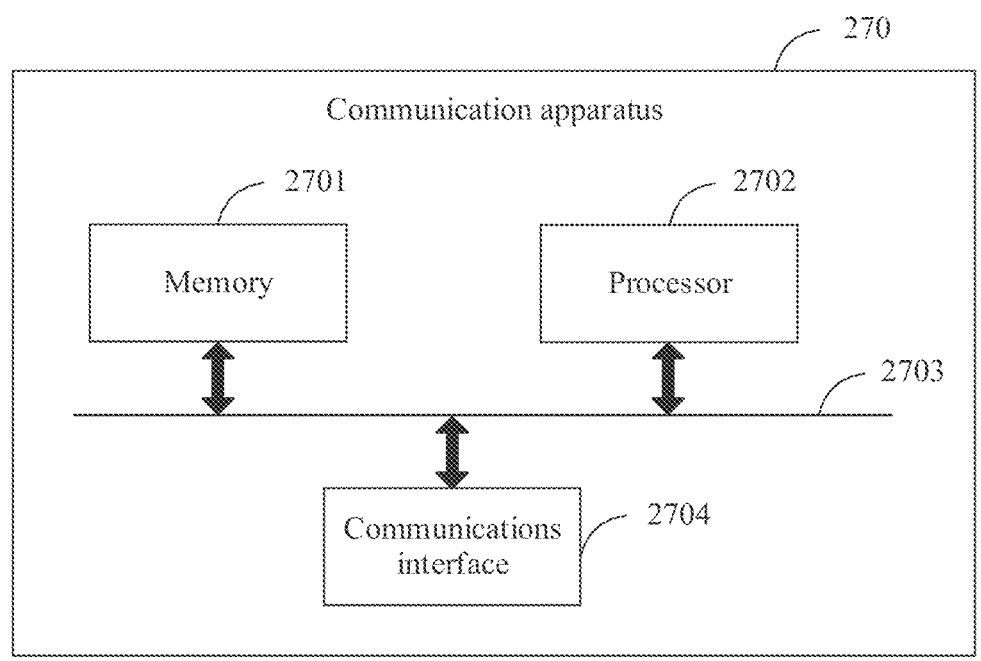
FIG. 27 is a schematic diagram of a structure of another communication apparatus according to an embodiment of this application.

FIG. 27 is a schematic diagram of a structure of a communication apparatus 270 according to an embodiment of this application. The apparatus 270 may be a node, or may be a component in a node. The apparatus 270 may include at least one memory 2701 and at least one processor 2702. Optionally, the apparatus may further include a bus 2603. Optionally, the apparatus may further include a communications interface 2704. The memory 2701, the processor 2702, and the communications interface 2704 are connected through the bus 2703.

The memory 2601 is configured to provide storage space, and the storage space may store data such as an operating system and a computer program. The memory 2701 may be one or a combination of a RAM, a ROM, an EPROM, a CD-ROM, and the like.

The processor 2702 is a module that performs an arithmetic operation and/or a logic operation, and may be specifically one or a combination of processing modules such as a CPU, a GPU, an MPU, an ASIC, an FPGA, and a CPLD.

The communications interface 2704 is configured to receive data sent from the outside and/or send data to the outside, and may be an interface of a wired link such as an Ethernet cable, or may be a wireless link (Wi-Fi, Bluetooth, or the like) interface. Optionally, the communications interface 2704 may further include a transmitter (for example, a radio frequency transmitter or an antenna), a receiver, or the like coupled to the interface.

The processor 2702 in the apparatus 270 is configured to read the computer program stored in the memory 2701, to perform the foregoing communication method, for example, the communication method described in FIG. 8.

For example, the processor 2702 in the apparatus 270 is configured to read the computer program stored in the memory 2701, to perform the following operations: sending a service attribute report response message to a first node through the communications interface 2704, where the service attribute report response message includes an identifier of a first service and/or a data packet size of the first service; and determining a target MAC length of a user plane based on a MAC length supported by a target security algorithm of the user plane and at least one of the identifier of the first service and the data packet size of the first service, where the target MAC length of the user plane is used to indicate a length of a MAC for performing integrity protection on data of the first service.

A method for determining the target MAC length of the user plane that is the same as that in the first node is configured in the apparatus 270. Therefore, the apparatus 270 may determine the target MAC length of the user plane based on a MAC length supported by a security algorithm of the user plane and the identifier of the first service and/or the data packet size of the first service, and then use the target MAC length of the user plane as a MAC length of a message used to process the first service. In this way, different MAC lengths can be determined for different services or services of different data packet sizes, to improve flexibility of the MAC length.

However, the same method for determining the target MAC length of the user plane is configured in both the apparatus 270 and the first node, so that the first node determines the target MAC length of the user plane in a specific manner, and therefore the apparatus 270 also determines the target MAC length of the user plane in a same manner. In this way, a node does not need to send a target MAC length to a peer node, to save network resources.

In a possible implementation, the processor 2702 is specifically configured to: determine, based on the MAC length supported by the target security algorithm of the user plane and a correspondence between the ID of the first service and a MAC length, the MAC length corresponding to the ID of the first service as the target MAC length of the user plane; or determine, based on the MAC length supported by the target security algorithm of the user plane and a correspondence between the data packet size of the first service and a MAC length, the MAC length corresponding to the data packet size of the first service as the target MAC length of the user plane.

In a possible implementation, the processor 2702 is further configured to determine the target MAC length of the user plane based on the MAC length supported by the target security algorithm of the user plane and the identifier of the first service; or determine the target MAC length of the user plane based on the MAC length supported by the target security algorithm of the user plane and the data packet size of the first service.

In another possible implementation, the processor 2702 is further configured to determine a second length selection policy based on the ID of the first service and/or the data packet size of the first service; and determine the target MAC length of the user plane based on the second length selection policy and the MAC length supported by the target security algorithm of the user plane.

In another possible implementation, the identifier of the first service corresponds to a first service type, and integrity protection needs to be performed on data of a service whose type is the first service type.

Services of different service types have different integrity protection requirements. The first node may determine, based on the identifier of the first service, whether to enable integrity protection, and generate a corresponding target MAC of the user plane only for a service for which integrity protection needs to be enabled, and therefore security requirements of different services can be met. For example, a video upload service is a service having a relatively high security requirement, so that integrity protection needs to be performed on data of the video upload service, and therefore, a length of a MAC used to protect the data of this service needs to be determined.

In another possible implementation, the target security algorithm of the user plane corresponds to a second algorithm selection policy, and the target security algorithm of the user plane belongs to a set of security algorithms indicated by information about a security algorithm supported by the second node.

It should be noted that for implementation of each unit, refer to corresponding descriptions in the embodiment shown in FIG. 8. The apparatus 270 is the second node in the embodiment shown in FIG. 8.

Figure 28:
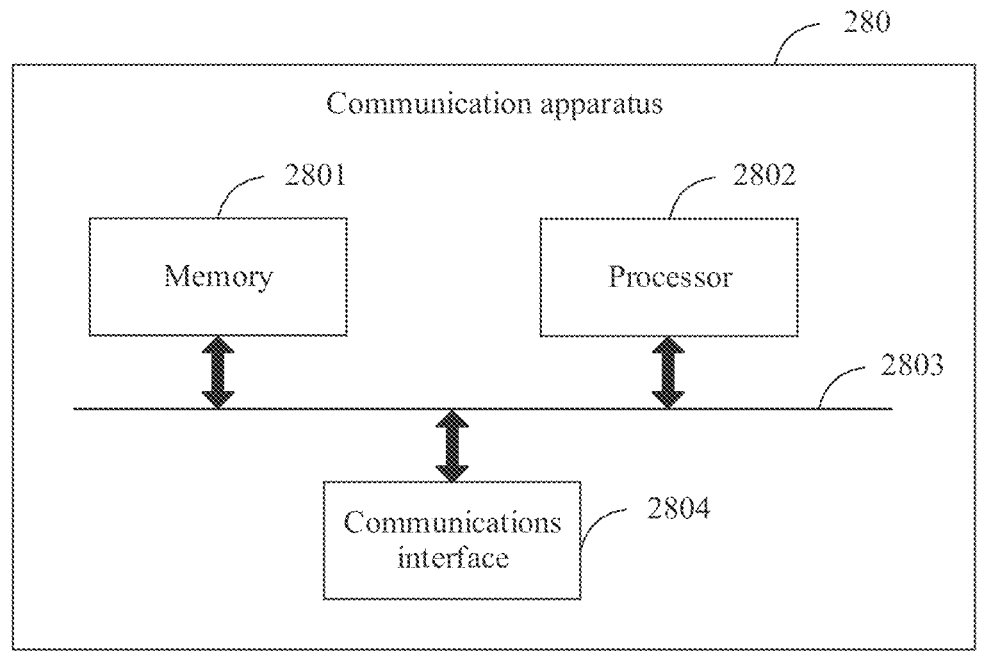
FIG. 28 is a schematic diagram of a structure of another communication apparatus according to an embodiment of this application.

FIG. 28 is a schematic diagram of a structure of a communication apparatus 280 according to an embodiment of this application. The apparatus 280 may be a node, or may be a component in a node. The apparatus 280 may include at least one memory 2801 and at least one processor 2802. Optionally, the apparatus may further include a bus 2803. Optionally, the apparatus may further include a communications interface 2804. The memory 2801, the processor 2802, and the communications interface 2804 are connected through the bus 2703.

The memory 2801 is configured to provide storage space, and the storage space may store data such as an operating system and a computer program. The memory 2801 may be one or a combination of a RAM, a ROM, an EPROM, a CD-ROM, and the like.

The processor 2802 is a module that performs an arithmetic operation and/or a logic operation, and may be specifically one or a combination of processing modules such as a CPU, a GPU, an MPU, an ASIC, an FPGA, and a CPLD.

The communications interface 2804 is configured to receive data sent from the outside and/or send data to the outside, and may be an interface of a wired link such as an Ethernet cable, or may be a wireless link (Wi-Fi, Bluetooth, or the like) interface. Optionally, the communications interface 2804 may further include a transmitter (for example, a radio frequency transmitter or an antenna), a receiver, or the like coupled to the interface.

The processor 2802 in the apparatus 280 is configured to read the computer program stored in the memory 2801, to perform the foregoing communication method, for example, the communication method described in FIG. 11 or FIG. 12.

For example, the processor 2802 in the apparatus 280 is configured to read the computer program stored in the memory 2801, to perform the following operations: receiving a service attribute report response message from a second node through the communications interface 2804, where the service attribute report response message includes at least one service identifier, the at least one service identifier includes an identifier of at least one second service, the identifier of the at least one second service corresponds to a second service type, and integrity protection does not need to be performed on data of a service whose type is the second service type; and sending a resource scheduling message to the second node through the communications interface 2804, where the resource scheduling message is used to indicate that integrity protection is not to be enabled for the service corresponding to the identifier of the at least one second service.

It can be seen that services of different service types have different integrity protection requirements. The apparatus may determine, based on an identifier of a first service, whether to enable integrity protection. For example, an audio noise reduction service is a service having a relatively low security requirement, so that integrity protection may not need to be performed on data of the audio noise reduction service, and therefore, a MAC length corresponding to the audio noise reduction service may not be determined.

Further, the first node may add indication information in a resource scheduling message, so that the second node determines, based on the indication information, whether integrity protection is to be enabled for a service.

In a possible implementation, the at least one service identifier includes an identifier of at least one first service, the identifier of the at least one first service corresponds to a first service type, and integrity protection needs to be performed on data of a service whose type is the first service type.

In another possible implementation, the resource scheduling message is further used to indicate a target MAC length of a user plane that is used for the at least one first service.

It can be learned that, for a service on which integrity protection needs to be performed, information indicating the target MAC length of the user plane may be added in the apparatus 280 and is used to indicate a length of a MAC for performing integrity protection on data of the service.

It should be noted that for implementation of each unit, refer to corresponding descriptions in the embodiment shown in FIG. 11 or FIG. 12. The apparatus 280 may be the first node in the embodiment shown in FIG. 11 or FIG. 12.

Figure 29:
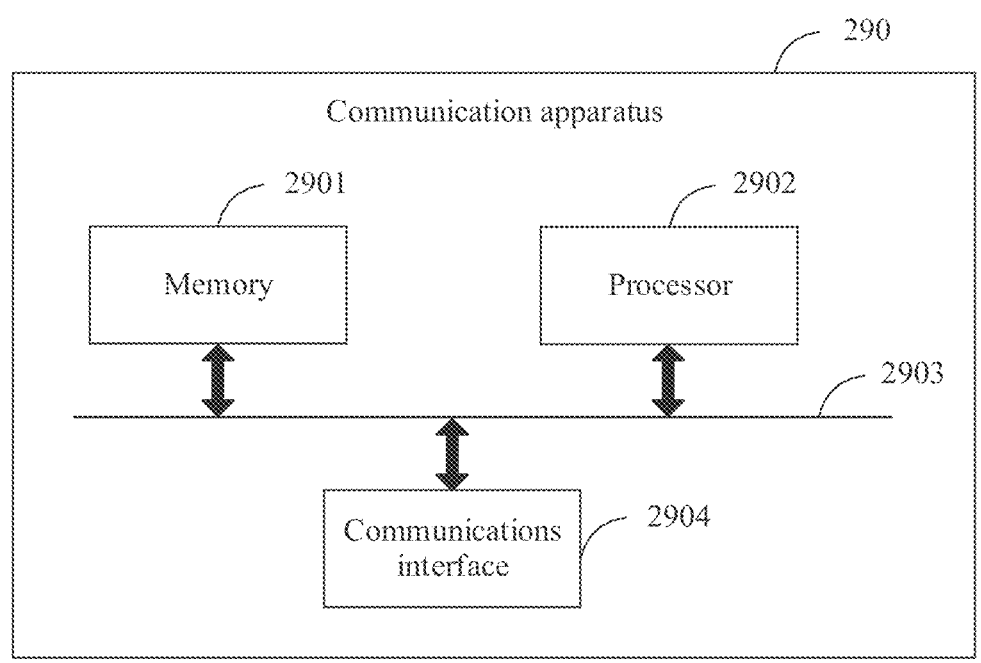
FIG. 29 is a schematic diagram of a structure of another communication apparatus according to an embodiment of this application.

FIG. 29 is a schematic diagram of a structure of a communication apparatus 290 according to an embodiment of this application. The apparatus 290 may be a node, or may be a component in a node. The apparatus 290 may include at least one memory 2801 and at least one processor 2902. Optionally, the apparatus may further include a bus 2903. Optionally, the apparatus may further include a communications interface 2904. The memory 2901, the processor 2902, and the communications interface 2904 are connected through the bus 2703.

The memory 2901 is configured to provide storage space, and the storage space may store data such as an operating system and a computer program. The memory 2901 may be one or a combination of a RAM, a ROM, an EPROM, a CD-ROM, and the like.

The processor 2902 is a module that performs an arithmetic operation and/or a logic operation, and may be specifically one or a combination of processing modules such as a CPU, a GPU, an MPU, an ASIC, an FPGA, and a CPLD.

The communications interface 2904 is configured to receive data sent from the outside and/or send data to the outside, and may be an interface of a wired link such as an Ethernet cable, or may be a wireless link (Wi-Fi, Bluetooth, or the like) interface. Optionally, the communications interface 2904 may further include a transmitter (for example, a radio frequency transmitter or an antenna), a receiver, or the like coupled to the interface.

The processor 2902 in the apparatus 290 is configured to read the computer program stored in the memory 2901, to perform the foregoing communication method, for example, the communication method described in FIG. 11 or FIG. 12.

For example, the processor 2902 in the apparatus 290 is configured to read the computer program stored in the memory 2901, to perform the following operations: sending a service attribute report response message to a first node through the communications interface 2904, where the service attribute report response message includes at least one service identifier, the at least one service identifier includes an identifier of at least one second service, the identifier of the at least one second service corresponds to a second service type, and integrity protection does not need to be performed on data of a service whose type is the second service type; receiving a resource scheduling message from the first node through the communications interface 2904; and determining, based on the resource scheduling message, that integrity protection is not to be enabled for the service corresponding to the identifier of the at least one second service.

It can be seen that services of different service types have different integrity protection requirements. The first node may determine, based on an identifier of a first service, whether to enable integrity protection. For example, an audio noise reduction service is a service having a relatively low security requirement, so that integrity protection may not need to be performed on data of the audio noise reduction service, and therefore, a MAC length corresponding to the audio noise reduction service may not be determined.

In another possible implementation, the at least one service identifier includes an identifier of at least one first service, the identifier of the at least one first service corresponds to a first service type, and integrity protection needs to be performed on data of a service whose type is the first service type. The method further includes: determining, based on the resource scheduling message, that integrity protection is to be enabled for the service corresponding to the identifier of the at least one first service.

In another possible implementation, the resource scheduling message is further used to indicate a length of a MAC for performing integrity protection on data of the at least one first service.

It should be noted that for implementation of each unit, refer to corresponding descriptions in the embodiment shown in FIG. 11 or FIG. 12. The apparatus 290 is the second node in the embodiment shown in FIG. 11 or FIG. 12.

Figure 30:
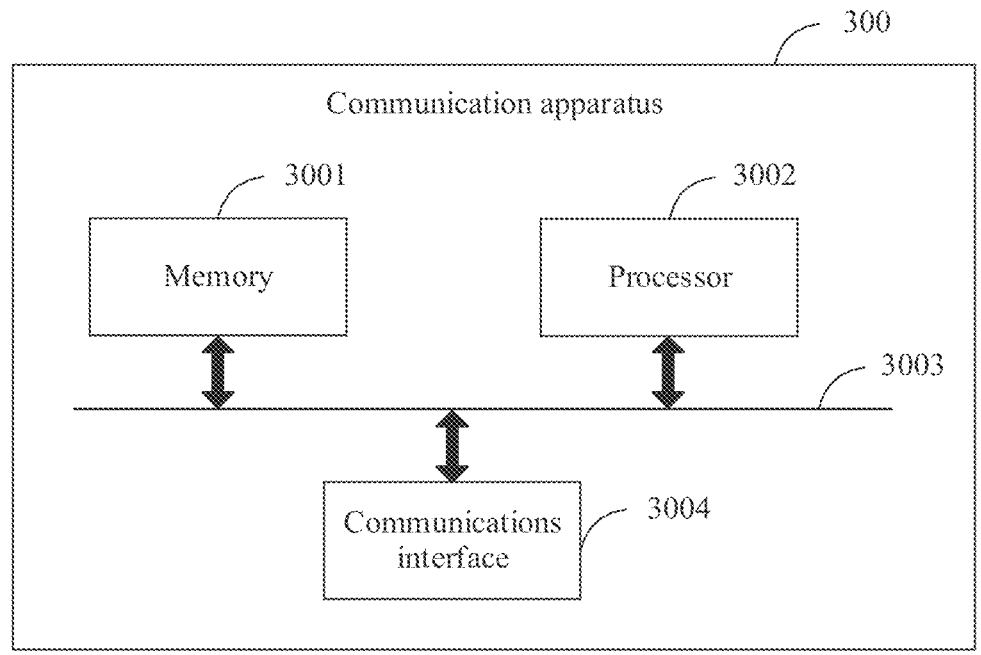
FIG. 30 is a schematic diagram of a structure of another communication apparatus according to an embodiment of this application.

FIG. 30 is a schematic diagram of a structure of a communication apparatus 300 according to an embodiment of this application. The apparatus 300 may be a node, or may be a component in a node. The apparatus 300 may include at least one memory 3001 and at least one processor 3002. Optionally, the apparatus may further include a bus 3003. Optionally, the apparatus may further include a communications interface 3004. The memory 3001, the processor 3002, and the communications interface 3004 are connected through the bus 3003.

The memory 3001 is configured to provide storage space, and the storage space may store data such as an operating system and a computer program. The memory 3001 may be one or a combination of a RAM, a ROM, an EPROM, a CD-ROM, and the like.

The processor 3002 is a module that performs an arithmetic operation and/or a logic operation, and may be specifically one or a combination of processing modules such as a CPU, a GPU, an MPU, an ASIC, an FPGA, and a CPLD.

The communications interface 3004 is configured to receive data sent from the outside and/or send data to the outside, and may be an interface of a wired link such as an Ethernet cable, or may be a wireless link (Wi-Fi, Bluetooth, or the like) interface. Optionally, the communications interface 3004 may further include a transmitter (for example, a radio frequency transmitter or an antenna), a receiver, or the like coupled to the interface.

The processor 3002 in the apparatus 300 is configured to read the computer program stored in the memory 3001, to perform the foregoing communication method, for example, the communication method described in FIG. 13.

For example, the processor 3002 in the apparatus 300 is configured to read the computer program stored in the memory 3001, to perform the following operations: receiving an association request message from a second node through the communications interface 3004, where the association request message includes information about a security algorithm supported by the second node and an identity of the second node; determining a target security algorithm of a signaling plane and a target MAC length of the signaling plane according to a first algorithm selection policy, where the target security algorithm of the signaling plane belongs to a set of security algorithms indicated by the information about the security algorithm supported by the second node; determining a target security algorithm of a user plane and a target MAC length of the user plane based on a second algorithm selection policy and the identity of the second node, where the target security algorithm of the user plane belongs to the set of security algorithms indicated by the information about the security algorithm supported by the second node, and the target MAC length of the user plane is used to indicate a length of a MAC for performing integrity protection on data of a first service; and generating a first MAC by using the target security algorithm of the signaling plane, where a length of the first MAC is the target MAC length of the signaling plane.

In embodiments of this application, different policies may be configured in the apparatus 300 to determine different MAC lengths, to improve flexibility of the MAC length. Further, the apparatus 300 may determine the target security algorithm of the user plane and the target MAC of the user plane based on the identity of the second node, to meet requirements of different types of nodes for MAC lengths. For example, some nodes that process important services may use a relatively long MAC length to improve security. For another example, some assistant nodes or ordinary nodes may use a relatively short MAC length to reduce resource consumption and improve communication efficiency.

In a possible implementation, the processor 3002 is specifically configured to determine the target security algorithm of the signaling plane and the target MAC length of the signaling plane according to a first length selection policy and the first algorithm selection policy.

In another possible implementation, the processor 3002 is specifically configured to: determine the target security algorithm of the signaling plane according to the first algorithm selection policy; and determine the target MAC length of the signaling plane according to the first length selection policy and the target security algorithm of the signaling plane.

In another possible implementation, the processor 3002 is specifically configured to: determine the target security algorithm of the signaling plane according to the first algorithm selection policy, where a MAC length corresponding to the target security algorithm of the signaling plane is the target MAC length of the signaling plane.

In another possible implementation, the processor 3002 is specifically configured to: determine the target security algorithm of the user plane according to the second algorithm selection policy; and determine a second length selection policy based on the identity of the second node; and determine the target MAC length of the signaling plane based on the second length selection policy and the target security algorithm of the user plane.

In another possible implementation, the processor 3002 is specifically configured to: determine the target security algorithm of the user plane according to the second algorithm selection policy; and determine, based on a MAC length supported by the target security algorithm of the user plane and a correspondence between the identity of the second node and a MAC length, the MAC length corresponding to the identity of the second node as the target MAC length of the user plane.

In another possible implementation, the processor 3002 is further configured to send a security context request message to the second node through the communications interface 3004, where the security context request message includes a first MAC, information indicating the target security algorithm of the signaling plane, information indicating the target security algorithm of the user plane, the target MAC length of the signaling plane, and the target MAC length of the user plane, and the first MAC is used to check integrity of the security context request message.

In another possible implementation, the processor 3002 is further configured to: send a security context request message to the second node through the communications interface 3004, where the security context request message includes a first MAC, information indicating the target security algorithm of the signaling plane, information indicating the target security algorithm of the user plane, the target MAC length of the signaling plane, the target MAC length of the user plane, and first identity authentication information, the first MAC is used to check integrity of the security context request message, and the first identity authentication information is generated based on a shared key between the first node and the second node; and receive a security context response message from the second node through the communications interface 3004, where the security context response message includes second identity authentication information and a second MAC, a length of the second MAC is the target MAC length of the signaling plane, the second identity authentication information is used to verify an identity of the second node, and the second MAC is used to check integrity of the security context response message.

In another possible implementation, the processor 3002 is further configured to: check the integrity of the security context response message based on the target security algorithm of the signaling plane and the second MAC; perform verification on the second identity authentication information based on the shared key; and send an association establishment message to the second node if the check on the integrity of the security context response message succeeds and the verification on the second identity authentication information succeeds, where the association establishment message indicates the second node to establish an association with the first node.

It should be noted that for implementation of each unit, refer to corresponding descriptions in the embodiment shown in FIG. 13. The apparatus 300 is the first node in the embodiment shown in FIG. 13.

Figure 31:
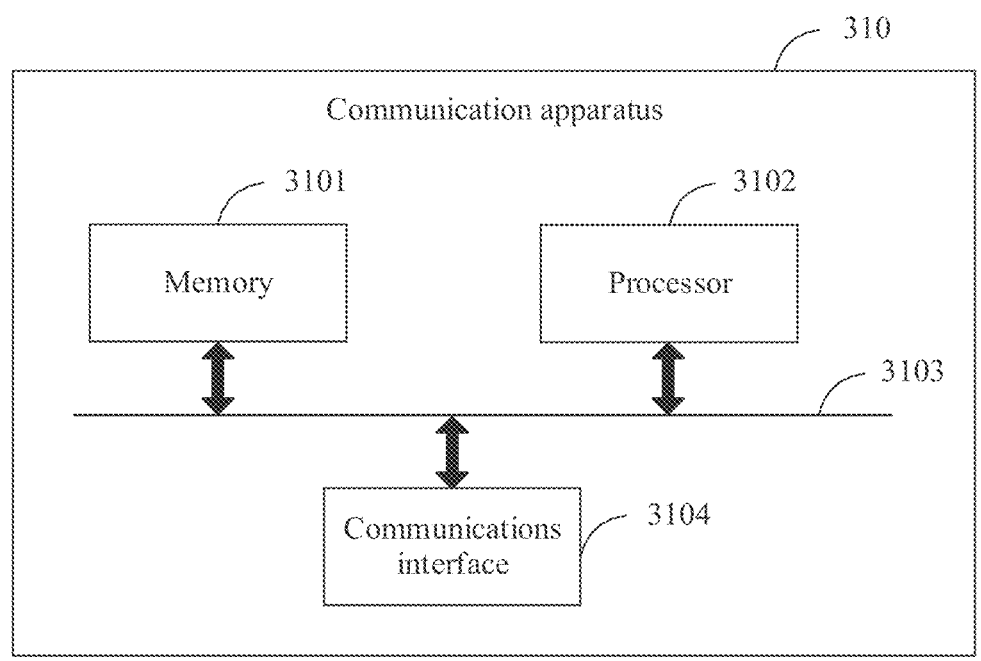
FIG. 31 is a schematic diagram of a structure of another communication apparatus according to an embodiment of this application.

FIG. 31 is a schematic diagram of a structure of a communication apparatus 310 according to an embodiment of this application. The apparatus 310 may be a node, or may be a component in a node. The apparatus 310 may include at least one memory 3101 and at least one processor 3102. Optionally, the apparatus may further include a bus 3103. Optionally, the apparatus may further include a communications interface 3104. The memory 3101, the processor 3102, and the communications interface 3104 are connected through the bus 3103.

The memory 3101 is configured to provide storage space, and the storage space may store data such as an operating system and a computer program. The memory 3101 may be one or a combination of a RAM, a ROM, an EPROM, a CD-ROM, and the like.

The processor 3102 is a module that performs an arithmetic operation and/or a logic operation, and may be specifically one or a combination of processing modules such as a CPU, a GPU, an MPU, an ASIC, an FPGA, and a CPLD.

The communications interface 3104 is configured to receive data sent from the outside and/or send data to the outside, and may be an interface of a wired link such as an Ethernet cable, or may be a wireless link (Wi-Fi, Bluetooth, or the like) interface. Optionally, the communications interface 3104 may further include a transmitter (for example, a radio frequency transmitter or an antenna), a receiver, or the like coupled to the interface.

The processor 3102 in the apparatus 310 is configured to read the computer program stored in the memory 3101, to perform the foregoing communication method, for example, the communication method described in FIG. 13.

For example, the processor 3102 in the apparatus 310 is configured to read the computer program stored in the memory 3101, to perform the following operations: sending an association request message to a first node through the communications interface 3104, where the association request message includes information about a security algorithm supported by a second node and an identity of the second node; receiving a security context request message from the first node through the communications interface 3104, where the security context request message includes information used to indicate a target security algorithm of a signaling plane, information used to indicate a target security algorithm of a user plane, a target MAC length of the signaling plane, a target MAC length of the user plane, and a first MAC; the target security algorithm of the signaling plane and the target MAC length of the signaling plane correspond to a first algorithm selection policy, and the target security algorithm of the signaling plane belongs to a set of security algorithms indicated by the information about the security algorithm supported by the second node; the target security algorithm of the user plane and the target MAC length of the user plane correspond to a second algorithm selection policy and the identity of the second node, and the target security algorithm of the user plane belongs to the set of security algorithms indicated by the information about the security algorithm supported by the second node; and a length of the first MAC is the target MAC length of the signaling plane; and checking integrity of the security context request message based on the first MAC by using the target security algorithm of the signaling plane.

In embodiments of this application, different policies may be configured in the first node to determine different MAC lengths, to improve flexibility of the MAC length. Further, the first node may determine the target security algorithm of the user plane and the target MAC of the user plane based on the identity of the second node, to meet requirements of different types of nodes for MAC lengths. The apparatus 310 obtains the target MAC length from the first node, and protects message integrity by using the target MAC length. For example, some nodes that process important services may use a relatively long MAC length to improve security. For another example, some assistant nodes or ordinary nodes may use a relatively short MAC length to reduce resource consumption and improve communication efficiency.

In a possible implementation, the target security algorithm of the signaling plane and the target MAC length of the signaling plane are determined according to the first algorithm selection policy, the target security algorithm of the signaling plane belongs to the set of security algorithms indicated by the information about the security algorithm supported by the second node, and the first MAC is generated according to the target security algorithm of the signaling plane.

In another possible implementation, the target security algorithm of the user plane and the target MAC length of the user plane are determined according to the second algorithm selection policy, the target security algorithm of the user plane belongs to the set of security algorithms indicated by the information about the security algorithm supported by the second node, and the first MAC is generated according to the target security algorithm of the signaling plane.

In another possible implementation, the processor 3102 is further configured to: perform verification on the first identity authentication information based on a shared key between the second node and the first node; if the check on the integrity of the security context request message succeeds and the verification on the first identity authentication information succeeds, generate a second MAC by using the target security algorithm of the signaling plane, where a length of the second MAC is the target MAC length of the signaling plane; and send a security context response message to the first node through the communications interface 3104, where the security context response message includes the second MAC and second identity authentication information, and the second identity authentication information is generated based on the shared key between the second node and the first node.

In another possible implementation, the method further includes: receiving an association establishment message from the first node. The association establishment message indicates the second node to establish an association with the first node.

It should be noted that for implementation of each unit, refer to corresponding descriptions in the embodiment shown in FIG. 13. The apparatus 310 is the second node in the embodiment shown in FIG. 13.

An embodiment of this application provides a computer-readable storage medium. The computer-readable storage medium stores a computer program. When the computer program is run on one or more processors, the communication method shown in FIG. 3, FIG. 7, FIG. 8, or FIG. 9A and FIG. 9B is performed.

An embodiment of this application provides a computer program product. When the computer program product is run on one or more processors, the communication method shown in FIG. 3, FIG. 8, FIG. 11, FIG. 12, or FIG. 13 may be implemented.

An embodiment of this application provides a chip system. The chip system includes at least one processor and a communications interface, and the at least one processor is configured to invoke a computer program stored in at least one memory, so that an apparatus in which the chip system is located implements the communication method shown in FIG. 3, FIG. 8, FIG. 11, or FIG. 12. An embodiment of this application provides a communications system. The communications system includes a first node and a second node, where the first node includes the apparatus described in FIG. 14, FIG. 16, FIG. 19, or FIG. 21, and the second node includes the apparatus described in FIG. 15, FIG. 17, FIG. 18, FIG. 20, or FIG. 22.

An embodiment of this application provides a communications system. The communications system includes a first node and a second node, where the first node includes the apparatus described in FIG. 23, FIG. 25, FIG. 28, or FIG. 30, and the second node includes the apparatus described in FIG. 24, FIG. 26, FIG. 27, FIG. 29, or FIG. 31.

An embodiment of this application provides a smart cockpit product. The smart cockpit product includes a first node (for example, a vehicle cockpit domain controller CDC), and the first node includes the apparatus described in FIG. 14, FIG. 16, FIG. 19, or FIG. 21.

Further, the smart cockpit product includes a second node (for example, at least one of modules such as a camera, a screen, a microphone, a speaker, a radar, an electronic key, and a passive entry passive start system controller), and the second node includes the apparatus described in FIG. 15, FIG. 17, FIG. 18, FIG. 20, or FIG. 22.

An embodiment of this application discloses a smart cockpit product. The smart cockpit product includes a first node (for example, a vehicle cockpit domain controller CDC), and the first node includes the apparatus described in FIG. 23, FIG. 25, FIG. 28, or FIG. 30.

Further, the smart cockpit product includes a second node (for example, at least one of modules such as a camera, a screen, a microphone, a speaker, a radar, an electronic key, and a passive entry passive start system controller), and the second node includes the apparatus described in FIG. 24, FIG. 26, FIG. 27, FIG. 29, or FIG. 31.

An embodiment of this application provides a vehicle. The vehicle includes a first node (for example, a vehicle cockpit domain controller CDC), and the first node includes the apparatus described in FIG. 14, FIG. 16, FIG. 19, or FIG. 21.

Further, the vehicle includes a second node (for example, at least one of modules such as a camera, a screen, a microphone, a speaker, a radar, an electronic key, and a passive entry passive start system controller), and the second node includes the apparatus described in FIG. 15, FIG. 17, FIG. 18, FIG. 20, or FIG. 22. Alternatively, the vehicle may be replaced with an intelligent terminal such as a drone or a robot, or a transportation vehicle.

An embodiment of this application provides a vehicle. The vehicle includes a first node (for example, a vehicle CDC), and the first node includes the apparatus described in FIG. 23, FIG. 25, FIG. 28, or FIG. 30.

Further, the vehicle includes a second node (for example, at least one of modules such as a camera, a screen, a microphone, a speaker, a radar, an electronic key, and a passive entry passive start system controller), and the second node includes the apparatus described in FIG. 24, FIG. 26, FIG. 27, FIG. 29, or FIG. 31. Alternatively, the vehicle may be replaced with an intelligent terminal such as a drone or a robot, or a transportation vehicle.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to the embodiments of this application are all or partially implemented. The computer may be a general-purpose computer, a dedicated computer, a computer network, or other programmable apparatuses. The computer instructions may be stored in a computer-readable storage medium, or may be transmitted by using a computer-readable storage medium. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital versatile disc (DVD), a semiconductor medium (for example, a solid-state disk (SSD)), or the like.

Sequence adjustment, combination, or deletion may be performed on the steps in the method embodiments of this application based on an actual requirement.

Modules in the apparatus embodiments of this application may be combined, divided, or deleted based on an actual requirement.

What is claimed is:

1. A method comprising:
   receiving, by a processor of a first node from a second node via a network interface, an association request message comprising first information indicating a set of security algorithms supported by the second node;
   determining, by the processor, a first target security algorithm of a signaling plane and a first target message authentication code (MAC) length of the signaling plane according to a first algorithm selection policy, wherein the first target security algorithm belongs to the set of security algorithms;
   generating, by the processor, a first MAC using the first target security algorithm, wherein a first length of the first MAC is the first target MAC length; and
   transmitting, by the first node via the network interface, a security context request message to the second node, wherein the security context request message comprises the first MAC, second information indicating the first target security algorithm, and the first target MAC length, and wherein the first MAC checks an integrity of the security context request message.

2. The method of claim 1, wherein determining the first target security algorithm and the first target MAC length comprises determining the first target security algorithm and the first target MAC length according to a first length selection policy and the first algorithm selection policy.

3. The method of claim 1, wherein determining the first target security algorithm and the first target MAC length comprises determining the first target security algorithm according to the first algorithm selection policy, and wherein the first target security algorithm corresponds to the first target MAC length.

4. The method of claim 2, wherein determining the first target security algorithm and the first target MAC length according to the first length selection policy and the first algorithm selection policy comprises:
   determining the first target security algorithm according to the first algorithm selection policy; and
   determining the first target MAC length according to the first length selection policy and the first target security algorithm.

5. The method of claim 1, wherein the first algorithm selection policy is preconfigured.

6. The method of claim 1, wherein the security context request message further comprises first identity authentication information based on a shared key between the first node and the second node, and wherein the method further comprises receiving a security context response message from the second node, wherein the security context response message comprises second identity authentication information and a second MAC, wherein the second MAC has the first target MAC length, wherein the second identity authentication information verifies an identity of the second node, and wherein the second MAC checks the integrity of the security context response message.

7. The method of claim 6, wherein the security context request message further comprises a second target security algorithm of a user plane, wherein the method further comprises determining the second target security algorithm according to a second algorithm selection policy, and wherein the second target security algorithm belongs to the set of security algorithms.

8. The method of claim 7, further comprising:
   obtaining an identifier of a first service and/or a data packet size of the first service;
   determining a second target MAC length of the user plane based on a MAC length supported by the second target security algorithm and at least one of the identifier or the data packet size, wherein the second target MAC length indicates a length of a MAC for performing integrity protection on data of the first service; and
   sending, to the second node, a resource scheduling message comprising the second target MAC length.

9. A method comprising:
   sending, by a processor of a second node to a first node via a network interface, an association request message comprising first information indicating a set of security algorithms supported by the second node;
   receiving, from the first node via the network interface, a security context request message comprising second information indicating a first target security algorithm of a signaling plane, third information indicating a first target message authentication code (MAC) length of the signaling plane, and a first MAC, wherein the first MAC has the first target MAC length, wherein the first target security algorithm and the first target MAC length correspond to a first algorithm selection policy, and wherein the first target security algorithm belongs to the set of security algorithms; and
   checking an integrity of the security context request message based on the first MAC using the first target security algorithm.

10. The method of claim 9, wherein the first algorithm selection policy is preconfigured.

11. The method of claim 9, wherein the security context request message further comprises first identity authentication information, and wherein the method further comprises:
   performing verification on the first identity authentication information based on a shared key between the second node and the first node;
   generating a second MAC using the first target security algorithm when checking the integrity of the security context request message succeeds and verification on the first identity authentication information succeeds, wherein the second MAC has the first target MAC length; and
   sending, to the first node, a security context response message comprising the second MAC and second identity authentication information based on the shared key.

12. The method of claim 9, wherein the security context request message further comprises fourth information indicating a second target security algorithm of a user plane, wherein the second target security algorithm corresponds to a second algorithm selection policy and belongs to the set of security algorithms, wherein the method further comprises receiving, from the first node, a resource scheduling message comprising a second target MAC length of the user plane, wherein the second target MAC length corresponds to the second target security algorithm and at least one of an identifier of a first service or a data packet size of the first service, and wherein the second target MAC length indicates a length of a MAC for performing integrity protection on data of the first service.

13. An apparatus comprising:
   a memory configured to store instructions; and
   a processor coupled to the memory and configured to:
      receive, from a second node via a network interface, an association request message comprising information indicating a set of security algorithms supported by the second node;
      determine a first target security algorithm of a signaling plane and a first target message authentication code (MAC) length of the signaling plane according to a first algorithm selection policy, wherein the first target security algorithm of the signaling plane belongs to the set of security algorithms;
      generate a first MAC using the first target security algorithm, wherein a first length of the first MAC is the first target MAC length; and
      transmit, via the network interface, a security context request message to the second node, wherein the security context request message comprises the first MAC, second information indicating the first target security algorithm, and the first target MAC length, and wherein the first MAC checks an integrity of the security context request message.

14. The apparatus of claim 13, wherein the processor is further configured to determine the first target security algorithm and the first target MAC length according to a first length selection policy and the first algorithm selection policy.

15. The apparatus of claim 13, wherein the processor is further configured to determine the first target security algorithm according to the first algorithm selection policy, and wherein the first target security algorithm has the first target MAC length.

16. The apparatus of claim 14, wherein the processor is further configured to:
   determine the first target security algorithm according to the first algorithm selection policy; and
   determine the first target MAC length according to a first length selection policy and the first target security algorithm.

17. The apparatus of claim 13, wherein the first algorithm selection policy is preconfigured.

18. The apparatus of claim 13, wherein the security context request message further comprises first identity authentication information based on a shared key between the apparatus and the second node, and wherein the processor is further configured to receive, from the second node, a security context response message comprising second identity authentication information and a second MAC, wherein the second MAC has the first target MAC length, wherein the second identity authentication information verifies an identity of the second node, and wherein the second MAC checks integrity of the security context response message.

19. The apparatus of claim 18, wherein the security context request message further comprises a second target security algorithm of a user plane, wherein the processor is further configured to determine the second target security algorithm according to a second algorithm selection policy, and wherein the second target security algorithm belongs to the set of security algorithms.

20. The apparatus of claim 19, wherein the processor is further configured to:
obtain an identifier of a first service and/or a data packet size of the first service;
determine a second target MAC length of the user plane based on a MAC length supported by the second target security algorithm and at least one of the identifier or the data packet size, wherein the second target MAC length indicates a length of a MAC for performing integrity protection on data of the first service; and
send, to the second node, a resource scheduling message comprising the second target MAC length.

21. An apparatus comprising:
a memory configured to store instructions; and
a processor coupled to the memory and configured to:
send, to a first node via a network interface, an association request message comprising first information indicating a set of security algorithms supported by a second node;
receive, from the second node via the network interface, a security context request message comprising second information indicating a first target security algorithm of a signaling plane, third information indicating a first target message authentication code (MAC) length of the signaling plane, a first MAC, wherein the first MAC has the first target MAC length, wherein the first target security algorithm and the first target MAC length correspond to a first algorithm selection policy, and wherein the first target security algorithm belongs to the set of security algorithms; and
check an integrity of the security context request message based on the first MAC using the first target security algorithm.

22. The apparatus of claim 21, wherein the first algorithm selection policy is preconfigured.

23. The apparatus of claim 21, wherein the security context request message further comprises first identity authentication information, and wherein the processor is further configured to:
perform verification on the first identity authentication information based on a shared key between the second node and the first node;
generate a second MAC using the first target security algorithm when checking the integrity of the security context request message succeeds and verification on the first identity authentication information succeeds, wherein the second MAC has the first target MAC length; and
send, to the first node, a security context response message comprising the second MAC and second identity authentication information based on the shared key between the second node and the first node.

24. The apparatus of claim 21, wherein the security context request message further comprises fourth information indicating a second target security algorithm of a user plane, wherein the second target security algorithm corresponds to a second algorithm selection policy, wherein the second target security algorithm belongs to the set of security algorithms, wherein the processor is further configured to receive, from the first node, a resource scheduling message comprising a second target MAC length of the user plane, wherein the second target MAC length corresponds to the second target security algorithm and at least one of an identifier of a first service or a data packet size of the first service, and wherein the second target MAC length indicates a length of a MAC for performing integrity protection on data of the first service.

* * * * *